United States Patent
Mills

(10) Patent No.: US 7,239,697 B2
(45) Date of Patent: Jul. 3, 2007

(54) SUPPLY POWER TRANSITION CONTROL

(75) Inventor: Michael J. Mills, Austin, TX (US)

(73) Assignee: Silicon Laboratories, Inc., Austin, TX (US)

( * ) Notice: Subject to any disclaimer, the term of this patent is extended or adjusted under 35 U.S.C. 154(b) by 87 days.

(21) Appl. No.: 10/750,415

(22) Filed: Dec. 31, 2003

(65) Prior Publication Data

US 2005/0147236 A1 Jul. 7, 2005

(51) Int. Cl.
*H04M 1/00* (2006.01)
(52) U.S. Cl. .................. 379/413; 379/399.01; 379/322
(58) Field of Classification Search .......... 379/399.01, 379/413, 322
See application file for complete search history.

(56) References Cited

U.S. PATENT DOCUMENTS

| | | | |
|---|---|---|---|
| 6,377,681 B1 * | 4/2002 | Bremner | ...................... 379/394 |
| 6,515,880 B1 | 2/2003 | Evans et al. | |
| 2003/0048896 A1 * | 3/2003 | Canella et al. | ......... 379/399.01 |
| 2005/0074115 A1 * | 4/2005 | George | ........................ 379/418 |

OTHER PUBLICATIONS

Apex Microtechnology Application Note 30: Pulse Width Modulation Amplifier, Apex Microtechnology Corporation, Tucson, AZ, AN30U, Rev. D, 7 pages (Jun. 2002).
Intersil ISL6401 Adjustable Frequency, Low Power, Pulse Width Modulating (PWM) Current Mode Controller Data Sheet, Intersil Corporation, FN9007.5, pp. 1-11 (Jul. 2003).
Maxim MAX1856 Wide Input Range, Synchronizable, PWM SLIC Power Supply Datasheet, Maxim Integrated Products, Sunnyvale, CA, 19-1898, Rev 0, pp. 1-18 (Feb. 2001).
Maxim MAX1846/MAX1847 High-Efficiency, Current-Mode, Inverting PWM Controller Datasheet, Maxim Integrated Products, Sunnyvale, CA, 19-2091, Rev 0, pp. 1-20 (Aug. 2001).
Maxim MAX668/MAX669 1.8V to 28V Input, PWM Step-Up Controllers in uMax Datasheet, Maxim Integrated Products, Sunnyvale, CA, 19-4778, Rev 1, pp. 1-18 (Jan. 2002).
STMicroelectronics STLC3065 WLL Subscriber Line Interface Circuit Datasheet, STMicroelectronics, printed in Italy, pp. 1-27 (Oct. 1999).
STMicroelectronics STLC3055 WLL & ISDN-TA Subscriber Line Interface Circuit Datasheet, STMicroelectronics, printed in Italy, pp. 1-22 (Sep. 2000).
STMicroelectronics STLC3080 Subscriber Line Interface Circuit Datasheet, STMicroelectronics, printed in Italy, pp. 1-23 (Oct. 2001).
Vorperian, Vatche, "Simplified Analysis of PWM Converters Using Model of PWM Switch Part I: Continuous Conduction Mode," IEEE Transactions on Aerospace and Electronic Systems, vol. 26, No. 3, pp. 490-496 (May 1990).
Vorperian, Vatche, "Simplified Analysis of PWM Converters Using Model of PWM Switch Part II: Discontinuous Conduction Mode," IEEE Transactions on Aerospace and Electronic Systems, vol. 26, No. 3, pp. 497-505 (May 1990).

* cited by examiner

*Primary Examiner*—Jefferey Harold
(74) *Attorney, Agent, or Firm*—Davis & Associates; William D. Davis

(57) ABSTRACT

A variable power supply is controlled to supply power at approximately a first supply level for an electronic device. The variable power supply is controlled to control a transition of the power from approximately the first supply level toward a second supply level prior to controlling the variable power supply to supply power at approximately the second supply level for the electronic device.

23 Claims, 25 Drawing Sheets

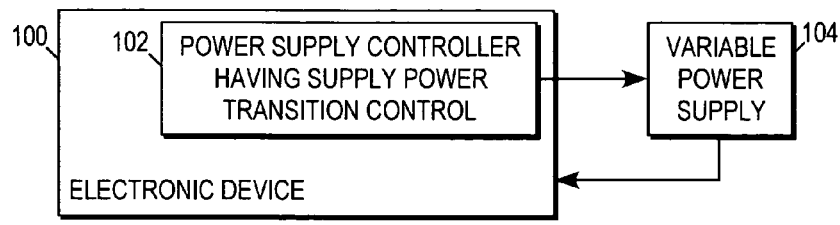
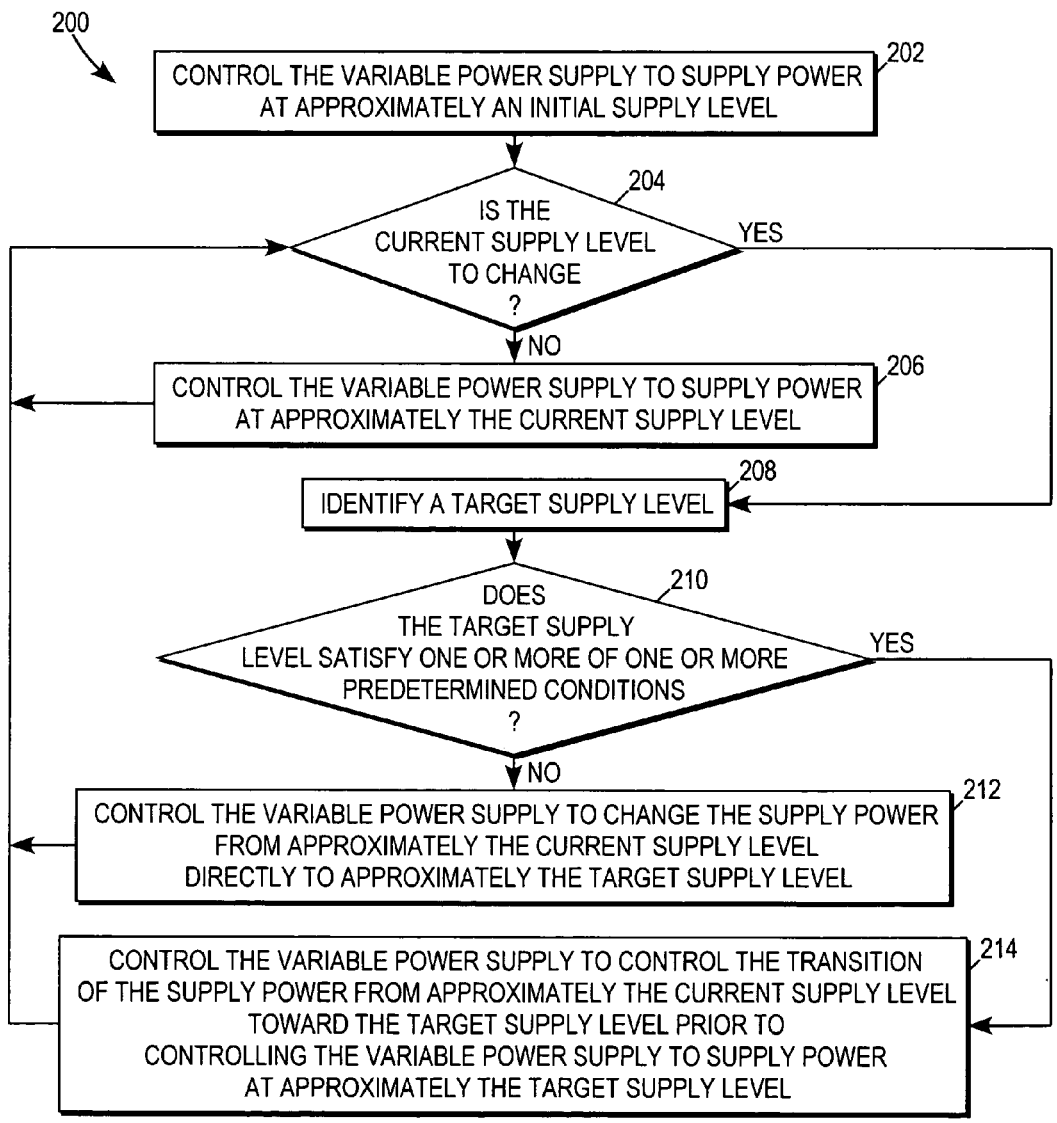

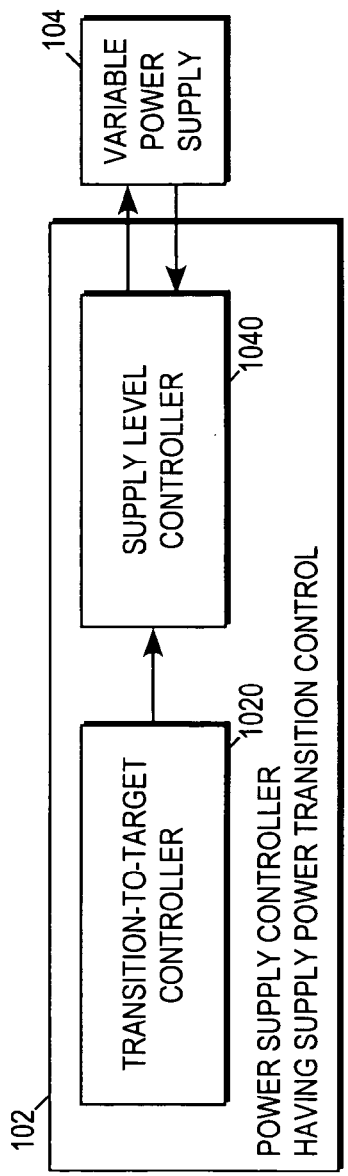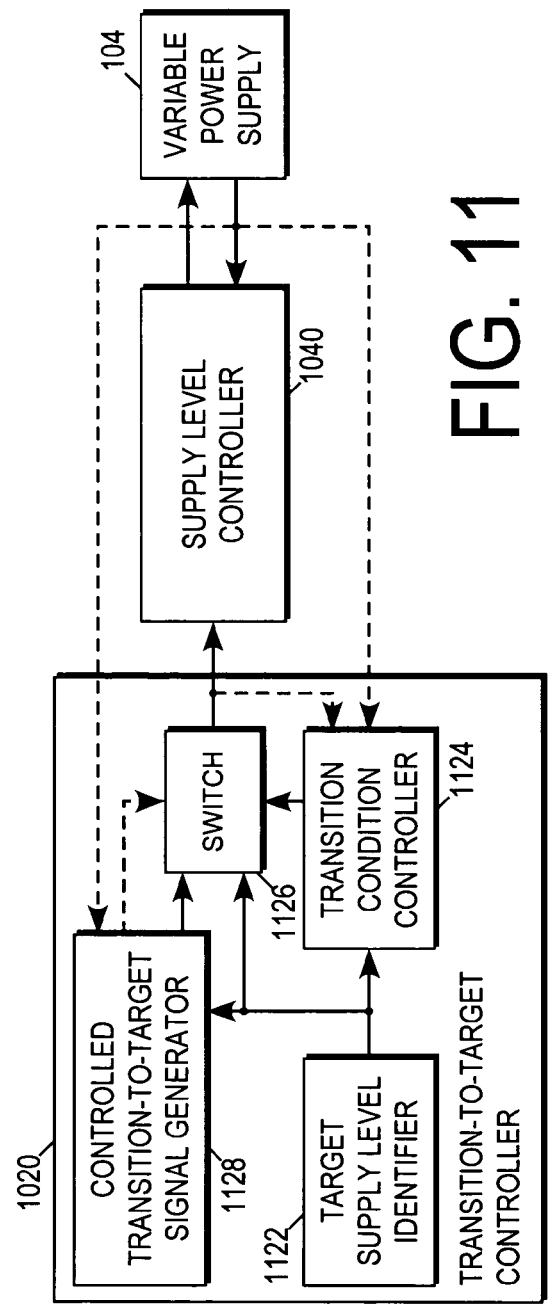

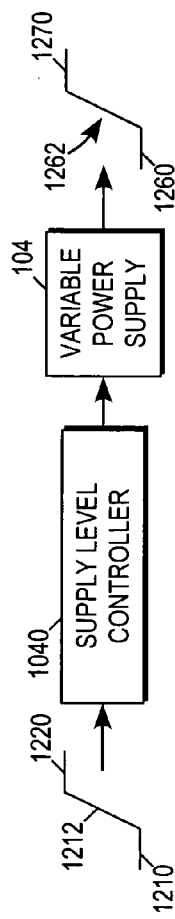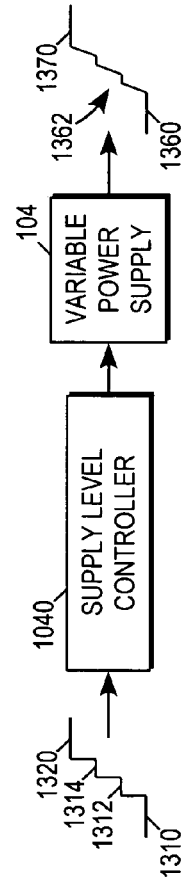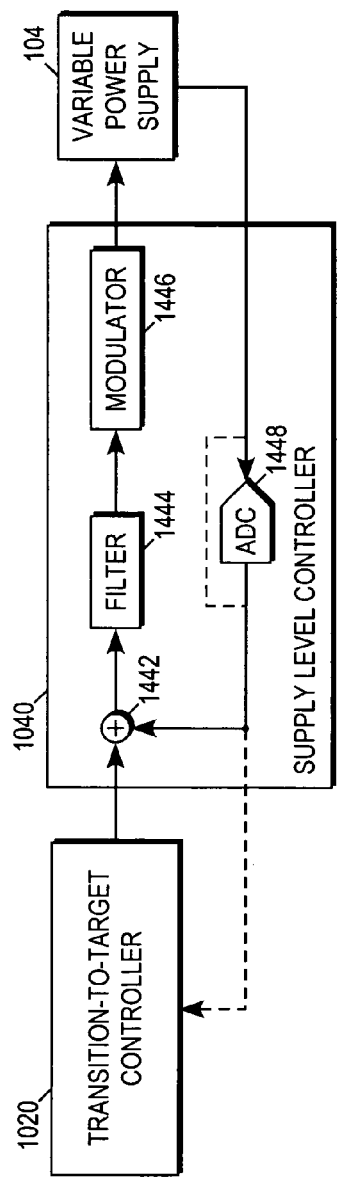

SUPPLY POWER TRANSITION CONTROL

BACKGROUND

1. Field of the Invention

The present invention relates generally to the field of supply power control.

2. Description of Related Art

Subscriber line (or loop) interface circuitry (SLIC) may be found in or near a central office exchange of a telecommunications network.

One SLIC provides a communications interface between a digital switching network for a central office exchange and an analog subscriber line. The analog subscriber line connects to subscriber equipment, such as a subscriber station or telephonic instrument for example, at a location remote from the central office exchange. The analog subscriber line and subscriber equipment form a subscriber loop.

The SLIC detects and transforms voiceband communications transmitted from the subscriber equipment in the form of low voltage analog signals on the subscriber loop into corresponding digital data for transmission to the digital switching network. For bi-directional communication, the SLIC also transforms digital data received from the digital switching network into corresponding low voltage analog signals for transmission on the subscriber loop to the subscriber equipment.

The SLIC typically uses different power supply levels depending on its operation state. The SLIC may use, for example, one supply level when the subscriber equipment is deactivated or on-hook, another supply level when the subscriber equipment is activated or off-hook, and yet another supply level to signal or ring the subscriber equipment for call progress.

The SLIC may be supplied with power at a fixed or constant supply level sufficient to meet the maximum amount of power to be used by the SLIC. The SLIC, however, would then unnecessarily waste power when the SLIC is in an operation state that uses less power than that supplied to the SLIC. The SLIC would also have to be designed to dissipate a maximum possible amount of wasted power to account for times when the SLIC uses minimum amounts of power.

One SLIC controls a direct-current to direct-current (DC-DC) converter to supply power to the SLIC at different voltage levels. The SLIC may then help reduce or minimize any excess power by helping to control the DC-DC converter to change the voltage supplied to the SLIC as the SLIC changes its power usage. A change in supply voltage from one voltage level to another, however, may cause a current overshoot or surge in the SLIC. For relatively fast and/or larger voltage level changes, an attendant current surge may place a high level of stress on and/or damage one or more circuit components of the SLIC. The SLIC may be designed with components that can better withstand such current surges and/or may be designed with improved current overshoot protection circuitry. Such design considerations, however, may add to the cost, size, and/or complexity of the SLIC.

SUMMARY

One disclosed method comprises controlling a variable power supply to supply power at approximately a first supply level for an electronic device, identifying a second supply level to be supplied for the electronic device, and, in response to identifying the second supply level, controlling the variable power supply to control a transition of the power from approximately the first supply level toward the second supply level prior to controlling the variable power supply to supply power at approximately the second supply level for the electronic device.

One disclosed electronic device comprises a supply level controller coupled to control a variable power supply to supply power at a supply level for the electronic device and a transition-to-target controller coupled to control the supply level controller to control the variable power supply to supply power at approximately a first supply level for the electronic device and to control the variable power supply to control a transition of the power from approximately the first supply level toward a second supply level prior to controlling the variable power supply to supply power at approximately the second supply level for the electronic device.

One disclosed apparatus comprises means for controlling a variable power supply to supply power at approximately a first supply level for an electronic device and means for controlling the variable power supply to control a transition of the power from approximately the first supply level toward a second supply level prior to controlling the variable power supply to supply power at approximately the second supply level for the electronic device.

BRIEF DESCRIPTION OF THE DRAWINGS

One or more embodiments of the present invention are illustrated by way of example and not limitation in the figures of the accompanying drawings, in which like references indicate similar elements and in which:

FIG. 1 illustrates, for one embodiment, a block diagram of an electronic device comprising a power supply controller having supply power transition control to control a variable power supply to supply power to the electronic device;

FIG. 2 illustrates, for one embodiment, a flow diagram to control the supply of power from a variable power supply using supply power transition control;

FIG. 10 illustrates, for one embodiment, a functional block diagram for a power supply controller having supply power transition control to control a variable power supply;

FIG. 11 illustrates, for one embodiment, a functional block diagram for a transition-to-target controller for the power supply controller having supply power transition control of FIG. 10;

FIG. 12 illustrates, for one embodiment, the control of a transition of supply power from approximately a current supply level to approximately a target supply level with an example analog controlled transition control signal;

FIG. 13 illustrates, for one embodiment, the control of a transition of supply power from approximately a current supply level to approximately a target supply level with one or more example digital controlled transition control signals;

FIG. 14 illustrates, for one embodiment, a functional block diagram for a supply level controller for the power supply controller having supply power transition control of FIG. 10;

DETAILED DESCRIPTION

Figure 3:
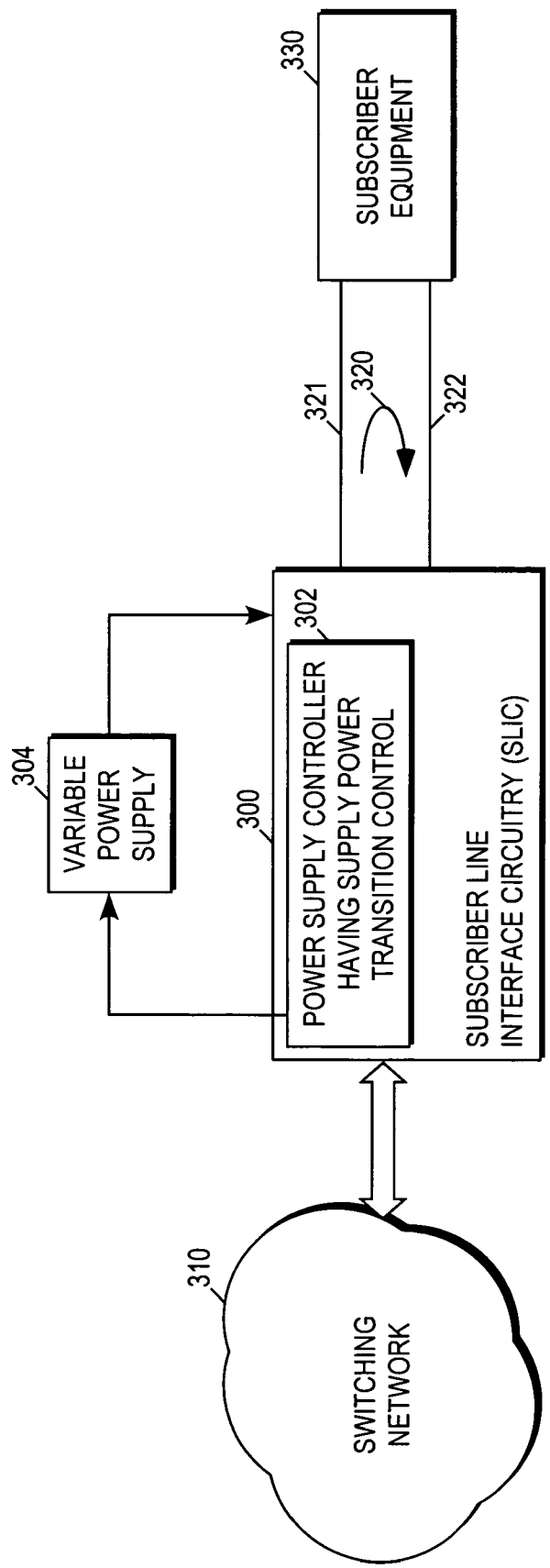
FIG. 3 illustrates, for one embodiment, a block diagram of subscriber line interface circuitry (SLIC) comprising a power supply controller having supply power transition control in an example environment.

The following detailed description sets forth an embodiment or embodiments for supply power transition control and for power supply control using dynamic controller parameter(s).

Supply Power Transition Control

FIG. 1 illustrates, for one embodiment, an electronic device 100 comprising a power supply controller 102 having supply power transition control. Power supply controller 102 controls a variable power supply 104 dynamically to supply power to electronic device 100 at different supply levels. Power supply controller 102 for one embodiment may control variable power supply 104 at a given time to supply power to electronic device 100 at a reduced or minimized supply level that may depend, for example, on the amount of power to be used by electronic device 100 at that time. Electronic device 100 may therefore be designed to less stringent power dissipation requirements.

In controlling variable power supply 104 to change the power supplied to electronic device 100 from approximately a current supply level to approximately a target supply level, power supply controller 102 may control the transition from approximately the current supply level to approximately the target supply level in any suitable manner. Power supply controller 102 for one embodiment may control variable power supply 104 to change supply levels at a relatively slower rate to help avoid, reduce, or minimize a power surge that could otherwise place a high level of stress on and/or damage one or more circuit components of electronic device 100. Electronic device 100 for one embodiment may then be designed with reduced or minimized concern for power overshoot protection circuitry, helping to reduce the cost, size, and/or complexity of electronic device 100. Electronic device 100 for one embodiment may also be designed with reduced or minimized concern for the ability of one or more components to withstand increased power surges, helping to reduce the cost of electronic device 100.

Power supply controller 102 may control variable power supply 104 to supply power to electronic device 100 using supply power transition control in any suitable manner. Power supply controller 102 for one embodiment may control variable power supply 104 in accordance with a flow diagram 200 of FIG. 2.

For block 202 of FIG. 2, power supply controller 102 controls variable power supply 104 to supply power to electronic device 100 at approximately an initial supply level. Power supply controller 102 may control variable power supply 104 to supply power to electronic device 100 at approximately any suitable initial supply level.

If electronic device 100 is to continue using the current supply level of power supplied by variable power supply 104 for block 204, power supply controller 102 for one embodiment may control variable power supply 104 for block 206 to continue supplying power at approximately the current supply level. For one embodiment where variable power supply 104 may continue supplying power at approximately the current supply level without requiring continuous or repeated control by power supply controller 102, power supply controller 102 may not perform operations for block 206.

When electronic device 100 is to be supplied a different supply level of power by variable power supply 104 for block 204, power supply controller 102 identifies for block 208 a target supply level of power to be supplied by variable power supply 104.

If the target supply level does not satisfy one or more of one or more predetermined conditions for block 210, power supply controller 102 for block 212 may control variable power supply 104 to change the supply power from approximately the current supply level directly to approximately the target supply level.

If the target supply level does satisfy one or more of one or more predetermined conditions for block 210, power supply controller 102 for block 214 may control variable power supply 104 to control the transition of the supply power from approximately the current supply level toward the target supply level prior to controlling variable power supply 104 to supply power at approximately the target supply level. Power supply controller 102 may control variable power supply 104 to control the transition of the supply power from approximately the current supply level toward the target supply level and to supply power at approximately the target supply level in any suitable manner.

Power supply controller 102 may identify whether the target supply level satisfies one or more of any suitable one or more predetermined conditions. One or more predetermined conditions for one embodiment may be programmable.

Power supply controller 102 for one embodiment may identify whether the target supply level is for one of any predetermined different operation states for a current operation state of electronic device 100. In this manner, power supply controller 102 for one embodiment may control the transition of supply power for predetermined transitions between different operation states of electronic device 100.

Power supply controller 102 for one embodiment may identify whether the difference between the target supply level and the current supply level satisfies one or more of one or more predetermined relationships with one or more thresholds. In this manner, power supply controller 102 for one embodiment may control, for example, larger supply power transitions.

Power supply controller 102 for one embodiment may identify whether the target supply level satisfies one or more of one or more predetermined relationships with one or more supply level ranges. In this manner, power supply controller 102 for one embodiment may control the transition of supply power for predetermined transitions between different supply level ranges.

Power supply controller 102 for one embodiment for block 210 may identify whether the target supply level is for one of any predetermined different operation states for a current operation state of electronic device 100, whether the difference between the target supply level and the current supply level satisfies one or more of one or more predetermined relationships with one or more thresholds, and/or whether the target supply level satisfies one or more of one or more predetermined relationships with one or more supply level ranges. In this manner, power supply controller 102 for one embodiment may control, for example, the transition of supply power between supply levels for predetermined transitions between different operation states of electronic device 100 and a larger supply power transition for the same operation state of electronic device 100.

When electronic device 100 is to be supplied a different supply level of power by variable power supply 104 again for block 204, power supply controller 102 identifies for block 208 a new target supply level of power to be supplied by variable power supply 104 and controls variable power supply 104 to change the supply power from approximately the current supply level to approximately the new target supply level in accordance with block 210 and block 212 or 214.

Power supply controller 102 may perform operations for blocks 202–214 in any suitable order and may or may not overlap in time the performance of any suitable operation with any other suitable operation. Power supply controller 102 for one embodiment may, for example, identify that the current supply level is to change for block 204 by identifying that a predetermined condition has been satisfied for block 210. As another example, power supply controller 102 for one embodiment may identify that a predetermined condition has been satisfied for block 210 prior to identifying the target supply level for block 208.

Power supply controller 102 for another embodiment may not perform operations for blocks 210 and 212 and may therefore perform operations for block 214 for each transition to a new target supply level.

Electronic device 100 may comprise any suitable circuitry to perform any suitable one or more functions that may use different supply power levels. Electronic device 100 for one embodiment may comprise subscriber line interface circuitry (SLIC), for example. Electronic device 100 for one embodiment may comprise, for example, a ringer, such as a bulk ringer for example. Electronic device 100 for one embodiment may comprise a satellite tuner, for example.

SLIC Having Supply Power Transition Control

FIG. 3 illustrates, for one embodiment, subscriber line interface circuitry (SLIC) 300 in an example environment.

As illustrated in FIG. 3, SLIC 300 comprises a power supply controller 302 having supply power transition control to control a variable power supply 304 to supply power to SLIC 300. SLIC 300, power supply controller 302, and variable power supply 304 generally correspond to electronic device 100, power supply controller 102, and variable power supply 104 of FIG. 1.

SLIC 300 for one embodiment may provide a communications interface between a switching network 310 and a subscriber loop 320 having subscriber equipment 330. Switching network 310 for one embodiment may be a digital switching network for a larger telecommunications network, such as the Public Switched Telephone Network (PSTN). SLIC 300 may be used for any suitable application such as, for example, wireless local loop (WLL); digital subscriber line (DSL), coder/decoder (codec), and/or wireless voice-over-broadband systems; cable telephony; private branch exchange (PBX), Internet protocol PBX (IP-PBX), and/or key telephone systems; Integrated Services Digital Network (ISDN), Ethernet, and/or Universal Serial Bus (USB) terminal adapters; and/or Integrated Voice and Data (IVD) systems.

Subscriber loop 320 for one embodiment, as illustrated in FIG. 3, is defined by a first line 321, a second line 322, and subscriber equipment 330. For one embodiment where SLIC 300 provides an analog telephone interface, first line 321 is called a tip line and second line 322 is called a ring line.

Subscriber equipment 330 is electrically coupled to first line 321 and second line 322 and may comprise any suitable number of devices comprising any suitable circuitry to communicate with SLIC 300 in any suitable manner. Subscriber equipment 330 for one embodiment may comprise any suitable customer premises equipment (CPE). SLIC 300 and subscriber equipment 330 for one embodiment may transmit and/or receive any suitable analog signals. For one embodiment, subscriber equipment 330 may comprise one or more analog telephonic devices. For one embodiment, subscriber equipment 330 may comprise one or more analog telephones.

SLIC 300 for one embodiment may receive communications in the form of signals on subscriber loop 320 from subscriber equipment 330 and forward the received signals or transform and transmit the received signals to switching network 310. SLIC 300 for one embodiment may receive communications in the form of signals from switching network 310 and forward the received signals or transform and transmit the received signals on subscriber loop 320 to subscriber equipment 330.

For one embodiment where SLIC 300 provides an analog telephone interface to subscriber loop 320 and where switching network 310 is a digital switching network, SLIC 300 may receive voiceband communications transmitted from subscriber equipment 330 in the form of low voltage analog signals on subscriber loop 320 and transform them into corresponding digital data signals for transmission to switching network 310. For bi-directional communication, SLIC 300 may transform digital data signals received from switching network 310 into corresponding low voltage analog signals for transmission on subscriber loop 320 to subscriber equipment 330.

SLIC 300 for one embodiment may also transmit on subscriber loop 320 to subscriber equipment 330 and/or receive on subscriber loop 320 from subscriber equipment 330 any suitable data and/or control signals.

SLIC 300 for one embodiment may comprise any suitable circuitry to perform any suitable one or more BORSCHT functions and/or any other suitable one or more functions.

BORSCHT is an acronym for battery feed, overvoltage protection, ring, supervision, coder/decoder (codec), hybrid, and test.

SLIC 300 may perform the battery feed function, for example, to provide power to subscriber equipment 330 on subscriber loop 320. SLIC 300 for one embodiment may receive power from variable power supply 304 to provide power over subscriber loop 320.

SLIC 300 may perform the overvoltage protection function, for example, to protect any circuitry in or coupled to switching network 310 against voltage transients that may occur on subscriber loop 320.

SLIC 300 may perform the ring function, for example, to signal subscriber equipment 330 for call progress. For one embodiment where subscriber equipment 330 comprises a conventional telephone, for example, SLIC 300 may use the ring function to ring the telephone.

SLIC 300 may perform the supervision function, for example, to detect service requests. SLIC 300 for one embodiment may perform the supervision function to detect when subscriber equipment 330 is activated on subscriber loop 320. For one embodiment where subscriber equipment 330 comprises a conventional telephone, for example, SLIC 300 may detect when the telephone is switched off-hook. SLIC 300 for one embodiment may also perform the supervision function, for example, to supervise calls in progress and to detect dialing input signals.

SLIC 300 may perform the codec function, for example, to encode data signals in a manner suitable for transmission by switching network 310 and to decode data signals received from switching network 310. SLIC 300 for one embodiment may use pulse code modulation (PCM), for example, to encode voiceband data signals, for example.

SLIC 300 may perform the hybrid function, for example, to adapt two-wire signaling, for example, for subscriber loop 320 into separate transmit and receive signaling, for example, for switching network 310.

SLIC 300 may perform the test function, for example, to test for faults and/or to indicate faults that may exist in subscriber loop 320 and/or in SLIC 300 itself.

Transition Control Based on Operation States

Power supply controller 102 for one embodiment may control variable power supply 104 to supply power to electronic device 100 using supply power transition control based at least in part on an operation state in which electronic device 100 is to operate or is operating. Power supply controller 102 for one embodiment may control variable power supply 104 in accordance with a flow diagram 400 of FIG. 4. Blocks 402–414 of FIG. 4 generally correspond to blocks 202–214 of FIG. 2, respectively.

Figure 4:
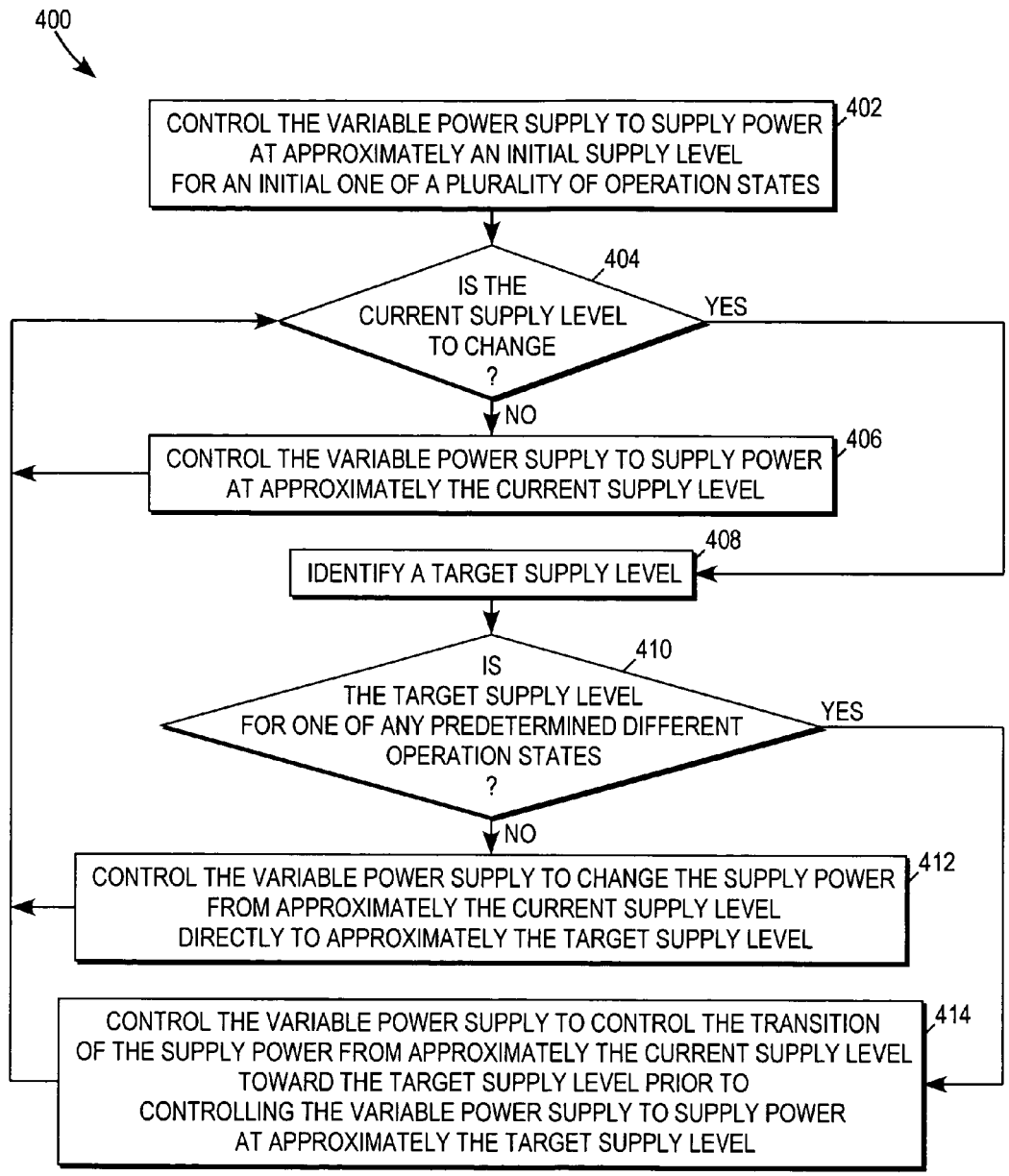
FIG. 4 illustrates, for one embodiment, a flow diagram to control the supply of power from a variable power supply using supply power transition control.

For block 402 of FIG. 4, power supply controller 102 controls variable power supply 104 to supply power to electronic device 100 at approximately an initial supply level for an initial one of a plurality of operation states for electronic device 100. Power supply controller 102 may control variable power supply 104 to supply power to electronic device 100 at any suitable supply level for any suitable initial one of any suitable operation states. The operation states for electronic device 100 may be defined in any suitable manner. One or more operation states for electronic device 100 for one embodiment may be programmable.

For one embodiment where SLIC 300 is used, SLIC 300 may have at least an on-hook, a ringing, and/or an off-hook operation state. The on-hook operation state corresponds to the operation of SLIC 300 while subscriber equipment 330 is deactivated. The ringing operation state corresponds to the operation of SLIC 300 to signal subscriber equipment 330 for call progress. The off-hook operation state corresponds to the operation of SLIC 300 while subscriber equipment 330 is activated. Power supply controller 302 for one embodiment for block 402 may control variable power supply 304 to supply power at a suitable supply level for the on-hook operation state.

SLIC 300 for one embodiment may have at least an open, a forward on-hook transmission, a reverse on-hook transmission, a ringing, a forward active, a reverse active, a tip line open, and/or a ring line open operation state.

The open operation state corresponds to SLIC 300 tri-stating both lines 321 and 322 of subscriber loop 320, for example, in the presence of fault conditions on subscriber loop 320 and/or to generate open switch intervals (OSIs).

The forward on-hook transmission operation state corresponds to SLIC 300 providing a linefeed on subscriber loop 320 with a voltage signal on line 321 greater than that on line 322 (e.g., $V_{TIP} > V_{RING}$) while audio signal paths may be activated to provide data transmission during an on-hook loop condition.

The reverse on-hook transmission operation state corresponds to SLIC 300 providing a linefeed on subscriber loop 320 with a voltage signal on line 322 greater than that on line 321 (e.g., $V_{RING} > V_{TIP}$) while audio signal paths may be activated to provide data transmission during an on-hook loop condition.

The ringing operation state corresponds to SLIC 300 driving ringing waveforms onto subscriber loop 320.

The forward active operation state corresponds to SLIC 300 providing a linefeed on subscriber loop 320 with a voltage signal on line 321 greater than that on line 322 (e.g., $V_{TIP} > V_{RING}$) while audio signal paths are activated.

The reverse active operation state corresponds to SLIC 300 providing a linefeed on subscriber loop 320 with a voltage signal on line 322 greater than that on line 321 (e.g., $V_{RING} > V_{TIP}$) while audio signal paths are activated.

The tip line open operation state corresponds to SLIC 300 tri-stating line 321 and providing an active linefeed on line 322 for ground start operation.

The ring line open operation state corresponds to SLIC 300 tri-stating line 322 and providing an active linefeed on line 321.

Power supply controller 302 for one embodiment for block 402 may control variable power supply 304 to supply power at a suitable supply level for the open operation state.

If electronic device 100 is to continue using the current supply level of power supplied by variable power supply 104 for block 404, power supply controller 102 for one embodiment may control variable power supply 104 for block 406 to continue supplying power at approximately the current supply level. For one embodiment where variable power supply 104 may continue supplying power at approximately the current supply level without requiring continuous or repeated control by power supply controller 102, power supply controller 102 may not perform operations for block 406.

When electronic device 100 is to be supplied a different supply level of power by variable power supply 104 for block 404, power supply controller 102 identifies for block 408 a target supply level of power to be supplied by variable power supply 104.

For block 410, power supply controller 102 identifies whether the target supply level is for one of any predetermined different operation states for the current operation state of electronic device 100. Power supply controller 102 may identify whether the target supply level is for one of any suitable one or more predetermined different operation states of electronic device 100.

Power supply controller 102 for one embodiment may identify whether the target supply level is for any operation state different from the current operation state or alternatively is not for the current operation state.

Power supply controller 102 for one embodiment may identify whether the target supply level is for one of any first predetermined different operation states for the current operation state or alternatively is not for the current operation state and is not for one of any second predetermined different operation states exclusive of any first predetermined different operation states for the current operation state. The identity of any first and/or second predetermined different operation states for a given operation state for one embodiment may be predetermined. The identity of any first and/or second predetermined different operation states for a given operation state for one embodiment may be programmable.

Power supply controller 102 for one embodiment may identify whether the target supply level is for one of any first predetermined different operation states for the current operation state to help identify whether the current supply level is to increase in magnitude by an amount that could place a high level of stress on and/or damage one or more circuit components of electronic device 100 if power supply controller 102 changed the current supply level directly to the target supply level.

If the target supply level is not for one of any predetermined different operation states for block 410, power supply controller 102 for block 412 may control variable power supply 104 to change the supply power from approximately the current supply level directly to approximately the target supply level.

If the target supply level is for one of any predetermined different operation states for block 410, power supply controller 102 for block 414 may control variable power supply 104 to control the transition of the supply power from approximately the current supply level toward the target supply level prior to controlling variable power supply 104 to supply power at approximately the target supply level.

When electronic device 100 is to be supplied a different supply level of power by variable power supply 104 again for block 404, power supply controller 102 identifies for block 408 a new target supply level of power to be supplied by variable power supply 104 and controls variable power supply 104 to change the supply power from approximately the current supply level to approximately the new target supply level in accordance with block 410 and block 412 or 414.

Power supply controller 102 may perform operations for blocks 402–414 in any suitable order and may or may not overlap in time the performance of any suitable operation with any other suitable operation. Power supply controller 102 for one embodiment may, for example, identify that the current supply level is to change for block 404 by identifying that electronic device 100 has changed or is to change operation states for block 410. As another example, power supply controller 102 for one embodiment may identify that electronic device 100 has changed or is to change operation states for block 410 prior to identifying the target supply level for block 408.

Power supply controller 102 for another embodiment may not perform operations for blocks 410 and 412 and may therefore perform operations for block 414 for each transition to a new target supply level.

Analog Transition Control

Power supply controller 102 for one embodiment may comprise any suitable circuitry to provide for analog control in controlling variable power supply 104 to control the transition of supply power from approximately a current supply level toward a target supply level. Power supply controller 102 may control variable power supply 104 in any suitable manner to help control the transition of supply power in accordance with any suitable signal shape, such as a generally linear ramp signal of any suitable slope, a generally parabolic shaped signal, or a generally S-shaped signal for example.

Figure 5:
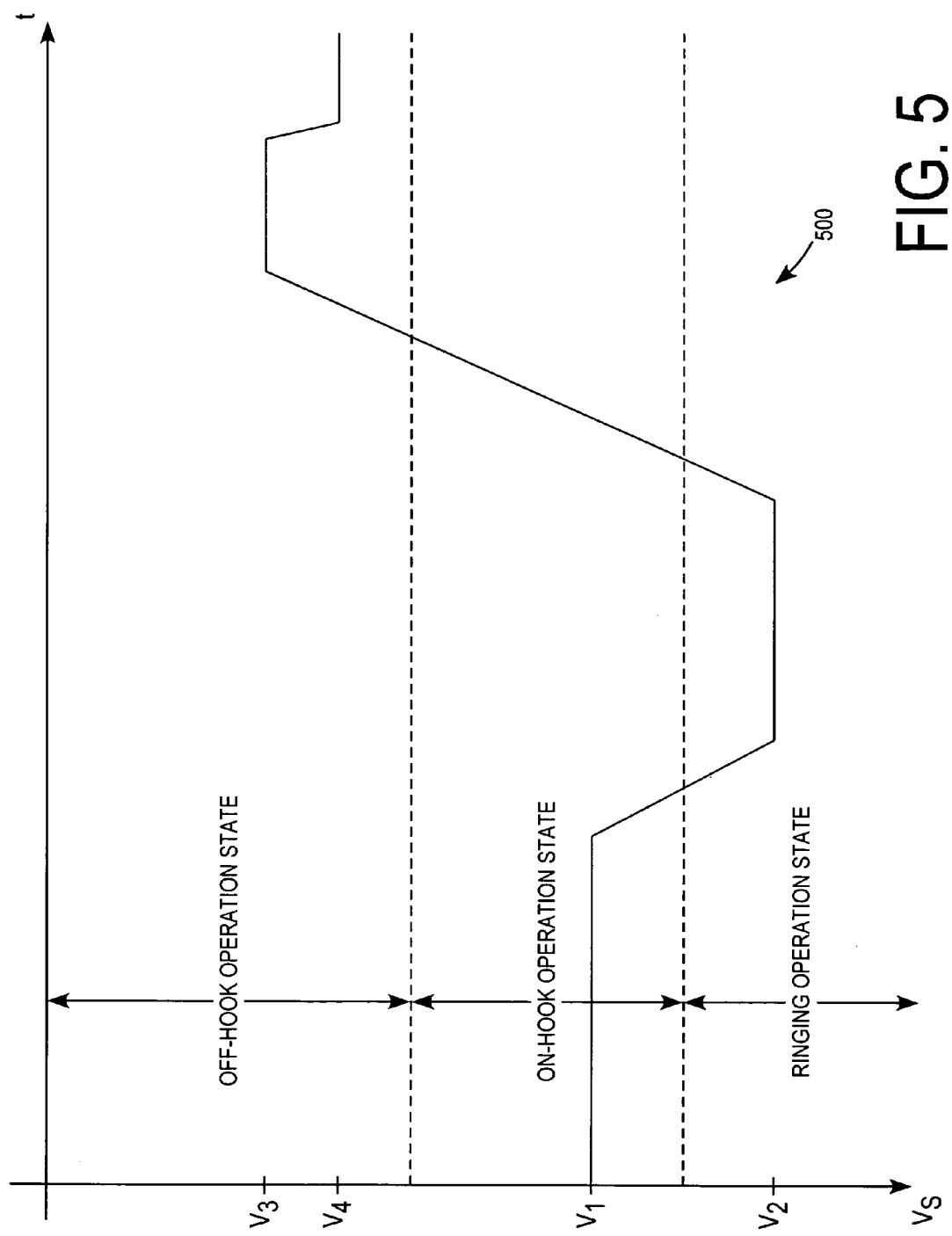
FIG. 5 illustrates, for one embodiment, an example graph of analog transition control of a supply voltage by the SLIC of FIG. 3.

As one example for one embodiment where SLIC 300 of FIG. 3 is used, power supply controller 302 may provide for analog control to ramp the supply power at a controlled rate from approximately a current supply level toward a target supply level for block 414 of FIG. 4 in controlling variable power supply 304 in accordance with flow diagram 400 of FIG. 4. FIG. 5 illustrates an example graph 500 of how power supply controller 302 may control variable power supply 304 in this manner.

As illustrated in FIG. 5, power supply controller 302 controls variable power supply 304 to supply a supply voltage $V_S$ at approximately a current supply voltage level $V_1$ while SLIC 300 is in an on-hook operation state.

SLIC 300 then changes or is to change to a ringing operation state. Because the current supply voltage level $V_1$ is to change for block 404 of FIG. 4 in connection with the change to the ringing operation state, power supply controller 302 identifies for block 408 a target supply voltage level $V_2$ and identifies for block 410 that the ringing operation state is a predetermined different operation state for which the transition of the supply voltage $V_S$ to the target supply voltage level $V_2$ is to be controlled in changing from the on-hook operation state. Power supply controller 302 therefore controls variable power supply 304 for block 414 to ramp the supply voltage $V_S$ at a controlled rate from approximately the current supply voltage level $V_1$ toward the target supply voltage level $V_2$ prior to controlling variable power supply 304 to supply the supply voltage $V_S$ at approximately the target supply voltage level $V_2$.

SLIC 300 then changes or is to change to an off-hook operation state. Because the current supply voltage level $V_2$ is to change for block 404 of FIG. 4 in connection with the change to the off-hook operation state, power supply controller 302 identifies for block 408 a target supply voltage level $V_3$ and identifies for block 410 that the off-hook operation state is a predetermined different operation state for which the transition of the supply voltage $V_S$ to the target supply voltage level $V_3$ is to be controlled in changing from the ringing operation state. Power supply controller 302 therefore controls variable power supply 304 for block 414 to ramp the supply voltage $V_S$ at a controlled rate from approximately the current supply voltage level $V_2$ toward the target supply voltage level $V_3$ prior to controlling variable power supply 304 to supply the supply voltage $V_S$ at approximately the target supply voltage level $V_3$.

SLIC 300 is then to be supplied a supply voltage $V_S$ at a supply voltage level $V_4$ while in the off-hook operation state. Because the current supply voltage level $V_3$ is to change for block 404 of FIG. 4, power supply controller 302 identifies for block 408 the target supply voltage level $V_4$ and identifies for block 410 that SLIC 300 has not changed or is not to change operation states. Power supply controller 302 therefore controls variable power supply 304 for block 412 to change the supply voltage $V_S$ from approximately the current supply voltage level $V_3$ directly to approximately the target supply voltage level $V_4$ without controlling the transition from approximately the current supply voltage level $V_3$ to approximately the target supply voltage level $V_4$.

Digital Transition Control

Power supply controller 102 for one embodiment may comprise any suitable circuitry to provide for digital control in controlling variable power supply 104 to control the transition of supply power from approximately a current supply level toward a target supply level. Power supply controller 102 may control variable power supply 104 in any suitable manner to help control the transition of supply power to approximate any suitable signal shape, such as a generally linear ramp signal of any suitable slope, a generally parabolic shaped signal, or a generally S-shaped signal for example. Power supply controller 102 for one embodiment may control variable power supply 104 to change the supply power to approximately any suitable one or more intermediate supply levels between the current supply level and the target supply level prior to changing the supply power to the target supply level.

Figure 6:
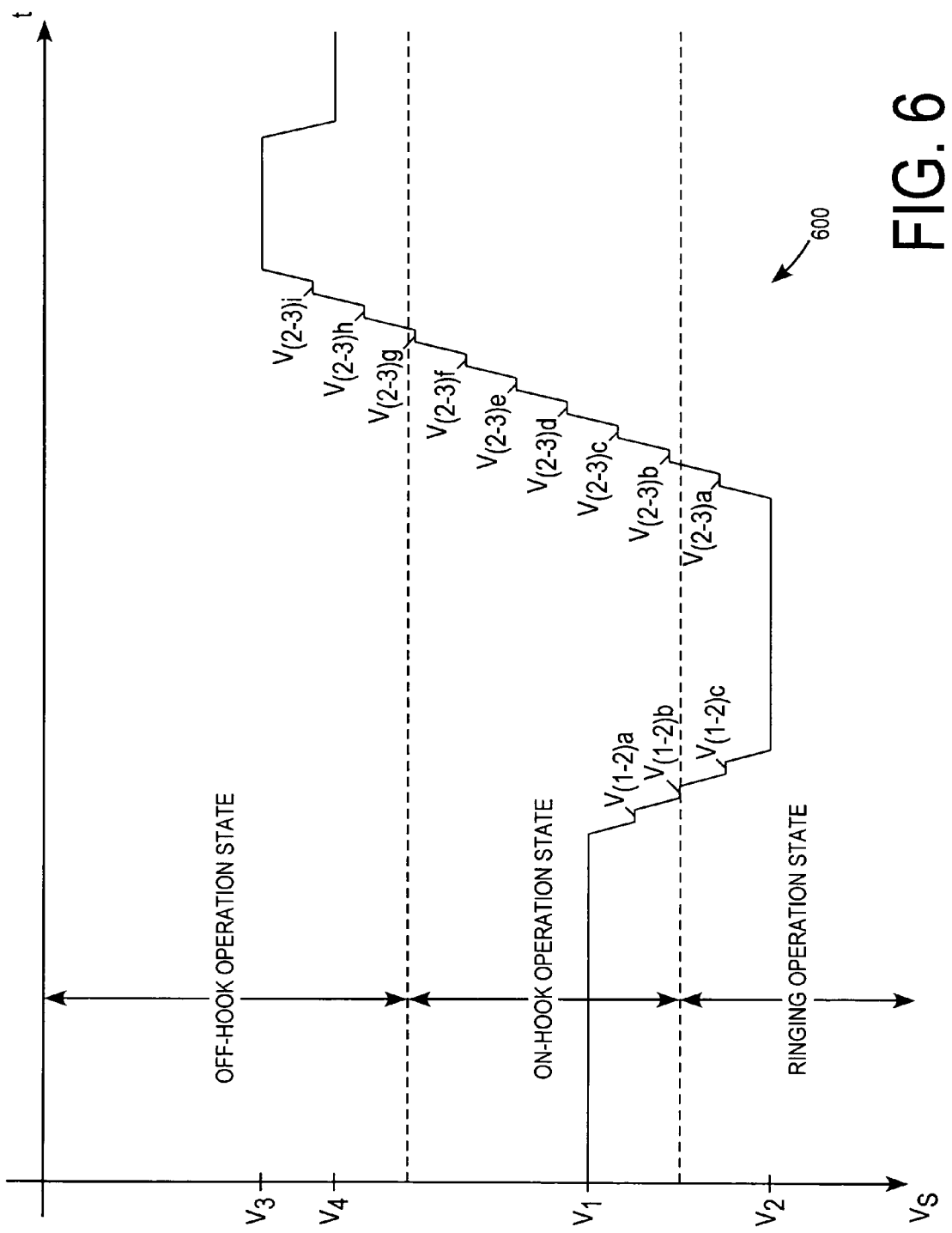
FIG. 6 illustrates, for one embodiment, an example graph of digital transition control of a supply voltage by the SLIC of FIG. 3.

As one example for one embodiment where SLIC 300 of FIG. 3 is used, power supply controller 302 may provide for digital control to approximate a ramp of the supply power at a controlled rate from approximately a current supply level toward a target supply level for block 414 of FIG. 4 in controlling variable power supply 304 in accordance with flow diagram 400 of FIG. 4. FIG. 6 illustrates an example graph 600 of how power supply controller 302 may control variable power supply 304 in this manner.

Graph 600 of FIG. 6 generally corresponds to graph 500 of FIG. 5 only power supply controller 302 provides for digital transition control for block 414 of FIG. 4.

To control the transition from approximately the supply voltage level $V_1$ to approximately the supply voltage level $V_2$, as illustrated in FIG. 6, power supply controller 302 controls variable power supply 304 to change the supply voltage $V_S$ from approximately the supply voltage level $V_1$ to approximately an intermediate supply voltage level $V_{(1-2)a}$, then to approximately an intermediate supply voltage level $V_{(1-2)b}$, then to approximately an intermediate supply voltage level $V_{(1-2)c}$, and then to approximately the supply voltage level $V_2$.

To control the transition from approximately the supply voltage level $V_2$ to approximately the supply voltage level $V_3$, as illustrated in FIG. 6, power supply controller 302 controls variable power supply 304 to change the supply voltage $V_S$ from approximately the supply voltage level $V_2$ to approximately an intermediate supply voltage level $V_{(2-3)a}$, then to approximately an intermediate supply voltage level $V_{(2-3)b}$, then to approximately an intermediate supply voltage level $V_{(2-3)c}$, then to approximately an intermediate supply voltage level $V_{(2-3)d}$, then to approximately an intermediate supply voltage level $V_{(2-3)e}$, then to approximately an intermediate supply voltage level $V_{(2-3)f}$, then to approximately an intermediate supply voltage level $V_{(2-3)g}$, then to approximately an intermediate supply voltage level $V_{(2-3)h}$, then to approximately an intermediate supply voltage level $V_{(2-3)i}$, and then to approximately the supply voltage level $V_3$.

Figure 7:
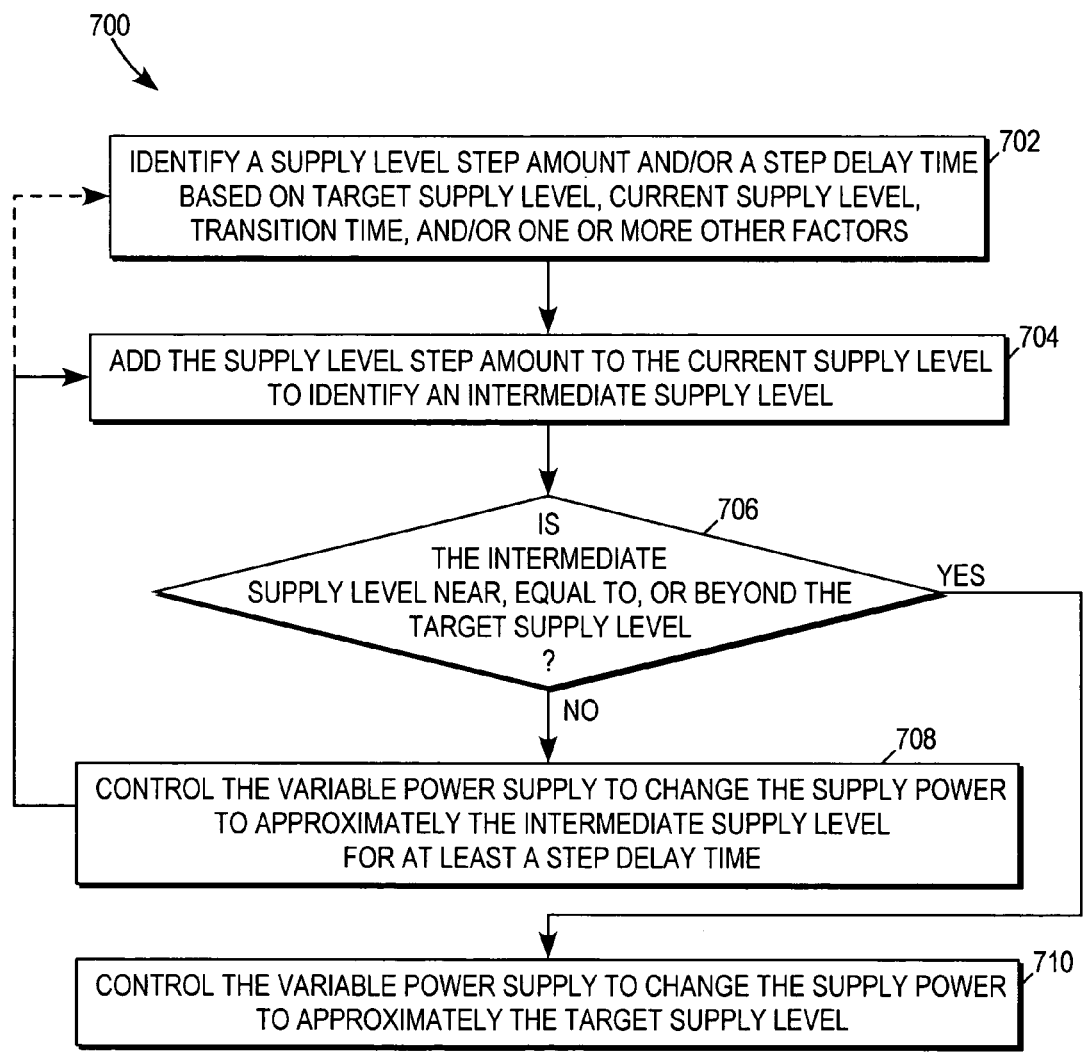
FIG. 7 illustrates, for one embodiment, a flow diagram to control a transition of supply power from approximately a current supply level to approximately a target supply level digitally.

Power supply controller 102 for one embodiment may provide for digital control in controlling variable power supply 104 to control a transition of supply power from approximately a current supply level toward a target supply level in accordance with a flow diagram 700 of FIG. 7.

For block 702 of FIG. 7, power supply controller 102 identifies a supply level step amount and/or a step delay time based on a target supply level, a current supply level, a desired transition time, and/or one or more other factors. Power supply controller 102 may identify a supply level step amount and/or a step delay time based on any suitable one or more factors in any suitable manner. One or more factors to identify a supply level step amount and/or a step delay time for one embodiment may be programmable.

Power supply controller 102 for one embodiment may identify a supply level step amount and/or a step delay time based at least in part on whether the target supply level is greater than or less than the current supply level. Power supply controller 102 for one embodiment may identify a positive supply level step amount if the target supply level is greater than the current supply level and may identify a negative supply level step amount if the target supply level is less than the current supply level.

Power supply controller 102 for one embodiment may use a predetermined positive supply level step amount and a predetermined negative supply level step amount having the same absolute values. In this manner, power supply controller 102 may control variable power supply 104 to increase and decrease the supply power at approximately the same rate when using the same step delay time.

Power supply controller 102 for another embodiment may use a predetermined positive supply level step amount and a predetermined negative supply level step amount having different absolute values. In this manner, power supply controller 102 may control variable power supply 104 to increase and decrease the supply power at generally different rates when using the same or different step delay times.

Power supply controller 102 for one embodiment may identify a supply level step amount and/or a step delay time based at least in part on the current operation state of electronic device 100 and on the operation state of electronic device 100 for the target supply level. In this manner, power supply controller 102 may control variable power supply 104 to increase and decrease the supply power at the same or different rates for different transitions between different operation states.

Power supply controller 102 for one embodiment may identify a supply level step amount and/or a step delay time based at least in part on a current supply level range in which the current supply level resides and on a target supply level range in which the target supply level resides. In this manner, power supply controller 102 may control variable power supply 104 to increase and decrease the supply power at the same or different rates for different transitions between different supply level ranges.

Power supply controller 102 for one embodiment may identify a supply level step amount and/or a step delay time based at least in part on the current supply level and the target supply level. In this manner, power supply controller 102 may control variable power supply 104 to increase and decrease the supply power at the same or different rates for different transitions between different supply levels.

Power supply controller 102 for one embodiment may identify a supply level step amount and/or a step delay time based at least in part on the difference between the target supply level and the current supply level.

Power supply controller 102 for one embodiment may identify a positive difference if the target supply level is greater than the current supply level and identify a positive supply level step amount if the difference is positive. Power supply controller 102 for one embodiment may identify a negative difference if the target supply level is less than the current supply level and identify a negative supply level step amount if the difference is negative.

Power supply controller 102 for one embodiment may divide the difference by a number of steps to identify a supply level step amount. Power supply controller 102 for one embodiment may use a predetermined number of steps. Power supply controller 102 for one embodiment may identify a number of steps based at least in part on the difference, a desired transition time, and/or a step delay time in any suitable manner and divide the difference by that number to identify a supply level step amount. Power supply controller 102 for one embodiment may divide the difference by any suitable number and adjust the quotient in any suitable manner, such as by rounding to a desired resolution for example, to identify a supply level step amount.

Power supply controller 102 for one embodiment may identify a supply level step amount and/or a step delay time based at least in part on a desired transition time.

Power supply controller 102 for one embodiment may divide the desired transition time by a number of steps to identify a step delay time. Power supply controller 102 for one embodiment may use a predetermined number of steps. Power supply controller 102 for one embodiment may identify a number of steps based at least in part on the desired transition time, the difference between the target supply level and the current supply level, and/or a supply level step amount in any suitable manner and divide the desired transition time by that number to identify a step delay time. Power supply controller 102 for one embodiment may divide the desired transition time by any suitable number and adjust the quotient in any suitable manner, such as by rounding to a desired resolution for example, to identify a step delay time.

Power supply controller 102 for one embodiment may identify a supply level step amount as a percentage of the current supply level. Power supply controller 102 for one embodiment may identify a supply level step amount as a predetermined percentage of the current supply level. Power supply controller 102 for one embodiment may identify a percentage of the current supply level in any suitable manner to identify the supply level step amount.

Power supply controller 102 for one embodiment may identify a supply level step amount and/or a step delay time based at least in part on one or more suitable factors to help produce a transient signal resulting from the supply power transition with a desired signal shape, to help optimize the speed of the supply power transition, to help optimize power consumption due to the supply power transition, and/or to help account for noise.

Power supply controller 102 for one embodiment may identify a supply level step amount and/or a step delay time based at least in part on any suitable weighted combination of any suitable factors.

For block 704, power supply controller 102 adds the supply level step amount identified for block 702 to the current supply level to identify an intermediate supply level. If adding a negative supply level step amount to the current supply level, power supply controller 102 is in effect subtracting the absolute value of the supply level step amount from the current supply level.

For block 706, power supply controller 102 identifies whether the intermediate supply level identified for block 704 is near, equal to, or beyond the target supply level. To identify whether the intermediate supply level is near the target supply level, power supply controller 102 for one embodiment may identify whether the intermediate supply level is within a suitable range of one or more supply levels from the target supply level.

If the intermediate supply level identified for block 704 is not near, equal to, or beyond the target supply level, power supply controller 102 may control variable power supply 104 for block 708 to change the supply power to approximately the intermediate supply level for at least a step delay time prior to changing the supply power to approximately another intermediate supply level or to approximately the target supply level. Power supply controller 102 for one embodiment may use for block 708 a predetermined step delay time. Power supply controller 102 for one embodiment may use for block 708 a step delay time identified for block 702.

Power supply controller 102 for one embodiment may then repeat operations for blocks 704, 706, and/or 708 to continue controlling variable power supply 104 to change the supply power by the identified supply level step amount until power supply controller 102 identifies for block 706 an intermediate supply level near, equal to, or beyond the target supply level. Power supply controller 102 for one embodiment may control variable power supply 104 in this manner to help approximate a generally linear ramp transition.

Power supply controller 102 for another embodiment may repeat operations for blocks 702, 704, 706, and/or 708 to identify a new supply level step amount and/or a new step delay time for one or more iterations of block 702 and continue controlling variable power supply 104 to increase or decrease the supply power using newly identified supply level step amount(s) and/or newly identified step delay time(s) until power supply controller 102 identifies for block 706 an intermediate supply level near, equal to, or beyond the target supply level. Power supply controller 102 for one embodiment may control variable power supply 104 in this manner to help control the transition of supply power to approximate any suitable signal shape.

Power supply controller 102 for one embodiment may repeat operations for blocks 702, 704, 706, and/or 708 to identify a new supply level step amount for one or more iterations of block 702 and continue controlling variable power supply 104 to increase or decrease the supply power using newly identified supply level step amount(s) and the same step delay time. Power supply controller 102 for one embodiment may repeat operations for blocks 702, 704, 706, and/or 708 to identify a new step delay time for one or more iterations of block 702 and continue controlling variable power supply 104 to increase or decrease the supply power using the same supply level step amount and newly identified step delay time(s).

For one embodiment where power supply controller 102 identifies a supply level step amount as a percentage of the current supply level, power supply controller 102 for one embodiment may control variable power supply 104 to help approximate a supply power transition having a relatively constant percentage change in supply level.

When power supply controller 102 identifies an intermediate supply level near, equal to, or beyond the target supply level, power supply controller 102 controls variable power supply 104 for block 710 to change the supply power to approximately the target supply level.

Power supply controller 102 for another embodiment for block 706 may identify whether the intermediate supply level identified for block 704 is only near, is only equal to, is only beyond, is only near or equal to, is only near or beyond, or is only equal to or beyond the target supply level. Power supply controller 102 may then control variable power supply 104 to change the supply power to approximately the target supply level for block 710 when the intermediate supply level identified for block 704 is near, equal to, beyond, near or equal to, near or beyond, or equal to or beyond the target supply level, respectively.

Power supply controller 102 may perform operations for blocks 702–710 in any suitable order and may or may not overlap in time the performance of any suitable operation with any other suitable operation. Power supply controller 102 for one embodiment may, for example, identify any and all intermediate supply levels prior to performing operations for blocks 706 and 708. Power supply controller 102 may then repeat operations for blocks 706 and 708 for each identified intermediate supply level.

Transition Control Based on Supply Level Difference

Power supply controller 102 for one embodiment may control variable power supply 104 to supply power to electronic device 100 using supply power transition control based at least in part on the difference between a current supply level and a target supply level. Power supply controller 102 for one embodiment may control variable power supply 104 in accordance with a flow diagram 800 of FIG. 8. Blocks 802–814 of FIG. 8 generally correspond to blocks 202–214 of FIG. 2, respectively.

Figure 8:
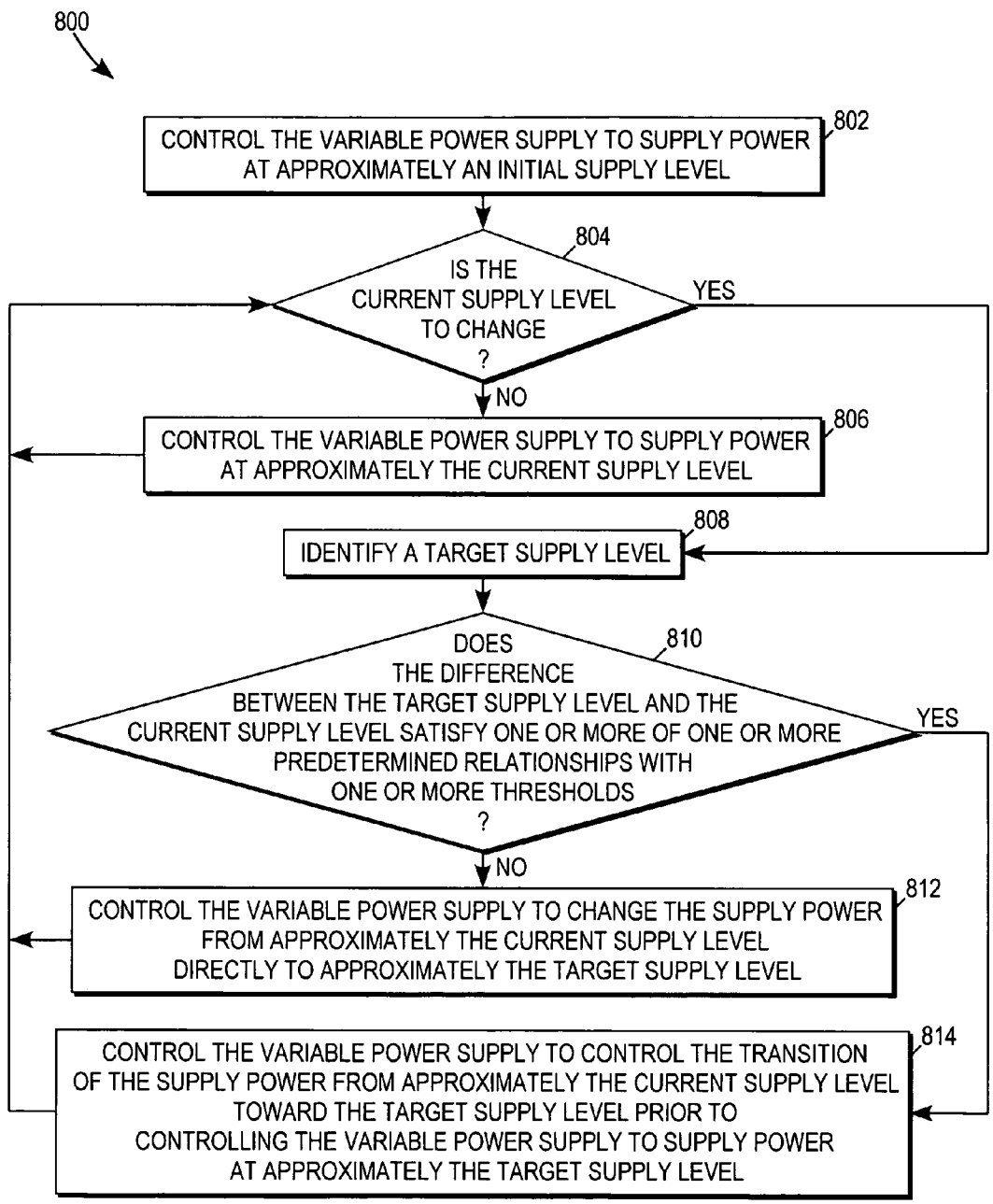
FIG. 8 illustrates, for one embodiment, a flow diagram to control the supply of power from a variable power supply using supply power transition control.

For block 802 of FIG. 8, power supply controller 102 controls variable power supply 104 to supply power to electronic device 100 at approximately an initial supply level. Power supply controller 102 may control variable power supply 104 to supply power to electronic device 100 at any suitable initial supply level.

If electronic device 100 is to continue using the current supply level of power supplied by variable power supply 104 for block 804, power supply controller 102 for one embodiment may control variable power supply 104 for block 806 to continue supplying power at approximately the current supply level. For one embodiment where variable power supply 104 may continue supplying power at approximately the current supply level without requiring continuous or repeated control by power supply controller 102, power supply controller 102 may not perform operations for block 806.

When electronic device 100 is to be supplied a different supply level of power by variable power supply 104 for block 804, power supply controller 102 identifies for block 808 a target supply level of power to be supplied by variable power supply 104.

For block 810, power supply controller 102 identifies whether the difference between the target supply level and the current supply level satisfies one or more of one or more predetermined relationships with one or more thresholds. Power supply controller 102 may identify whether the difference between the target supply level and the current supply level satisfies one or more of any suitable one or more predetermined relationships with any suitable one or more thresholds. One or more predetermined relationships for one embodiment may be programmable. One or more thresholds for one embodiment may be programmable.

Power supply controller 102 for one embodiment may identify whether the absolute value of the difference between the target supply level and the current supply level is greater than, or alternatively greater than or equal to, a suitable threshold. Power supply controller 102 for one embodiment may identify whether the difference between the target supply level and the current supply level is greater than, or alternatively greater than or equal to, a suitable positive threshold and/or whether the difference between the target supply level and the current supply level is less than, or alternatively less than or equal to, a suitable negative threshold. The positive and negative thresholds may have the same or different absolute values.

Power supply controller 102 for one embodiment may identify whether the magnitude of the target supply level is greater than that of the current supply level by an amount greater than, or alternatively greater than or equal to, a suitable threshold. In this manner, power supply controller 102 for one embodiment may identify whether the current supply level is to increase in magnitude by an amount that could place a high level of stress on and/or damage one or more circuit components of electronic device 100 if power supply controller 102 changed the current supply level directly to the target supply level.

Power supply controller 102 for one embodiment may identify whether the difference between the target supply level and the current supply level is greater than, or alternatively greater than or equal to, a suitable positive threshold for an increase in magnitude from a positive current supply level to a positive target supply level and/or whether the difference between the target supply level and the current supply level is less than, or alternatively less than or equal to, a suitable negative threshold for an increase in magnitude from a negative current supply level to a negative target supply level. The positive and negative thresholds may have the same or different absolute values.

Power supply controller 102 for one embodiment may use one or more predetermined thresholds for block 810. Power supply controller 102 for one embodiment may identify one or more thresholds for block 810 in any suitable manner. Power supply controller 102 for one embodiment may identify one or more thresholds based at least in part on, for example, a current operation state of electronic device 100 and/or the current supply level. One or more thresholds for one embodiment may be derived to help avoid, reduce, or minimize a power surge that could otherwise place a high level of stress on and/or damage one or more circuit components of electronic device 100.

If the difference between the target supply level and the current supply level does not satisfy one or more of one or more predetermined relationships with one or more thresholds for block 810, power supply controller 102 for block 812 may control variable power supply 104 to change the supply power from approximately the current supply level directly to approximately the target supply level.

If the difference between the target supply level and the current supply level does satisfy one or more of one or more predetermined relationships with one or more thresholds for block 810, power supply controller 102 for block 814 may control variable power supply 104 to control the transition of the supply power from approximately the current supply level toward the target supply level prior to controlling variable power supply 104 to supply power at approximately the target supply level. Power supply controller 102 may control variable power supply 104 to control the transition of the supply power from approximately the current supply level toward the target supply level and to supply power at approximately the target supply level in any suitable manner.

Power supply controller 102 for one embodiment may provide for analog control in controlling variable power supply 104 to control the transition of the supply power from approximately the current supply level toward the target supply level. Power supply controller 102 for one embodiment may provide for digital control in controlling variable power supply 104 to control the transition of the supply power from approximately the current supply level toward the target supply level. Power supply controller 102 for one embodiment may control variable power supply 104 in accordance with flow diagram 700 of FIG. 7.

When electronic device 100 is to be supplied a different supply level of power by variable power supply 104 again for block 804, power supply controller 102 identifies for block 808 a new target supply level of power to be supplied by variable power supply 104 and controls variable power supply 104 to change the supply power from approximately the current supply level to approximately the new target supply level in accordance with block 810 and block 812 or 814.

Power supply controller 102 may perform operations for blocks 802–814 in any suitable order and may or may not overlap in time the performance of any suitable operation with any other suitable operation. Power supply controller 102 for one embodiment may, for example, identify that the current supply level is to change for block 804 by identifying a new target supply level for block 808.

Power supply controller 102 for another embodiment may not perform operations for blocks 810 and 812 and may therefore perform operations for block 814 for each transition to a new target supply level.

Transition Control Based on Supply Level Ranges

Power supply controller 102 for one embodiment may control variable power supply 104 to supply power to electronic device 100 using supply power transition control based at least in part on a supply level range from which electronic device 100 is to supply power or is being supplied power. Power supply controller 102 for one embodiment may control variable power supply 104 in accordance with a flow diagram 900 of FIG. 9. Blocks 902–914 of FIG. 9 generally correspond to blocks 202–214 of FIG. 2, respectively.

Figure 9:
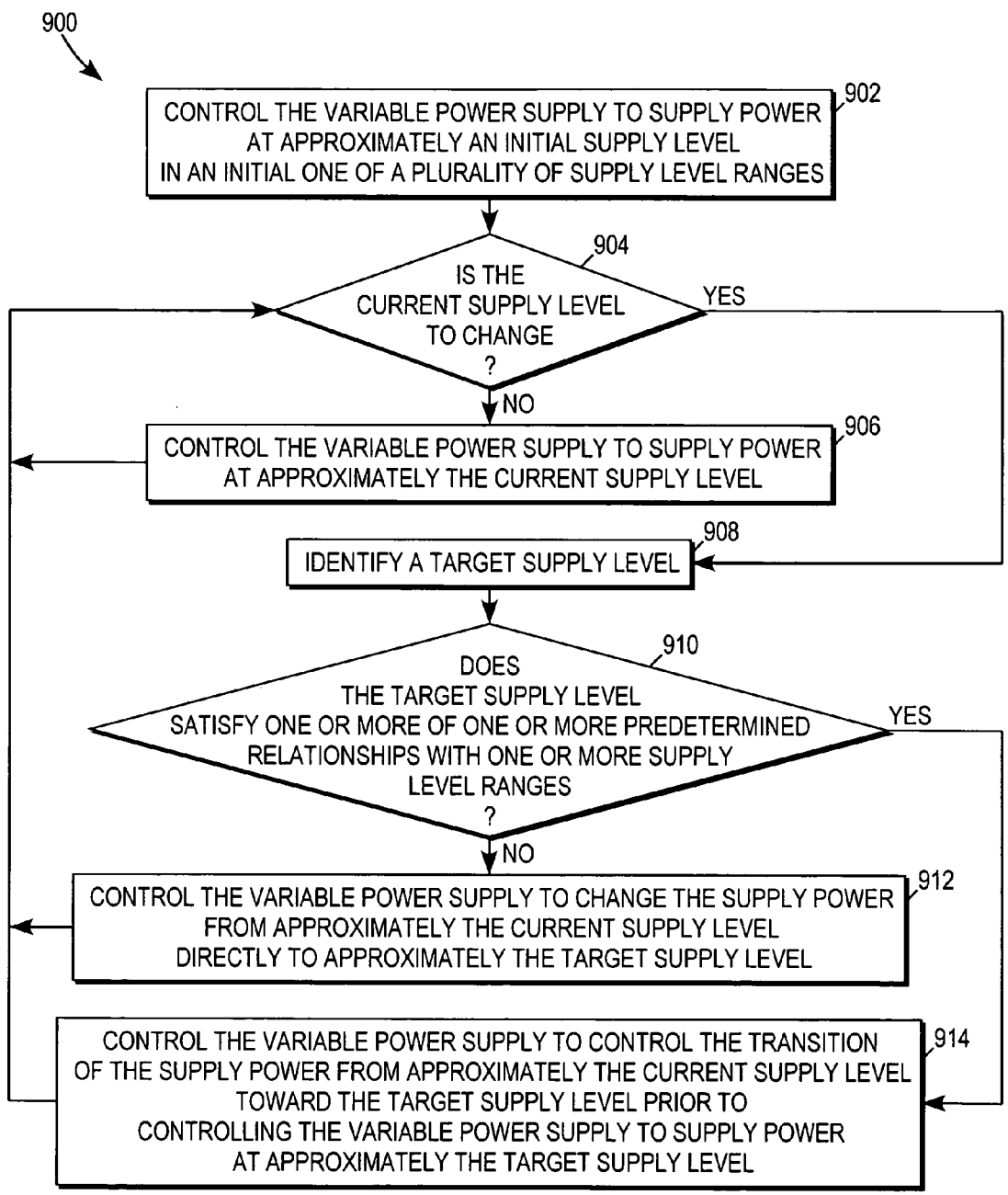
FIG. 9 illustrates, for one embodiment, a flow diagram to control the supply of power from a variable power supply using supply power transition control.

For block 902 of FIG. 9, power supply controller 102 controls variable power supply 104 to supply power to electronic device 100 at approximately an initial supply level in an initial one of a plurality of supply level ranges. Power supply controller 102 may control variable power supply 104 to supply power to electronic device 100 at any suitable supply level in any suitable initial one of any suitable supply level ranges. The supply level ranges may be defined in any suitable manner. One or more supply level ranges for one embodiment may be programmable.

If electronic device 100 is to continue using the current supply level of power supplied by variable power supply 104 for block 904, power supply controller 102 for one embodiment may control variable power supply 104 for block 906 to continue supplying power at approximately the current supply level. For one embodiment where variable power supply 104 may continue supplying power at approximately the current supply level without requiring continuous or repeated control by power supply controller 102, power supply controller 102 may not perform operations for block 906.

When electronic device 100 is to be supplied a different supply level of power by variable power supply 104 for block 904, power supply controller 102 identifies for block 908 a target supply level of power to be supplied by variable power supply 104.

For block 910, power supply controller 102 identifies whether the target supply level satisfies one or more of one or more predetermined relationships with one or more supply level ranges. Power supply controller 102 may identify whether the target supply level satisfies one or more of any suitable one or more predetermined relationships with any suitable one or more supply level ranges. One or more predetermined relationships for one embodiment may be programmable.

For one embodiment where supply level ranges do not overlap one another, power supply controller 102 for one embodiment may identify whether the target supply level is in a supply level range different from the current supply level range or alternatively is not in the current supply level range.

For one embodiment where supply level ranges do not overlap one another, power supply controller 102 for one embodiment may identify whether the target supply level is in one of any first predetermined different supply level ranges for the current supply level range or alternatively is not in the current supply level range and is not in one of any second predetermined different supply level ranges exclusive of any first predetermined different supply level ranges for the current supply level range. The identity of any first and/or second predetermined different supply level ranges for a given supply level range for one embodiment may be predetermined. The identity of any first and/or second predetermined different supply level ranges for a given supply level range for one embodiment may be programmable.

For one embodiment where one or more supply level ranges overlap at least one other supply level range, power supply controller 102 for one embodiment may identify whether the target supply level is not in the current supply level range. A supply level range may be defined to overlap another supply level range, for example, to help provide hysteresis for transitions from approximately a current supply level in one supply level range to approximately a target supply level in an adjacent supply level range.

For one embodiment where one or more supply level ranges overlap at least one other supply level range, power supply controller 102 for one embodiment may identify whether the target supply level is not in the current supply level range and is in one of any first predetermined different supply level ranges for the current supply level range or alternatively is not in the current supply level range and is not in one of any second predetermined different supply level ranges exclusive of any first predetermined different supply level ranges for the current supply level range. The identity of any first and/or second predetermined different supply level ranges for a given supply level range for one embodiment may be predetermined. The identity of any first and/or second predetermined different supply level ranges for a given supply level range for one embodiment may be programmable.

Power supply controller 102 for one embodiment may identify whether a target supply level is in one of any first predetermined different supply level ranges for a current supply level range to help identify whether the current supply level is to increase in magnitude by an amount that could place a high level of stress on and/or damage one or more circuit components of electronic device 100 if power supply controller 102 changed the current supply level directly to the target supply level.

If the target supply level does not satisfy one or more of one or more predetermined relationships with one or more supply level ranges for block 910, power supply controller 102 for block 912 may control variable power supply 104 to change the supply power from approximately the current supply level directly to approximately the target supply level.

If the target supply level does satisfy one or more of one or more predetermined relationships with one or more supply level ranges for block 910, power supply controller 102 for block 914 may control variable power supply 104 to control the transition of the supply power from approximately the current supply level toward the target supply level prior to controlling variable power supply 104 to supply power at approximately the target supply level. Power supply controller 102 may control variable power supply 104 to control the transition of the supply power from approximately the current supply level toward the target supply level and to supply power at approximately the target supply level in any suitable manner.

Power supply controller 102 for one embodiment may provide for analog control in controlling variable power supply 104 to control the transition of the supply power from approximately the current supply level toward the target supply level. Power supply controller 102 for one embodiment may provide for digital control in controlling variable power supply 104 to control the transition of the supply power from approximately the current supply level toward the target supply level. Power supply controller 102 for one embodiment may control variable power supply 104 in accordance with flow diagram 700 of FIG. 7.

When electronic device 100 is to be supplied a different supply level of power by variable power supply 104 again for block 904, power supply controller 102 identifies for block 908 a new target supply level of power to be supplied by variable power supply 104 and controls variable power supply 104 to change the supply power from approximately the current supply level to approximately the new target supply level in accordance with block 910 and block 912 or 914.

Power supply controller 102 may perform operations for blocks 902–914 in any suitable order and may or may not overlap in time the performance of any suitable operation with any other suitable operation.

Power supply controller 102 for another embodiment may not perform operations for blocks 910 and 912 and may therefore perform operations for block 914 for each transition to a new target supply level.

Circuitry for Transition Control

Power supply controller 102 may comprise any suitable circuitry to control variable power supply 104 to supply power to electronic device 100 in accordance with flow diagram 200 of FIG. 2, flow diagram 400 of FIG. 4, flow diagram 800 of FIG. 8, and/or flow diagram 900 of FIG. 9. At least a portion of the circuitry for power supply controller 102 may depend, for example, on the type of variable power supply 104 used to supply power to electronic device 100. Variable power supply 104 may be of any suitable type, such as a suitable linear power supply or a suitable switched-mode power supply for example.

Power supply controller 102 for one embodiment, as illustrated in FIG. 10, may comprise circuitry for a transition-to-target controller 1020 and a supply level controller 1040. Supply level controller 1040 is coupled to control variable power supply 104 to supply power at approximately a desired supply level to electronic device 100. Transition-to-target controller 1020 is coupled to control supply level controller 1040 to control variable power supply 104 to supply power at approximately a desired supply level and to control variable power supply 104 to control a transition of the power from approximately the current supply level toward a target supply level prior to controlling variable power supply 104 to supply power at approximately a target supply level for electronic device 100.

Transition-to-target controller 1020 for one embodiment may generate one or more controlled transition control signals and/or one or more target control signals based at least in part on an identified target supply level and may be coupled to output such control signals to supply level controller 1040. Supply level controller 1040 for one embodiment may be coupled to receive controlled transition and target control signals from transition-to-target controller 1020 and generate supply level control signals in response to controlled transition and target control signals. Supply level controller 1040 may be coupled to output supply level control signals to control variable power supply 104 to supply power to electronic device 100 at supply levels in accordance with the supply level control signals.

Power supply controller 102 may comprise any suitable circuitry for transition-to-target controller 1020 and any suitable circuitry for supply level controller 1040. For one embodiment, circuitry for any suitable portion or all of electronic device 100, transition-to-target controller 1020, and any suitable portion or all of supply level controller 1040 may be on the same integrated circuit.

Transition-to-target controller 1020 for one embodiment, as illustrated in FIG. 11, may comprise circuitry for a target supply level identifier 1122, a transition condition controller 1124, a switch 1126, and a controlled transition-to-target signal generator 1128.

Target supply level identifier 1122 identifies a target supply level of power to be supplied to electronic device 100 by variable power supply 104. Target supply level identifier 1122 may identify a target supply level in any suitable manner. Target supply level identifier 1122 for one embodiment may identify a target supply level based at least in part on a current and/or target operation state of electronic device 100.

Target supply level identifier 1122 may be implemented using any suitable analog and/or digital circuitry to identify a target supply level in any suitable manner. Target supply level identifier 1122 may generate and output any suitable one or more signals representative of an identified target supply level. Target supply level identifier 1122 for one embodiment may generate and output a suitable analog signal representative of an identified target supply level. Target supply level identifier 1122 for one embodiment may generate and output one or more suitable digital signals representative of an identified target supply level.

Transition condition controller 1124 identifies whether a target supply level identified by target supply level identifier 1122 satisfies one or more of one or more predetermined conditions to identify whether power supply controller 102 is to control variable power supply 104 to change the supply power from approximately a current supply level directly to approximately the identified target supply level or is to control variable power supply 104 to control the transition of the supply power from approximately the current supply level toward the identified target supply level prior to controlling variable power supply 104 to supply power at approximately the identified target supply level. Transition condition controller 1124 may identify whether an identified target supply level satisfies one or more of any suitable one or more predetermined conditions in any suitable manner.

Transition condition controller 1124 for one embodiment may identify whether an identified target supply level is for one of any predetermined different operation states for a current operation state of electronic device 100. Transition condition controller 1124 for one embodiment may monitor the operation state of electronic device 100 in any suitable manner to identify whether an identified target supply level is for one of any predetermined different operation states for a current operation state of electronic device 100. Transition condition controller 1124 for one embodiment may be coupled to receive one or more signals representative of an identified target supply level, identify an operation state for which the identified target supply level is to be supplied, and compare that operation state to an operation state identified for a just prior identified target supply level. Transition condition controller 1124 for another embodiment may be coupled to receive one or more signals representative of an identified target supply level and one or more signals representative of the current supply level of power supplied by variable power supply 104, identify an operation state for which the identified target supply level is to be supplied, and compare the identified operation state to an operation state for the current supply level. Transition condition controller 1124 for another embodiment may monitor the operation state of electronic device 100 by monitoring one or more signals representative of the current and/or target operation state of electronic device 100. Transition condition controller 1124 may identify whether an identified target supply level is for one of any suitable predetermined different operation states for a current operation state of electronic device 100.

Transition condition controller 1124 for one embodiment may identify whether the difference between an identified target supply level and the current supply level satisfies one or more of one or more predetermined relationships with one or more thresholds. Transition condition controller 1124 for one embodiment may be coupled to receive one or more signals representative of an identified target supply level, compare the identified target supply level with a just prior identified target supply level to identify the difference between them, and compare the identified difference with one or more thresholds to identify whether the identified difference satisfies one or more of one or more predetermined relationships with one or more thresholds. Transition condition controller 1124 for another embodiment may be coupled to receive one or more signals representative of the current supply level of power supplied by variable power supply 104, compare the identified target supply level to the current supply level to identify the difference between them, and compare the identified difference with one or more thresholds to identify whether the identified difference satisfies one or more of one or more predetermined relationships with one or more thresholds. Transition condition controller 1124 may identify whether an identified difference satisfies one or more of any suitable one or more predetermined relationships with any suitable one or more thresholds.

Transition condition controller 1124 for one embodiment may identify whether an identified target supply level satisfies one or more of one or more predetermined relationships with one or more supply level ranges. Transition condition controller 1124 for one embodiment may be coupled to receive one or more signals representative of an identified target supply level and compare the identified target supply level to one or two thresholds defining a current supply level range to identify whether the identified target supply level is in the current supply level range. Transition condition controller 1124 for one embodiment may identify a current supply level range based at least in part on a just prior identified target supply level. Transition condition controller 1124 for another embodiment may be coupled to receive one or more signals representative of the current supply level of power supplied by variable power supply 104 and identify a current supply level range based at least in part on the current supply level. Transition condition controller 1124 for one embodiment may also compare the identified target supply level to one or two thresholds defining one or more different supply level ranges to identify a target supply level range. Transition condition controller 1124 may identify whether an identified target supply level satisfies one or more of any suitable one or more predetermined relationships with any suitable one or more supply level ranges.

Transition condition controller 1124 may be implemented using any suitable analog and/or digital circuitry to identify whether an identified target supply level satisfies one or more of any suitable one or more predetermined conditions in any suitable manner. Transition condition controller 1124 for one embodiment may generate and output any suitable one or more control signals representative of whether an identified target supply level satisfies one or more of one or more predetermined conditions. Transition condition controller 1124 for one embodiment may generate and output a suitable analog control signal representative of whether an identified target supply level satisfies one or more of one or more predetermined conditions. Transition condition controller 1124 for one embodiment may generate and output one or more suitable digital control signals representative of whether an identified target supply level satisfies one or more of one or more predetermined conditions. Transition condition controller 1124 is coupled to output one or more control signals representative of whether an identified target supply level satisfies one or more of one or more predetermined conditions to control switch 1126.

Switch 1126 is coupled to receive one or more signals representative of an identified target supply level and to output the one or more signals representative of the identified target supply level as one or more target control signals to supply level controller 1040 if the identified target supply level does not satisfy one or more of one or more predetermined conditions, meaning power supply controller 102 is to control variable power supply 104 to change the supply power from approximately a current supply level directly to approximately the identified target supply level.

Switch 1126 is coupled to receive one or more controlled transition control signals from controlled transition-to-target signal generator 1128 and to output such control signals to supply level controller 1040 if an identified target supply level satisfies one or more of one or more predetermined conditions, meaning power supply controller 102 is to control variable power supply 104 to control the transition of the supply power from approximately the current supply level toward the identified target supply level prior to controlling variable power supply 104 to supply power at approximately the identified target supply level. Switch 1126 for one embodiment may be coupled to also receive one or more target control signals from controlled transition-to-target signal generator 1128 and to output such control signals to supply level controller 1040 to control variable power supply 104 to supply power at approximately the identified target supply level.

Switch 1126 may be implemented using any suitable analog and/or digital circuitry to output one or more controlled transition control signals and/or one or more target control signals in response to one or more control signals representative of whether an identified target supply level satisfies one or more of one or more predetermined conditions.

Controlled transition-to-target signal generator 1128 is to generate and output one or more controlled transition control signals to help control a transition of supply power from approximately the current supply level toward an identified target supply level. Controlled transition-to-target signal generator 1128 for one embodiment may be coupled to receive one or more signals representative of an identified target supply level to generate one or more controlled transition control signals based at least in part on the identified target supply level. Controlled transition-to-target signal generator 1128 for one embodiment may be coupled to receive one or more signals representative of the current supply level of power supplied by variable power supply 104 to generate one or more controlled transition control signals based at least in part on the current supply level. Controlled transition-to-target signal generator 1128 may be implemented using any suitable analog and/or digital circuitry to generate and output any suitable one or more controlled transition control signals in any suitable manner to help control the transition of supply power from approximately the current supply level toward an identified target supply level in any suitable manner.

Controlled transition-to-target signal generator 1128 for one embodiment may generate and output a suitable analog controlled transition control signal to help control the transition of supply power from approximately the current supply level toward the identified target supply level in accordance with any suitable signal shape.

As one example, controlled transition-to-target signal generator 1128 for one embodiment, as illustrated in FIG. 12, may generate and output an analog controlled transition control signal 1212 that ramps in a generally linearly manner at a controlled rate from an analog signal 1210 representative of a just prior identified target supply level or of the current supply level of power supplied by variable power supply 104 toward an analog signal 1220 representative of a current identified target supply level to help control variable power supply 104 to control the transition 1262 of supply power from approximately a current supply level 1260 toward approximately the current identified target supply level 1270.

Controlled transition-to-target signal generator 1128 for one embodiment may comprise a current source coupled to charge a capacitor to generate a controlled generally linearly ramped analog voltage signal in response to, for example, an analog step signal representative of an identified target supply level. The current source for one embodiment may be a programmable variable current source to help control the slope of the generally linearly ramped analog voltage signal. The capacitor for one embodiment may be a programmable variable capacitor to help control the slope of the generally linearly ramped analog voltage signal. Controlled transition-to-target signal generator 1128 for one embodiment may comprise an integrator to generate a generally linearly ramped analog voltage signal in response to, for example, an analog step signal representative of an identified target supply level.

Controlled transition-to-target signal generator 1128 for one embodiment may generate and output suitable digital controlled transition control signals to help control the transition of supply power to approximate any suitable signal shape in transitioning from approximately the current supply level toward the identified target supply level.

Controlled transition-to-target signal generator 1128 for one embodiment may generate and output one or more sets of one or more digital control signals representative of an intermediate supply level to help control the transition of supply power from approximately the current supply level toward the identified target supply level. Controlled transition-to-target signal generator 1128 for one embodiment may delay outputting a set of one or more digital control signals for a next intermediate supply level by at least a step delay time following the output of a set of one or more digital control signals for a prior supply level to help control the rate at which the supply power transitions toward the identified target supply level.

As one example, controlled transition-to-target signal generator 1128 for one embodiment, as illustrated in FIG. 13, may generate and output a set of one or more digital control signals 1312 representative of a first intermediate supply level and a set of one or more digital control signals 1314 representative of a second intermediate supply level at a controlled rate to approximate a generally linear ramp from a set of one or more digital control signals 1310 representative of a just prior identified target supply level or of the current supply level of power supplied by variable power supply 104 toward a set of one or more digital control signals 1320 representative of a current identified target supply level to help control variable power supply 104 to control the transition 1362 of supply power from approximately a current supply level 1360 toward approximately the current identified target supply level 1370.

Controlled transition-to-target signal generator 1128 for one embodiment may comprise a memory, such as a register for example, to store an identified target supply level, a counter to generate and output one or more digital control signals representative of a supply level, a comparator coupled to the identified target supply level memory and to the counter to compare the counter supply level to the identified target supply level and to continue advancing the counter to advance the counter supply level by a suitable step amount until the counter supply level and the identified target supply level satisfy a suitable predetermined relationship, and a delay to delay output of the counter to the comparator to help control the rate at which the counter supply level advances toward the identified target supply level.

Controlled transition-to-target signal generator 1128 for one embodiment may be coupled to receive one or more signals representative of an identified target supply level to generate and output one or more target control signals to help control the supply power at approximately the identified target supply level after helping to control a transition of the supply power toward the identified target supply level. Controlled transition-to-target signal generator 1128 for one embodiment may be implemented using any suitable analog and/or digital circuitry to generate and output any suitable one or more target control signals in any suitable manner to help control the supply of power at approximately an identified target supply level in any suitable manner.

Switch 1126 for one embodiment may be controlled to switch from outputting one or more control signals from controlled transition-to-target signal generator 1128 to outputting one or more target control signals from target supply level identifier 1122.

For one embodiment, transition condition controller 1124 may be coupled to receive one or more control signals output from switch 1126 and generate and output one or more control signals to control switch 1126 to output one or more target control signals from target supply level identifier 1122 when the one or more control signals output from switch 1126 indicate variable power supply 104 is to be controlled to supply power, for example, near, at, or beyond the identified target supply level. Transition condition controller 1124 for one embodiment may be coupled to receive one or more signals representative of the current supply level of power supplied by variable power supply 104 and generate and output one or more control signals to control switch 1126 to output one or more target control signals from target supply level identifier 1122 when the current supply level is, for example, near, at, or beyond the identified target supply level.

For another embodiment, controlled transition-to-target signal generator 1128 may generate and output one or more control signals to control switch 1126 to output one or more target control signals from target supply level identifier 1122 after controlled transition-to-target signal generator 1128 generates and outputs one or more controlled transition control signals to control the supply power at a level near the identified target supply level. Controlled transition-to-target signal generator 1128 for one embodiment may generate and output one or more control signals to control switch 1126 to output one or more target control signals from target supply level identifier 1122 after controlled transition-to-target signal generator 1128 generates and outputs one or more target control signals. Controlled transition-to-target signal generator 1128 for one embodiment may be coupled to receive one or more signals representative of the current supply level of power supplied by variable power supply 104 and generate and output one or more control signals to control switch 1126 to output one or more target control signals from target supply level identifier 1122 when the current supply level is, for example, near, at, or beyond the identified target supply level.

Target supply level identifier 1122, transition condition controller 1124, switch 1126, and/or controlled transition-to-target signal generator 1128 for one embodiment may be implemented at least in part using a processor that executes any suitable instructions to perform one or more functions for target supply level identifier 1122, transition condition controller 1124, switch 1126, and/or controlled transition-to-target signal generator 1128, respectively, in any suitable manner.

Power supply controller 102 for another embodiment may not comprise transition condition controller 1124 and/or switch 1126. Power supply controller 102 for one embodiment may therefore control variable power supply 104 to control the transition of the supply power from approximately a current supply level toward a target supply level prior to controlling variable power supply 104 to supply power at approximately the target supply level for each transition to a new target supply level.

Supply level controller 1040 may comprise any suitable circuitry that may depend, for example, on the type of variable power supply 104 used to supply power to electronic device 100.

Where variable power supply 104 is a switched-mode power supply, for example, supply level controller 1040 for one embodiment, as illustrated in FIG. 14, may comprise circuitry for a summer 1442, a filter 1444, a modulator 1446, and an optional analog-to-digital converter (ADC) 1448.

Summer 1442 is coupled to receive one or more controlled transition control signals and one or more target control signals from transition-to-target controller 1020 and is coupled to receive one or more signals representative of the current supply level of power supplied by variable power supply 104. Summer 1442 generates and outputs one or more signals representative of the difference between the current supply level and a supply level represented by one or more control signals received from transition-to-target controller 1020.

Summer 1442 may be implemented using any suitable analog and/or digital circuitry to generate and output any suitable one or more signals representative of a difference between received supply levels.

Summer 1442 for one embodiment may generate and output one or more suitable digital difference signals. Summer 1442 for one embodiment may receive one or more digital control signals from transition-to-target controller 1020 and one or more digital signals representative of the current supply level of power supplied by variable power supply 104 to generate and output one or more digital difference signals. Summer 1442 for one embodiment may be implemented at least in part using a processor that executes any suitable instructions to perform one or more functions for summer 1442 in any suitable manner. ADC 1448 for one embodiment may be coupled to receive one or more analog signals representative of the current supply level of power supplied by variable power supply 104 and convert the analog signal(s) into one or more digital signals for output to summer 1442.

Summer 1442 for one embodiment may generate and output a suitable analog difference signal. Summer 1442 for one embodiment may receive one or more analog control signals from transition-to-target controller 1020 and one or more analog signals representative of the current supply level of power supplied by variable power supply 104 to generate and output one or more analog difference signals. Supply level controller 1040 for one embodiment may therefore not comprise ADC 1448.

Filter 1444 for one embodiment may be coupled to receive one or more difference signals from summer 1442 and filter the received signal(s) to help stabilize the closed-loop control system formed by summer 1442, modulator 1446, variable power supply 104, and ADC 1448, if present.

Filter 1444 may be implemented using any suitable analog and/or digital circuitry. Filter 1444 for one embodiment may be implemented at least in part using a processor that executes any suitable instructions to perform one or more functions for filter 1444 in any suitable manner. Although described as being coupled between summer 1442 and modulator 1446, filter 1444 for another embodiment may be coupled in any suitable location in the closed-loop control system.

Modulator 1446 for one embodiment may be coupled to receive one or more filtered difference signals from filter 1444 and modulate such signal(s) to generate and output one or more modulated signals as one or more supply level control signals to control variable power supply 104 to supply power at approximately a supply level in accordance with one or more control signals received by summer 1442 from transition-to-target controller 1020. Modulator 1446 may modulate received signal(s) in any suitable manner. Modulator 1446 may perform, for example, pulse width modulation (PWM), frequency modulation (FM), pulse-frequency modulation (PFM), pulse code modulation (PCM), or sigma-delta modulation (ΣΔM).

Figure 15:
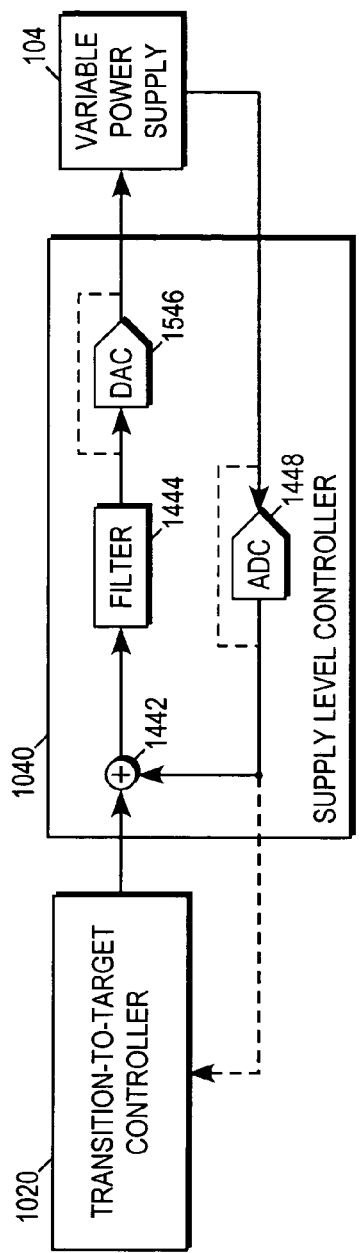
FIG. 15 illustrates, for another embodiment, a functional block diagram for a supply level controller for the power supply controller having supply power transition control of FIG. 10.

Modulator 1446 may be implemented using any suitable analog and/or digital circuitry. Modulator 1446 for one embodiment may be implemented at least in part using a processor that executes any suitable instructions to perform one or more functions for modulator 1446 in any suitable manner.

Where variable power supply 104 is a linear power supply, for example, supply level controller 1040 for one embodiment, as illustrated in FIG. 15, may comprise circuitry for summer 1442, filter 1444, an optional digital-to-analog converter (DAC) 1546, and optional analog-to-digital converter (ADC) 1448.

DAC 1546 for one embodiment may be coupled to receive one or more digital filtered difference signals from filter 1444 and convert the digital signal(s) into one or more analog signals for output as one or more supply level control signals to control variable power supply 104 to supply power at approximately a supply level in accordance with one or more control signals received by summer 1442 from transition-to-target controller 1020. DAC 1546 may be implemented using any suitable analog and/or digital circuitry.

Supply level controller 1040 for one embodiment may not comprise ADC 1448 and DAC 1546. Filter 1444 may therefore output one or more analog filtered difference signals as one or more supply level control signals to control variable power supply 104 to supply power at approximately a supply level in accordance with one or more control signals received by summer 1442 from transition-to-target controller 1020.

Although described as being coupled between summer 1442 and variable power supply 104, filter 1444 for another embodiment may be coupled in any suitable location in the closed-loop control system defined by summer 1442, DAC 1546, if present, variable power supply 104, and ADC 1448, if present.

Figure 16:
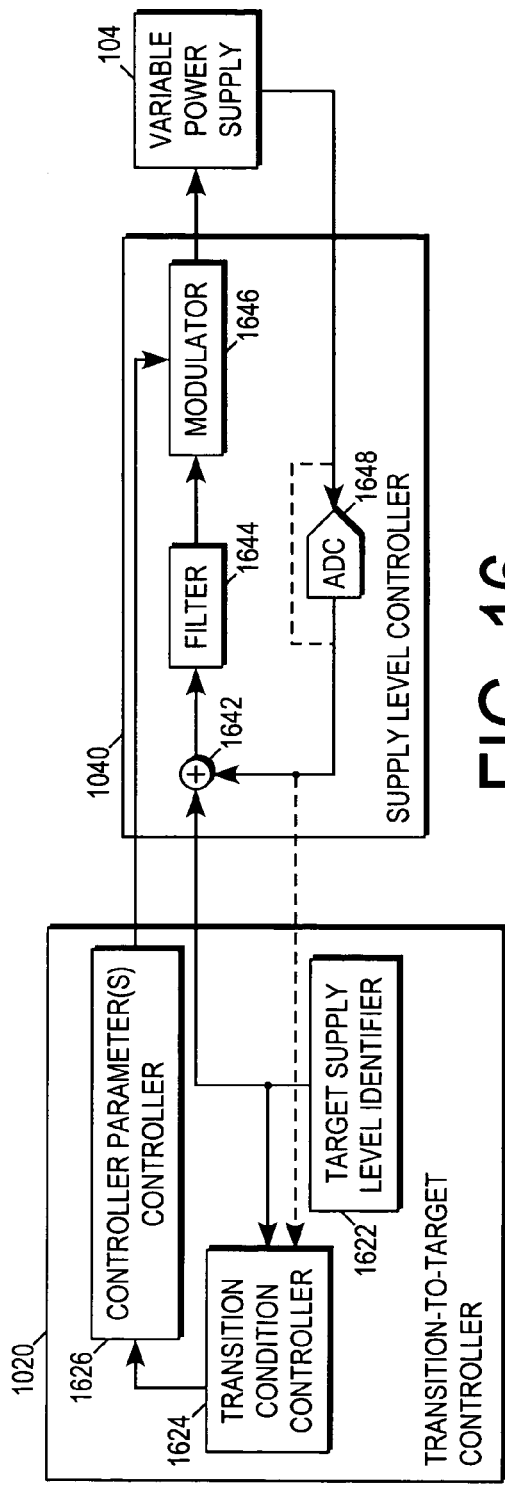
FIG. 16 illustrates, for another embodiment, a functional block diagram for a transition-to-target controller and a supply level controller for the power supply controller having supply power transition control of FIG. 10.

Transition-to-target controller 1020 for one embodiment, as illustrated in FIG. 16, may comprise circuitry for a target supply level identifier 1622, a transition condition controller 1624, and a controller parameter(s) controller 1626.

Target supply level identifier 1622 identifies a target supply level of power to be supplied to electronic device 100 by variable power supply 104. Target supply level identifier 1622 for one embodiment may be similarly implemented as target supply level identifier 1122 of FIG. 11. Target supply level identifier 1622 is coupled to output one or more signals representative of an identified target supply level as one or more target control signals to supply level controller 1040.

Transition condition controller 1624 identifies whether a target supply level identified by target supply level identifier 1622 satisfies one or more of one or more predetermined conditions to identify whether power supply controller 102 is to control variable power supply 104 to change the supply power from approximately a current supply level directly to approximately the identified target supply level or is to control variable power supply 104 to control the transition of the supply power from approximately the current supply level toward the identified target supply level prior to controlling variable power supply 104 to supply power at approximately the identified target supply level. Transition condition controller 1624 for one embodiment may by similarly implemented as transition condition controller 1124 of FIG. 11.

Controller parameter(s) controller 1626 is coupled to receive one or more signals representative of whether an identified target supply level satisfies one or more of one or more predetermined conditions from transition condition controller 1624 and generates one or more controlled transition control signals in accordance with such received signal(s). Controller parameter(s) controller 1626 is coupled to output one or more controlled transition control signals to control one or more controller parameters for supply level controller 1040 to help control how variable power supply 104 changes the supply power from approximately a current supply level to approximately an identified target supply level. Controller parameter(s) controller 1626 may be implemented using any suitable analog and/or digital circuitry to generate and output any suitable controlled transition control signals to control any suitable one or more controller parameters for supply level controller 1040 in accordance with one or more signals representative of whether an identified target supply level satisfies one or more of one or more predetermined conditions in any suitable manner.

Controller parameter(s) controller 1626 for one embodiment may generate and output one or more controlled transition control signals to control one or more suitable controller parameters in any suitable manner to control variable power supply 104 to change the supply power from approximately a current supply level directly to approximately an identified target supply level if the identified target supply level does not satisfy one or more of one or more predetermined conditions. Controller parameter(s) controller 1626 for one embodiment may generate and output one or more controlled transition control signals to control one or more suitable controller parameters in any suitable manner to control variable power supply 104 to control the transition of the supply power in any suitable manner from approximately the current supply level toward an identified target supply level prior to controlling variable power supply 104 to supply power at approximately the identified target supply level if the identified target supply level satisfies one or more of one or more predetermined conditions.

Supply level controller 1040 for one embodiment, as illustrated in FIG. 16, may comprise circuitry for a summer 1642, a filter 1644, a modulator 1646, and an optional analog-to-digital converter (ADC) 1648.

Summer 1642 is coupled to receive one or more target control signals from transition-to-target controller 1020 and is coupled to receive one or more signals representative of the current supply level of power supplied by variable power supply 104. Summer 1642 generates and outputs one or more signals representative of the difference between the current supply level and an identified target supply level represented by one or more received target control signals. Summer 1642 and ADC 1648, if present, for one embodiment may be similarly implemented as summer 1442 and ADC 1448, respectively, of FIG. 14.

Filter 1644 for one embodiment may be coupled to receive one or more difference signals from summer 1642 and filters the received signal(s) to help stabilize the closed-loop control system formed by summer 1642, modulator 1646, variable power supply 104, and ADC 1648, if present. Filter 1644 for one embodiment may be similarly implemented as filter 1444 of FIG. 14. Although described as being coupled between summer 1642 and modulator 1646, filter 1644 for another embodiment may be coupled in any suitable location in the closed-loop control system.

Modulator 1646 for one embodiment may be coupled to receive one or more filtered difference signals from filter 1644 and modulate such signal(s) to generate and output one or more modulated signals as one or more supply level control signals to control the supply of power by variable power supply 104. Modulator 1646 for one embodiment may be similarly implemented as modulator 1446 of FIG. 14.

Modulator 1646 for one embodiment may be coupled to receive one or more controlled transition control signals from transition-to-target controller 1020 and may comprise any suitable analog and/or digital circuitry to allow transition-to-target controller 1020 to control one or more controller parameters for modulator 1646 to help control how variable power supply 104 changes the supply power from approximately a current supply level to approximately an identified target supply level. Transition-to-target controller 1020 for one embodiment may control any suitable one or more controller parameters for modulator 1646 to help change in any suitable manner the duty cycle of the one or more modulated signals generated and output from modulator 1646 in response to the receipt of one or more target control signals by summer 1642 to help control how variable power supply 104 changes the supply power from approximately a current supply level to approximately an identified target supply level.

Circuitry for SLIC Having Supply Power Transition Control

Figure 17:
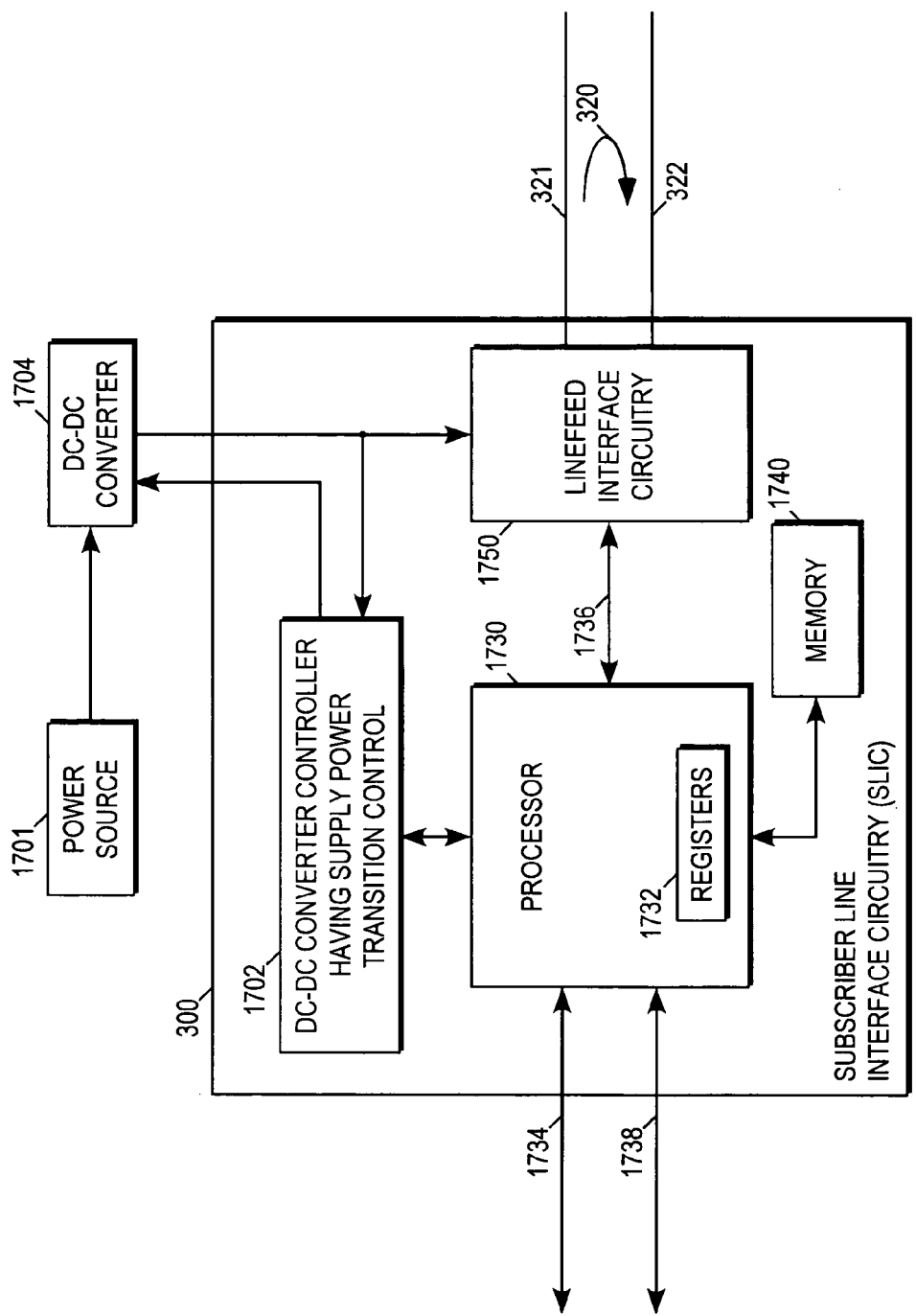
FIG. 17 illustrates, for one embodiment, a block diagram of subscriber line interface circuitry (SLIC) comprising a direct-current to direct-current (DC-DC) converter controller having supply power transition control to control a DC-DC converter to supply power to the SLIC.

SLIC 300 for one embodiment, as illustrated in FIG. 17, comprises a direct-current to direct-current (DC-DC) converter controller 1702 having supply power transition control, a processor 1730, memory 1740, and linefeed interface circuitry 1750.

DC-DC converter controller 1702 is coupled to control a DC-DC converter 1704 coupled to receive power from a power source 1701 and coupled to supply power to linefeed interface circuitry 1750 under control of DC-DC converter controller 1702. DC-DC converter controller 1702 and DC-DC converter 1704 generally correspond to power supply controller 302 and variable power supply 304, respectively.

Processor 1730 may be controlled or programmed to help perform any suitable function, including any suitable BORSCHT function. Processor 1730 may comprise any suitable circuitry in accordance with any suitable processor architecture. Processor 1730 for one embodiment may comprise circuitry in accordance with a suitable digital signal processor (DSP) architecture. Processor 1730 for one embodiment may comprise a plurality of registers 1732 to help program, set, maintain, and/or track one or more operating parameters for one or more functions performed by processor 1730.

Processor 1730 for one embodiment may be controlled or programmed to perform one or more functions for DC-DC converter controller 1702. Where processor 1730 is to help control DC-DC converter 1704 in accordance with flow diagram 200 of FIG. 2, flow diagram 400 of FIG. 4, flow diagram 800 of FIG. 8, and/or flow diagram 900 of FIG. 9, processor 1730 for one embodiment may use registers 1732 to store one or more suitable values to help identify, where applicable, one or more of the following example operating parameters: an initial supply level, a prior target supply level, a current target supply level, a sensed or sampled current supply level of power supplied by DC-DC converter 1704, a current intermediate supply level, a current operation state, a target operation state, one or more current-to-target supply level difference thresholds, one or more supply level ranges, a current supply level range, a target supply level range, one or more current-to-target transition times, one or more supply level step amounts, one or more numbers of intermediate step(s), one or more current supply level percentages to identify a supply level step amount, one or more step delay times, one or more factors to help produce a transient signal resulting from a supply power transition with a desired signal shape, one or more factors to help optimize the speed of a supply power transition, one or more factors to help optimize power consumption due to a supply power transition, and/or one or more factors to help account for noise.

Processor 1730 for one embodiment may have a processor interface 1734 through which processor 1730 may be controlled or programmed to help perform any suitable function, including any suitable BORSCHT function.

SLIC 300 for one embodiment may also comprise optional memory 1740 to store suitable instructions to be executed by processor 1730 to help perform any suitable function, including any suitable BORSCHT function. Memory 1740 for one embodiment may be used to store, for example, any suitable instructions to perform one or more functions for DC-DC converter controller 1702. Memory 1740 for one embodiment may be used to store one or more suitable values to help identify one or more operating parameters for one or more functions performed by processor 1730.

Memory 1740 may comprise any suitable one or more non-volatile and/or volatile memories including, for example, flash memory, read only memory (ROM), programmable read only memory (PROM), erasable programmable read only memory (EPROM), electrically erasable programmable read only memory (EEPROM), a battery-backed random access memory (RAM), random access memory (RAM), static random access memory (SRAM), dynamic random access memory (DRAM), and/or synchronous dynamic random access memory (SDRAM).

Although described in the context of instructions stored in memory 1740 to be executed by processor 1730, any suitable machine-readable medium, such as a hard disk device, a floppy disk or diskette device, an optical disk device such as a compact disc (CD) or digital versatile disc (DVD) device for example, a Bernoulli disk device such as a Jaz or Zip disk device for example, a flash memory device, a file server device, and/or any other suitable memory device may be used. For one embodiment, suitable instructions stored in this manner may be transmitted to SLIC 300 through processor interface 1734 for execution by processor 1730 and/or for storage in memory 1740.

Linefeed interface circuitry 1750 for one embodiment may be coupled to receive power supplied by DC-DC converter 1704 and coupled to first line 321 and to second line 322 of subscriber loop 320 to provide a linefeed on subscriber loop 320. Processor 1730 for one embodiment may help control linefeed interface circuitry 1750 through a linefeed interface 1736 coupled to linefeed interface circuitry 1750. Processor 1730 for one embodiment may also have a digital voiceband interface 1738 to communicate digitized voiceband data to switching network 310 where switching network 310 is a digital switching network and use linefeed interface 1736 for bi-directional voiceband data transfer between processor 1730 and subscriber loop 320.

Processor 1730 for one embodiment may be implemented on an integrated circuit. Any suitable portion or all of DC-DC converter controller 1702, memory 1740, and/or at least a portion of linefeed interface circuitry 1750 for one embodiment may also be implemented on the same integrated circuit as that having processor 1730.

SLIC 300 for one embodiment may be implemented by programming or controlling any suitable SLIC architecture, including a suitable existing SLIC architecture, to help control DC-DC converter controller 1702 to control the transition from approximately a current supply level of power supplied by DC-DC converter 1704 to approximately a target supply level in any suitable manner. As one example, SLIC 300 may be implemented by controlling a Si3210 ProSLIC™ Programmable CMOS SLIC/Codec with Ringing and Battery Voltage Generation, manufactured by Silicon Laboratories, Inc. of Austin, Tex., to control its DC-DC converter controller and therefore help control a DC-DC converter coupled to the DC-DC converter controller to supply power to the Si3210 ProSLIC™ at approximately target supply levels with a controlled transition between supply levels.

Power Supply Control Using Dynamic Controller Parameter(s)

Figure 18:
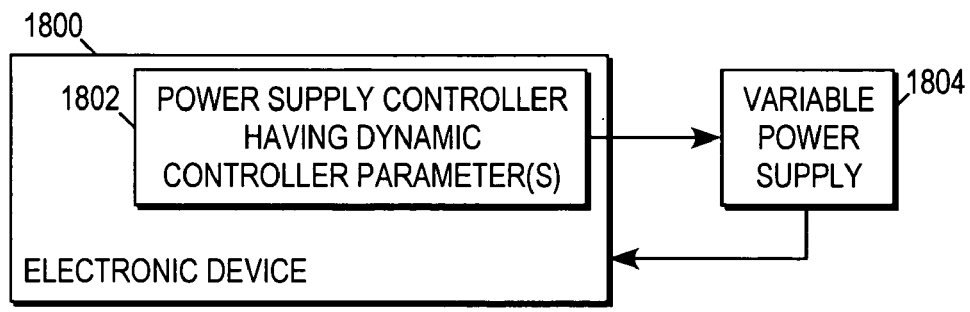
FIG. 18 illustrates, for one embodiment, a block diagram of an electronic device comprising a power supply controller having one or more dynamic controller parameters to control a variable power supply to supply power to the electronic device.

FIG. 18 illustrates, for one embodiment, an electronic device 1800 comprising a power supply controller 1802 having one or more dynamic power supply controller parameters. Power supply controller 1802 controls a variable power supply 1804 dynamically to supply power to electronic device 1800 at different supply levels. Power supply controller 1802 for one embodiment may control variable power supply 1804 at a given time to supply power to electronic device 1800 at a reduced or minimized supply level that may depend, for example, on the amount of power to be used by electronic device 1800 at that time. Electronic device 1800 may therefore be designed to less stringent power dissipation requirements.

In controlling variable power supply 1804 to supply power to electronic device 1800 at different supply levels, power supply controller 1802 may control variable power supply 1804 using one or more dynamic power supply controller parameters. Power supply controller 1802 may use one or more dynamic controller parameters for any suitable purpose. Power supply controller 1802 for one embodiment may use one or more dynamic controller parameters, for example, to help reduce noise, to help settle faster, to help avoid instability, to help maximize bandwidth, to help maintain a constant bandwidth, and/or to help reduce ripple in controlling variable power supply 1804 to supply power at a given supply level to electronic device 1800.

Power supply controller 1802 may control variable power supply 1804 using one or more dynamic controller parameters to supply power to electronic device 1800 in any suitable manner. Power supply controller 1802 for one embodiment may control variable power supply 1804 in accordance with a flow diagram 1900 of FIG. 19.

Figure 19:
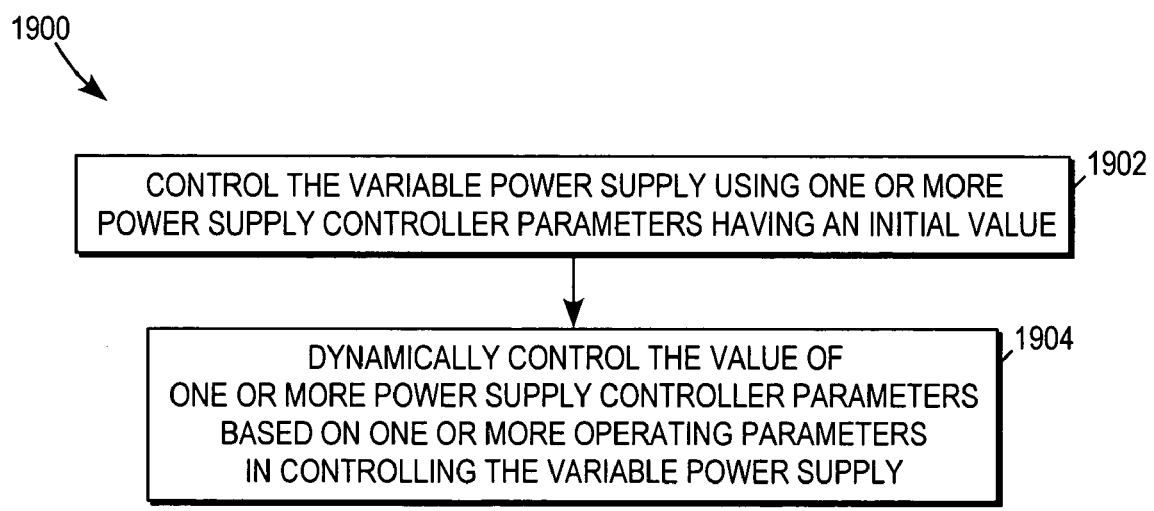
FIG. 19 illustrates, for one embodiment, a flow diagram to control the supply of power from a variable power supply using one or more dynamic power supply controller parameters.

For block 1902 of FIG. 19, power supply controller 1802 controls variable power supply 1804 using one or more power supply controller parameters having an initial value. Power supply controller 1802 may control variable power supply 1804 using any suitable type of one or more power supply controller parameters of any suitable initial value.

For one embodiment where power supply controller 1802 uses a closed-loop control system to help control variable power supply 1804, power supply controller 1802 for one embodiment may use any suitable one or more control system loop filter compensator settings, such as loop filter type, pole/zero positions, and/or loop gain for example.

For one embodiment where power supply controller 1802 uses a modulator to help control variable power supply 1804, power supply controller 1802 for one embodiment may use any suitable one or more modulator settings, such as frequency and modulation type for example. For digital modulators, power supply controller 1802 for one embodiment may use resolution, for example.

For one embodiment where power supply controller 1802 uses an analog-to-digital converter (ADC) to sample the level of power supplied by variable power supply 1804 to help control variable power supply 1804, power supply controller 1802 for one embodiment may use any suitable one or more analog-to-digital converter settings, such as sampling frequency, resolution, gain, and/or anti-aliasing for example.

For one embodiment where power supply controller 1802 uses a digital-to-analog converter (DAC) to help control variable power supply 1804, power supply controller 1802 for one embodiment may use any suitable one or more digital-to-analog converter settings, such as gain, sampling frequency, resolution, and/or conversion time for example.

For block 1904, power supply controller 1802 dynamically controls the value of one or more power supply controller parameters based on one or more operating parameters for electronic device 1800 in controlling variable power supply 1804. Power supply controller 1802 may dynamically control the value of any suitable one or more power supply controller parameters based on any suitable one or more operating parameters for electronic device 1800 in any suitable manner.

Power supply controller 1802 for one embodiment for block 1904 may dynamically control the value of all of the power supply controller parameter(s) initialized for block 1902. Power supply controller 1802 for one embodiment for block 1904 may dynamically control the value of one or more but less than all of the power supply controller parameter(s) initialized for block 1902.

Power supply controller 1802 for one embodiment for block 1904 may dynamically control the value of any suitable one or more power supply controller parameters based at least in part on the current supply level of power supplied by variable power supply 1804, on an operation state in which electronic device 1800 is to operate or is operating, and/or on a supply level range from which electronic device 1800 is to supply power or is being supplied power.

Electronic device 1800 may comprise any suitable circuitry to perform any suitable one or more functions that may use different supply power levels. Electronic device 1800 for one embodiment may comprise subscriber line interface circuitry (SLIC), for example. Electronic device 1800 for one embodiment may comprise, for example, a ringer, such as a bulk ringer or a Class D ringer for example. Electronic device 1800 for one embodiment may comprise a satellite tuner, for example.

SLIC Power Supply Control Having Dynamic Controller Parameter(s)

Figure 20:
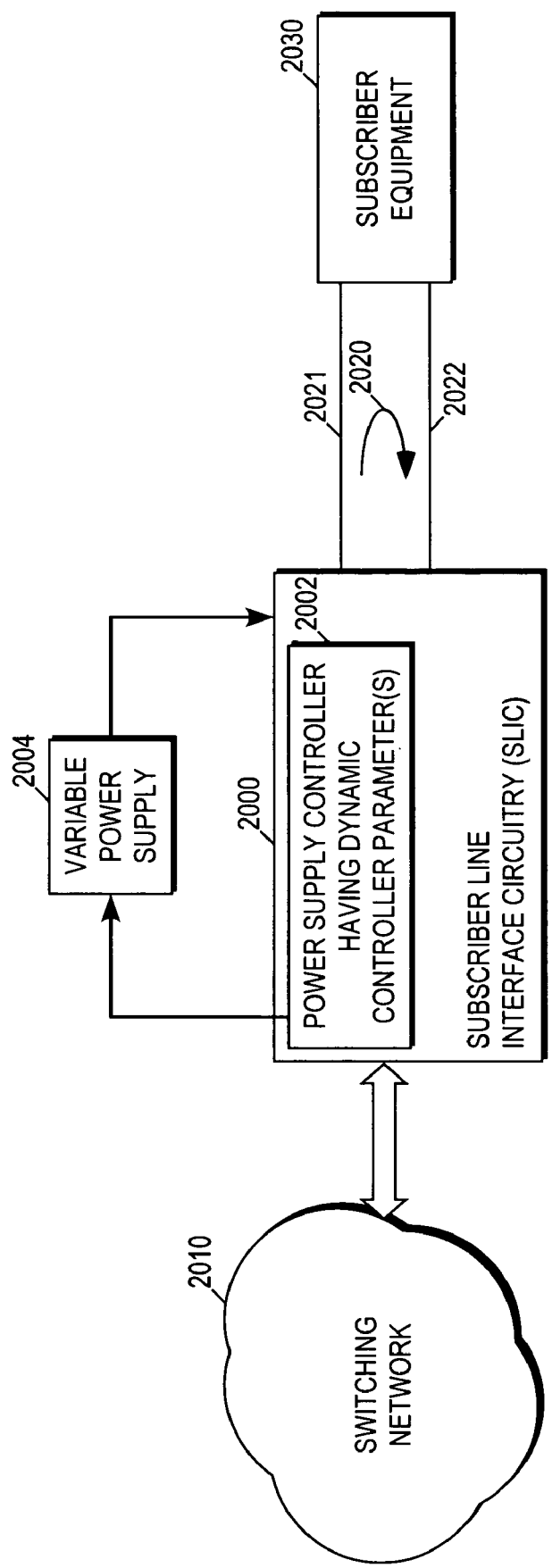
FIG. 20 illustrates, for one embodiment, a block diagram of subscriber line interface circuitry (SLIC) comprising a power supply controller having one or more dynamic controller parameters in an example environment.

FIG. 20 illustrates, for one embodiment, subscriber line interface circuitry (SLIC) 2000 in an example environment. As illustrated in FIG. 20, SLIC 2000 comprises a power supply controller 2002 having one or more dynamic controller parameters in controlling a variable power supply 2004 to supply power to SLIC 2000. SLIC 2000, power supply controller 2002, and variable power supply 2004 generally correspond to electronic device 1800, power supply controller 1802, and variable power supply 1804 of FIG. 18.

SLIC 2000 for one embodiment may provide a communications interface between a switching network 2010 and a subscriber loop 2020 having subscriber equipment 2030. Subscriber loop 2020 for one embodiment, as illustrated in FIG. 20, is defined by a first line 2021, a second line 2022, and subscriber equipment 2030. SLIC 2000 for one embodiment may comprise any suitable circuitry to perform any suitable one or more BORSCHT functions and/or any other suitable one or more functions. The description pertaining to SLIC 300, switching network 310, subscriber loop 320, first line 321, second line 322, and/or subscriber equipment 330 of FIG. 3 may similarly apply to SLIC 2000, switching network 2010, subscriber loop 2020, first line 2021, second line 2022, and/or subscriber equipment 2030 of FIG. 20.

Dynamic Controller Parameter(s) Based on Supply Level

Power supply controller 1802 for one embodiment may control variable power supply 1804 to supply power to electronic device 1800 using one or more dynamic power supply controller parameters based at least in part on the supply level of power to be supplied or being supplied by variable power supply 1804. Power supply controller 1802 for one embodiment may control variable power supply 1804 in accordance with a flow diagram 2100 of FIG. 21.

Figure 21:
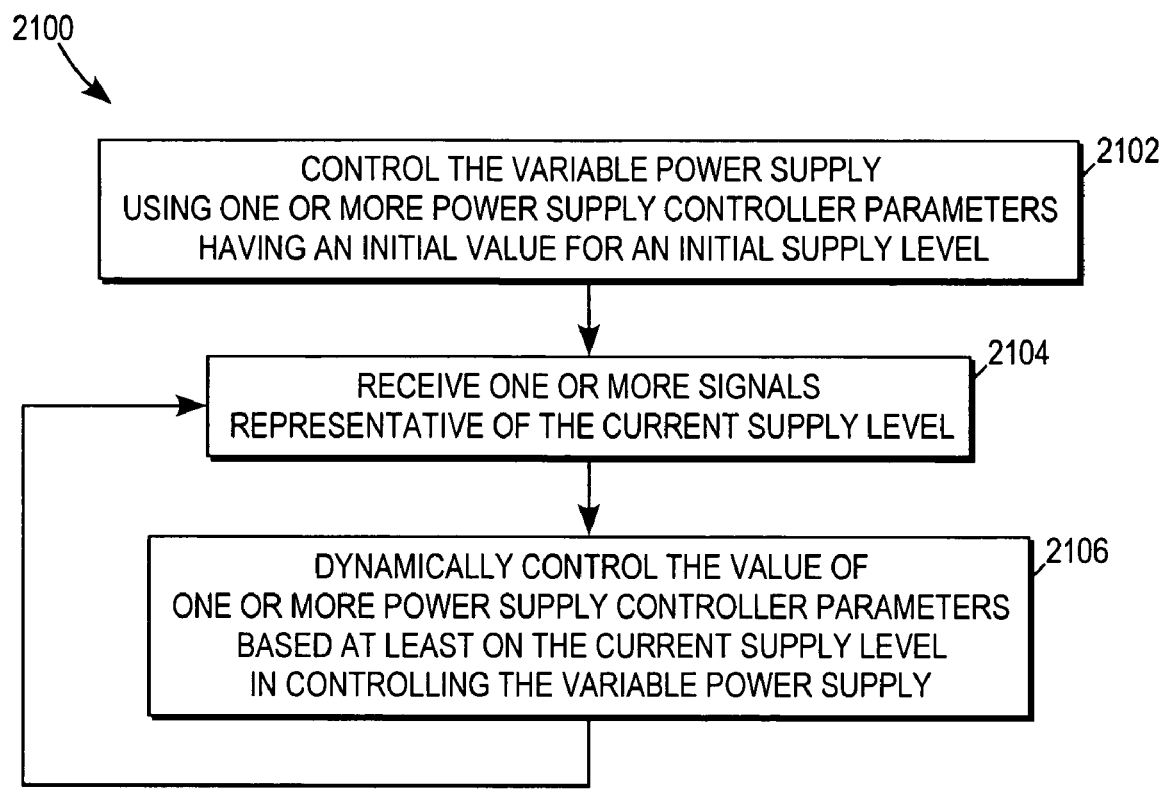
FIG. 21 illustrates, for one embodiment, a flow diagram to control the supply of power from a variable power supply using one or more dynamic power supply controller parameters.

For block 2102 of FIG. 21, power supply controller 1802 controls variable power supply 1804 using one or more power supply controller parameters having an initial value for an initial supply level of power supplied by variable power supply 1804. Power supply controller 1802 may control variable power supply 1804 using any suitable type of one or more power supply controller parameters of any suitable initial value for any suitable initial supply level.

For block 2104, power supply controller 1802 receives one or more signals representative of the current supply level of power supplied by variable power supply 1804.

For block 2106, power supply controller 1802 dynamically controls the value of one or more power supply controller parameters based at least in part on the current supply level received for block 2104 in controlling variable power supply 1804. Power supply controller 1802 may dynamically control the value of any suitable one or more power supply controller parameters based at least in part on the current supply level received for block 2104 in any suitable manner.

Power supply controller 1802 for one embodiment for block 2106 may dynamically control the value of all of the power supply controller parameter(s) initialized for block 2102. Power supply controller 1802 for one embodiment for block 2106 may dynamically control the value of one or more but less than all of the power supply controller parameter(s) initialized for block 2102.

Power supply controller 1802 for one embodiment for block 2106 may dynamically control the value of any suitable power supply controller parameter to have the same or a different value for any two given power supply levels. Power supply controller 1802 for one embodiment for block 2106 may dynamically control the value of any suitable power supply controller parameter to have a different value for any two given power supply levels.

Power supply controller 1802 for one embodiment for block 2106 may identify a predetermined value for one or more controller parameters based on the current supply level received for block 2104 and control variable power supply 1804 in accordance with such identified controller parameter value(s). Power supply controller 1802 for one embodiment for block 2106 may identify a predetermined set of one or more controller parameter values based on the current supply level received for block 2104 and control variable power supply 1804 in accordance with the identified set.

Power supply controller 1802 may continue to monitor the current supply level and dynamically control one or more controller parameters based on the monitored current supply level by repeating operations for blocks 2104 and 2106. Power supply controller 1802 may monitor the current supply level at any suitable time. Power supply controller 1802 may monitor the current supply level, for example, continuously, at predetermined intervals, sporadically, and/or in response to any suitable one or more events.

Power supply controller 1802 may perform operations for blocks 2102-2106 in any suitable order and may or may not overlap in time the performance of any suitable operation with any other suitable operation. Power supply controller 1802 for one embodiment may, for example, receive a new current supply level for block 2104 as power supply controller 1802 controls variable power supply 1804 for block 2106 using one or more dynamic controller parameter values based on a prior received supply level.

Figure 22:
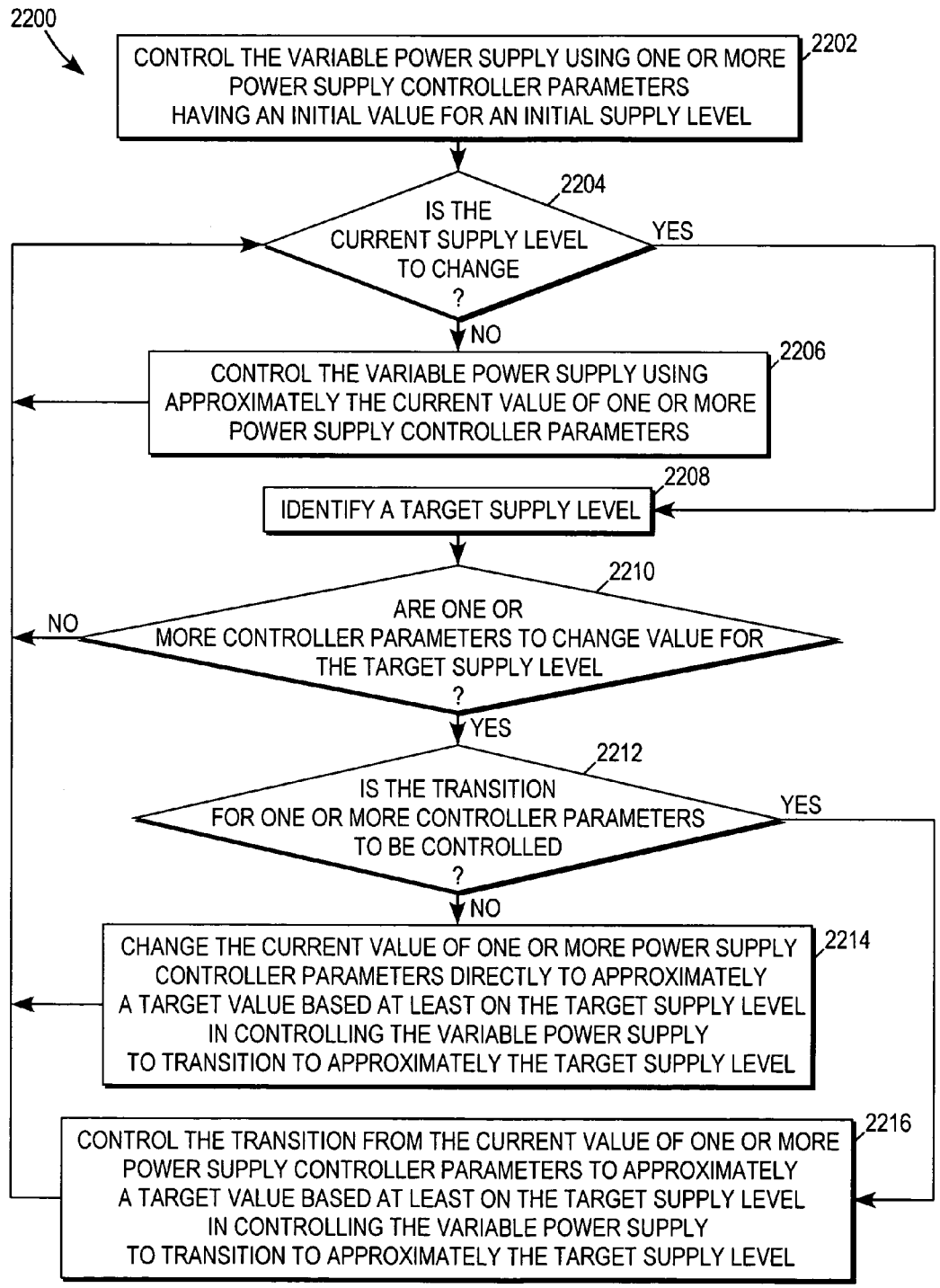
FIG. 22 illustrates, for one embodiment, a flow diagram to control the supply of power from a variable power supply using one or more dynamic power supply controller parameters.

Power supply controller 1802 for one embodiment may control variable power supply 1804 in accordance with a flow diagram 2200 of FIG. 22.

For block 2202 of FIG. 22, power supply controller 1802 controls variable power supply 1804 using one or more power supply controller parameters having an initial value for an initial supply level of power supplied by variable power supply 1804. Power supply controller 1802 may control variable power supply 1804 using any suitable type of one or more power supply controller parameters of any suitable initial value for any suitable initial supply level.

If electronic device 1800 for block 2204 is to continue using the current supply level of power supplied by variable power supply 1804, power supply controller 1802 for one embodiment may control variable power supply 1804 for block 2206 to continue controlling variable power supply 1804 using approximately the current value of one or more power supply controller parameters. For one embodiment where variable power supply 1804 may continue supplying power at approximately the current supply level without requiring continuous or repeated control by power supply controller 1802, power supply controller 1802 for one embodiment may not perform operations for block 2206.

When electronic device 1800 is to be supplied a different supply level of power by variable power supply 1804, power supply controller 1802 identifies for block 2208 a target supply level of power to be supplied by variable power supply 1804. Power supply controller 1802 may identify a target supply level of power to be supplied by variable power supply 1804 in any suitable manner.

If one or more controller parameters for block 2210 are to change value for the target supply level identified for block 2208, power supply controller 1802 for block 2212 identifies whether the transition for one or more controller parameters is to be controlled. Power supply controller 1802 may identify whether the transition for one or more controller parameters is to be controlled in any suitable manner.

Power supply controller 1802 for one embodiment for block 2212 may identify whether the target supply level satisfies one or more of one or more predetermined conditions. Power supply controller 1802 may identify whether the target supply level satisfies one or more of any suitable one or more predetermined conditions. One or more predetermined conditions for one embodiment may be programmable.

Power supply controller 1802 for one embodiment may identify whether the difference between the target supply level and the current supply level satisfies one or more of one or more predetermined relationships with one or more thresholds. Power supply controller 1802 may identify whether the difference between the target supply level and the current supply level satisfies one or more of any suitable one or more predetermined relationships with any suitable one or more thresholds. One or more predetermined relationships for one embodiment may be programmable. One or more thresholds for one embodiment may be programmable.

Power supply controller 1802 for one embodiment may identify whether the absolute value of the difference between the target supply level and the current supply level is greater than, or alternatively greater than or equal to, a suitable threshold. Power supply controller 1802 for one embodiment may identify whether the difference between the target supply level and the current supply level is greater than, or alternatively greater than or equal to, a suitable positive threshold and/or whether the difference between the target supply level and the current supply level is less than, or alternatively less than or equal to, a suitable negative threshold. The positive and negative thresholds may have the same or different absolute values.

Power supply controller 1802 for one embodiment may identify whether the magnitude of the target supply level is greater than that of the current supply level by an amount greater than, or alternatively greater than or equal to, a suitable threshold based at least in part on the difference between the target supply level and the current supply level.

Power supply controller 1802 for one embodiment may use one or more predetermined thresholds. Power supply controller 1802 for one embodiment may identify one or more thresholds in any suitable manner. Power supply controller 1802 for one embodiment may identify one or more thresholds based at least in part on, for example, a current operation state of electronic device 1800 and/or the current supply level.

Power supply controller 1802 for one embodiment for block 2212 may identify a target value for one or more controller parameters based at least in part on the target supply level identified for block 2208 and identify whether the identified target value satisfies one or more of one or more predetermined conditions.

Power supply controller 1802 may identify a target value for one or more controller parameters based at least in part on the target supply level in any suitable manner. Power supply controller 1802 for one embodiment may identify for one or more controller parameters a predetermined target value corresponding to the target supply level.

Power supply controller 1802 may identify whether the identified target value satisfies one or more of any suitable one or more predetermined conditions. One or more predetermined conditions for one embodiment may be programmable.

Power supply controller 1802 for one embodiment may identify whether the difference between the target value and the current value for a controller parameter satisfies one or more of one or more predetermined relationships with one or more thresholds. Power supply controller 1802 may identify whether the difference between the target value and the current value for a controller parameter satisfies one or more of any suitable one or more predetermined relationships with any suitable one or more thresholds. One or more predetermined relationships for one embodiment may be programmable. One or more thresholds for one embodiment may be programmable.

Power supply controller 1802 for one embodiment may identify whether the absolute value of the difference between the target value and the current value for a controller parameter is greater than, or alternatively greater than or equal to, a suitable threshold. Power supply controller 1802 for one embodiment may identify whether the difference between the target value and the current value for a controller parameter is greater than, or alternatively greater than or equal to, a suitable positive threshold and/or whether the difference between the target value and the current value for a controller parameter is less than, or alternatively less than or equal to, a suitable negative threshold. The positive and negative thresholds may have the same or different absolute values.

Power supply controller 1802 for one embodiment may identify whether the magnitude of the target value for a controller parameter is greater than that of its current value by an amount greater than, or alternatively greater than or equal to, a suitable threshold based at least in part on the difference between the target value and the current value.

Power supply controller 1802 for one embodiment may use one or more predetermined thresholds. Power supply controller 1802 for one embodiment may identify one or more thresholds in any suitable manner. Power supply controller 1802 for one embodiment may identify one or more thresholds for a controller parameter based at least in part on, for example, the current value of the controller parameter.

If the transition for one or more controller parameters is not to be controlled as identified for block 2212, power supply controller 1802 for block 2214 may change the current value of one or more power supply controller parameters directly to approximately a target value based at least in part on the target supply level in controlling variable power supply 1804 to transition to approximately the target supply level. Power supply controller 1802 may change the current value of any suitable one or more power supply controller parameters in any suitable manner directly to approximately any suitable target value based at least in part on the target supply level in any suitable manner.

If the transition for one or more controller parameters is to be controlled as identified for block 2212, power supply controller 1802 for block 2216 may control the transition from the current value of one or more power supply controller parameters to approximately a target value based at least in part on the target supply level in controlling variable power supply 1804 to transition to approximately the target supply level. Power supply controller 1802 may control the transition from the current value of any suitable one or more power supply controller parameters in any suitable manner to approximately any suitable target value based at least in part on the target supply level in any suitable manner.

Power supply controller 1802 for one embodiment for block 2216 may control the transition from the current value of any suitable power supply controller parameter toward its target value prior to changing the power supply controller parameter to approximately the target value. Power supply controller 1802 for one embodiment for block 2216 may control the transition from the current value of any suitable power supply controller parameter toward its target value in accordance with any suitable signal shape.

Power supply controller 1802 for one embodiment for block 2216 may control any suitable power supply controller parameter to help smooth the transition from approximately a current value for the power supply controller parameter to approximately a target value for the power supply controller parameter as power supply controller 1802 controls variable power supply 1804 to transition from the current supply level to approximately the target supply level. Power supply controller 1802 for one embodiment may therefore help minimize or avoid any disruptions to variable power supply 1804 and/or power supply controller 1802 as power supply controller 1802 changes the power supply controller parameter while controlling variable power supply 1804. Power supply controller 1802 for one embodiment may help transition from a current controller parameter value to a target controller parameter value, for example, along a generally linear path as a function of time. Power supply controller 1802 for one embodiment may help transition from a current controller parameter value to a target controller parameter value, for example, along a generally linear path as a function of the current supply level. Power supply controller 1802 for one embodiment may use interpolation to identify one or more controller parameter values between the current value and the target value.

Power supply controller 1802 may then repeat operations for blocks 2204–2216 to continue controlling variable power supply 1804 using one or more power supply controller parameters based at least in part on the new current supply level or to control the value of one or more power supply controller parameters in controlling variable power supply 1804 to transition to a next target supply level.

Power supply controller 1802 may perform operations for blocks 2202–2216 in any suitable order and may or may not overlap in time the performance of any suitable operation with any other suitable operation. Power supply controller 1802 for one embodiment may, for example, identify a target supply level for block 2208 as power supply controller 1802 controls variable power supply 1804 for block 2206.

Power supply controller 1802 for another embodiment may not perform operations for blocks 2212 and 2214 and may therefore perform operations for block 2216 for one or more controller parameters that are to change value as identified for block 2210.

Dynamic Controller Parameter(s) Based on Operation State

Power supply controller 1802 for one embodiment may control variable power supply 1804 to supply power to electronic device 1800 using one or more dynamic power supply controller parameters based at least in part on an operation state in which electronic device 1800 is to operate or is operating. Power supply controller 1802 for one embodiment may control variable power supply 1804 in accordance with a flow diagram 2300 of FIG. 23.

Figure 23:
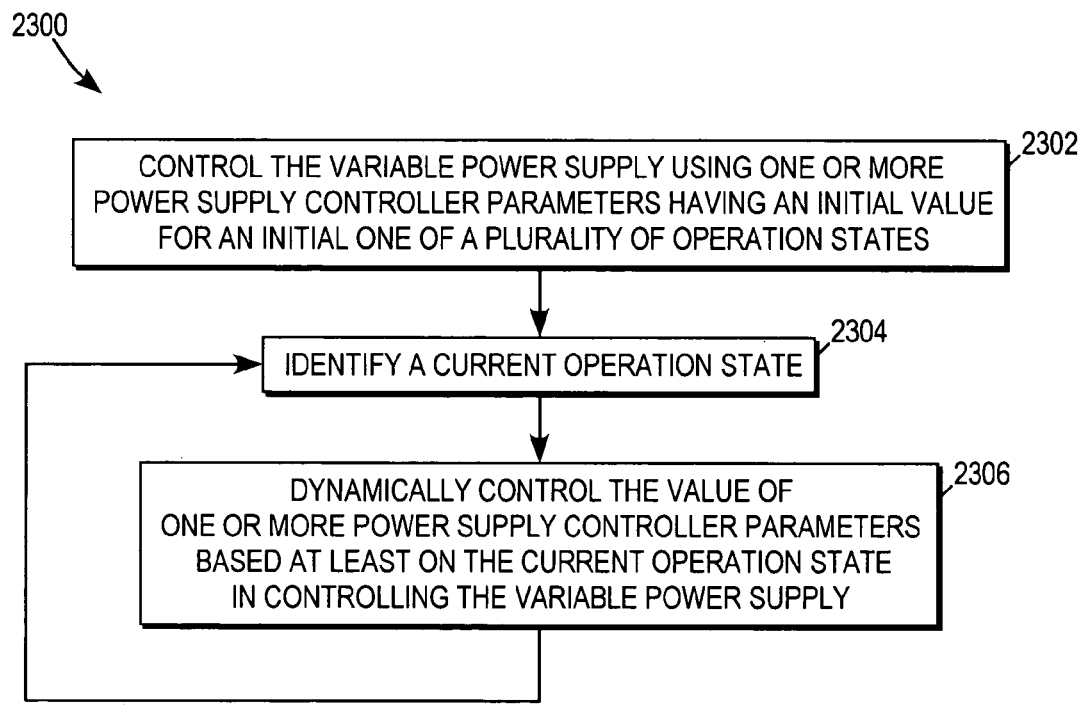
FIG. 23 illustrates, for one embodiment, a flow diagram to control the supply of power from a variable power supply using one or more dynamic power supply controller parameters.

For block 2302 of FIG. 23, power supply controller 1802 controls variable power supply 1804 using one or more power supply controller parameters having an initial value for an initial one of a plurality of operation states for electronic device 1800. Power supply controller 1802 may control variable power supply 1804 using any suitable type of one or more power supply controller parameters of any suitable initial value for any suitable initial one of a plurality of any suitable operation states for electronic device 1800.

The operation states for electronic device 1800 may be defined in any suitable manner. One or more operation states for electronic device 1800 for one embodiment may be programmable.

For one embodiment where SLIC 2000 is used, SLIC 2000 may have an on-hook, a ringing, and/or an off-hook operation state. Power supply controller 2002 for one embodiment for block 2302 may control variable power supply 2004 using one or more controller parameters for the on-hook operation state.

SLIC 2000 for another embodiment may have an open, a forward on-hook transmission, a reverse on-hook transmission, a ringing, a forward active, a reverse active, a tip line open, and/or a ring line open operation state. Power supply controller 2002 for one embodiment for block 2302 may control variable power supply 2004 using one or more controller parameters for the open operation state.

For block 2304, power supply controller 1802 identifies a current operation state of electronic device 1800. Power supply controller 1802 may identify the current operation state of electronic device 1800 in any suitable manner. Power supply controller 1802 for one embodiment may monitor the current supply level of power supplied by variable power supply 1804 in any suitable manner and identify the current operation state based on the current supply level. Power supply controller 1802 for one embodiment may identify the current operation state of electronic device 1800 by monitoring one or more signals set by electronic device 1800 to represent the current operation state of electronic device 1800.

For block 2306, power supply controller 1802 dynamically controls the value of one or more power supply controller parameters based at least in part on the current operation state identified for block 2304 in controlling variable power supply 1804. Power supply controller 1802 may dynamically control the value of any suitable one or more power supply controller parameters based at least in part on the current operation state identified for block 2304 in any suitable manner.

Power supply controller 1802 for one embodiment for block 2306 may dynamically control the value of all of the power supply controller parameter(s) initialized for block 2302. Power supply controller 1802 for one embodiment for block 2306 may dynamically control the value of one or more but less than all of the power supply controller parameter(s) initialized for block 2302.

Power supply controller 1802 for one embodiment for block 2306 may dynamically control the value of any suitable power supply controller parameter to have the same or a different value for any two given operation states of electronic device 1800. Power supply controller 1802 for one embodiment for block 2306 may dynamically control the value of any suitable power supply controller parameter to have a different value for any two given operation states for electronic device 1800.

Power supply controller 1802 for one embodiment for block 2306 may identify a predetermined value for one or more controller parameters based on the current operation state identified for block 2304 and control variable power supply 1804 in accordance with such identified controller parameter value(s). Power supply controller 1802 for one embodiment for block 2306 may identify a predetermined set of one or more controller parameter values based on the current operation state identified for block 2304 and control variable power supply 1804 in accordance with the identified set.

Power supply controller 1802 may continue to monitor the current operation state and dynamically control one or more controller parameters based on the monitored current operation state by repeating operations for blocks 2304 and 2306. Power supply controller 1802 may monitor the current operation state at any suitable time. Power supply controller 1802 may monitor the current operation state, for example, continuously, at predetermined intervals, sporadically, and/or in response to any suitable one or more events.

Power supply controller 1802 may perform operations for blocks 2302–2306 in any suitable order and may or may not overlap in time the performance of any suitable operation with any other suitable operation. Power supply controller 1802 for one embodiment may, for example, identify a new current operation state for block 2304 as power supply controller 1802 controls variable power supply 1804 for block 2306 using one or more dynamic controller parameter values based on a prior identified operation state.

Figure 24:
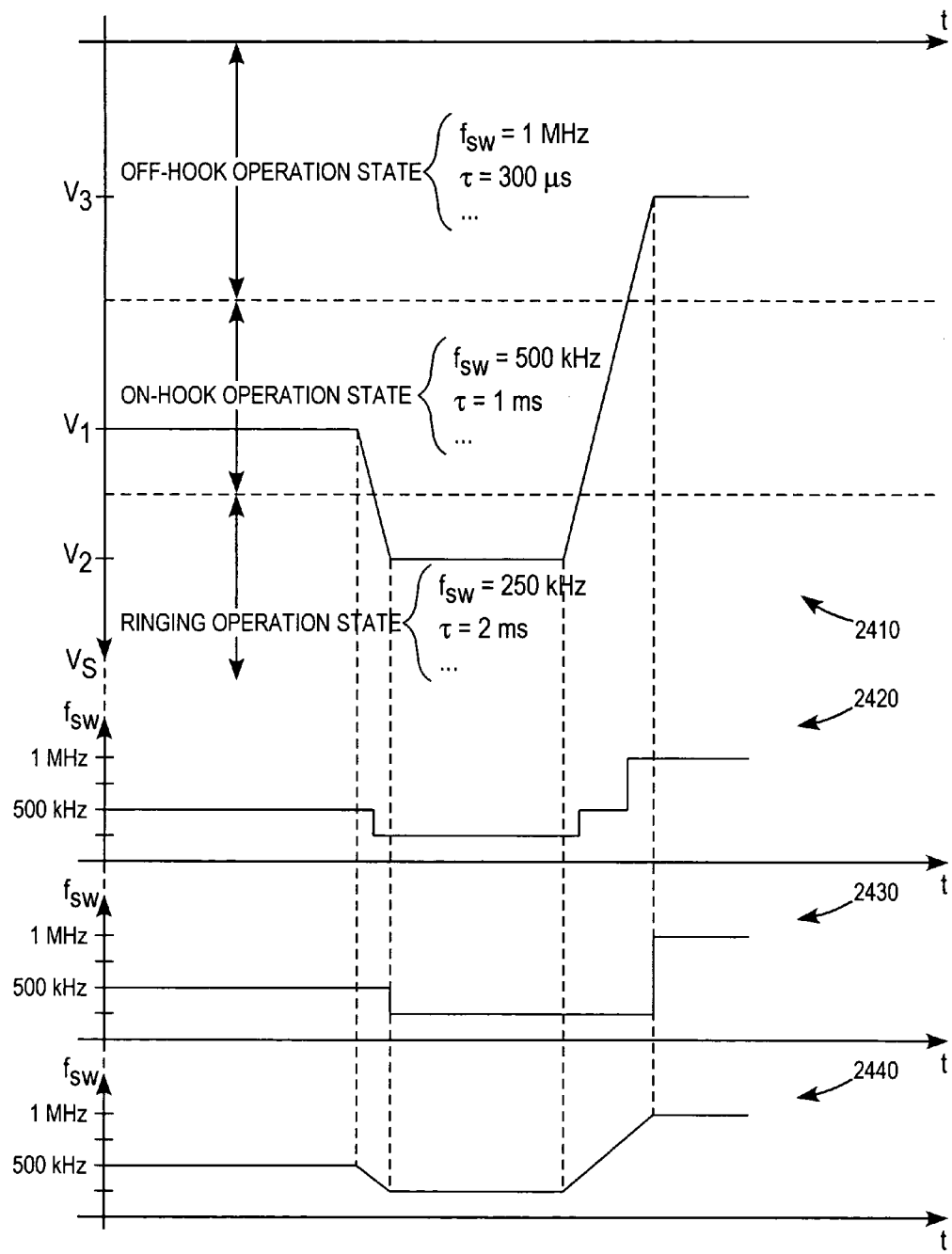
FIG. 24 illustrates, for one embodiment, example graphs showing example dynamic power supply controller parameters for different example operation states of the SLIC of FIG. 20.

FIG. 24 illustrates, for one embodiment where SLIC 2000 is used, example graphs 2410, 2420, 2430, and 2440 of how power supply controller 2002 for one embodiment may dynamically control the value of controller parameters in controlling variable power supply 2004 to supply different supply voltages to SLIC 2000.

As illustrated in graph 2410 of FIG. 24, power supply controller 2002 for one embodiment may use at least the following example controller parameter values:
  switching frequency $f_{sw} \approx 500$ kiloHerz (kHz), and
  pole/zero position $\tau \approx 1$ millisecond (ms)
to control variable power supply 2004 to supply a supply voltage $V_S$ at approximately a supply voltage level $V_1$ while SLIC 2000 is in an on-hook operation state. Power supply controller 2002 for one embodiment may monitor the current operation state of SLIC 2000 and continue to use approximately the same controller parameter values while SLIC 2000 remains in the on-hook operation state.

When SLIC 2000 changes to a ringing operation state, power supply controller 2002 for one embodiment may use at least the following example controller parameter values:
  switching frequency $f_{sw} \approx 250$ kiloHerz (kHz), and
  pole/zero position $\tau \approx 2$ milliseconds (ms)
to control variable power supply 2004 to supply a supply voltage $V_S$ at approximately a supply voltage level $V_2$. Power supply controller 2002 for one embodiment may monitor the current operation state of SLIC 2000 and continue to use approximately the same controller parameter values while SLIC 2000 remains in the ringing operation state.

When SLIC 2000 changes to an off-hook operation state, power supply controller 2002 for one embodiment may use at least the following example controller parameter values:
  switching frequency $f_{sw} \approx 1$ MegaHerz (MHz), and
  pole/zero position $\tau \approx 300$ microseconds (µs)
to control variable power supply 2004 to supply a supply voltage $V_S$ at approximately a supply voltage level $V_3$. Power supply controller 2002 for one embodiment may monitor the current operation state of SLIC 2000 and continue to use approximately the same controller parameter values while SLIC 2000 remains in the off-hook operation state.

Graphs 2420 and 2430 of FIG. 24 illustrate examples of how power supply controller 2002 for one embodiment may dynamically control the value of the switching frequency $f_{sw}$ in accordance with flow diagram 2300 of FIG. 23 as power supply controller 2002 controls variable power supply 2004 to supply different supply voltages to SLIC 2000. As illustrated in graph 2420, power supply controller 2002 for one embodiment may change the value of the switching frequency $f_{sw}$ when SLIC 2000 transitions into a new operation state as identified by the current supply level of power supplied by variable power supply 2004. As illustrated in graph 2430, power supply controller 2002 for one embodiment may change the value of the switching frequency $f_{sw}$ when SLIC 2000 transitions into a new operation state as identified by the current supply level of power supplied by variable power supply 2004 reaching a target supply level and/or by the operation of SLIC 2000 in the new operation state. Power supply controller 2002 for another embodiment may change the value of the switching frequency $f_{sw}$ when SLIC 2000 starts transitioning to a new operation state.

Figure 25:
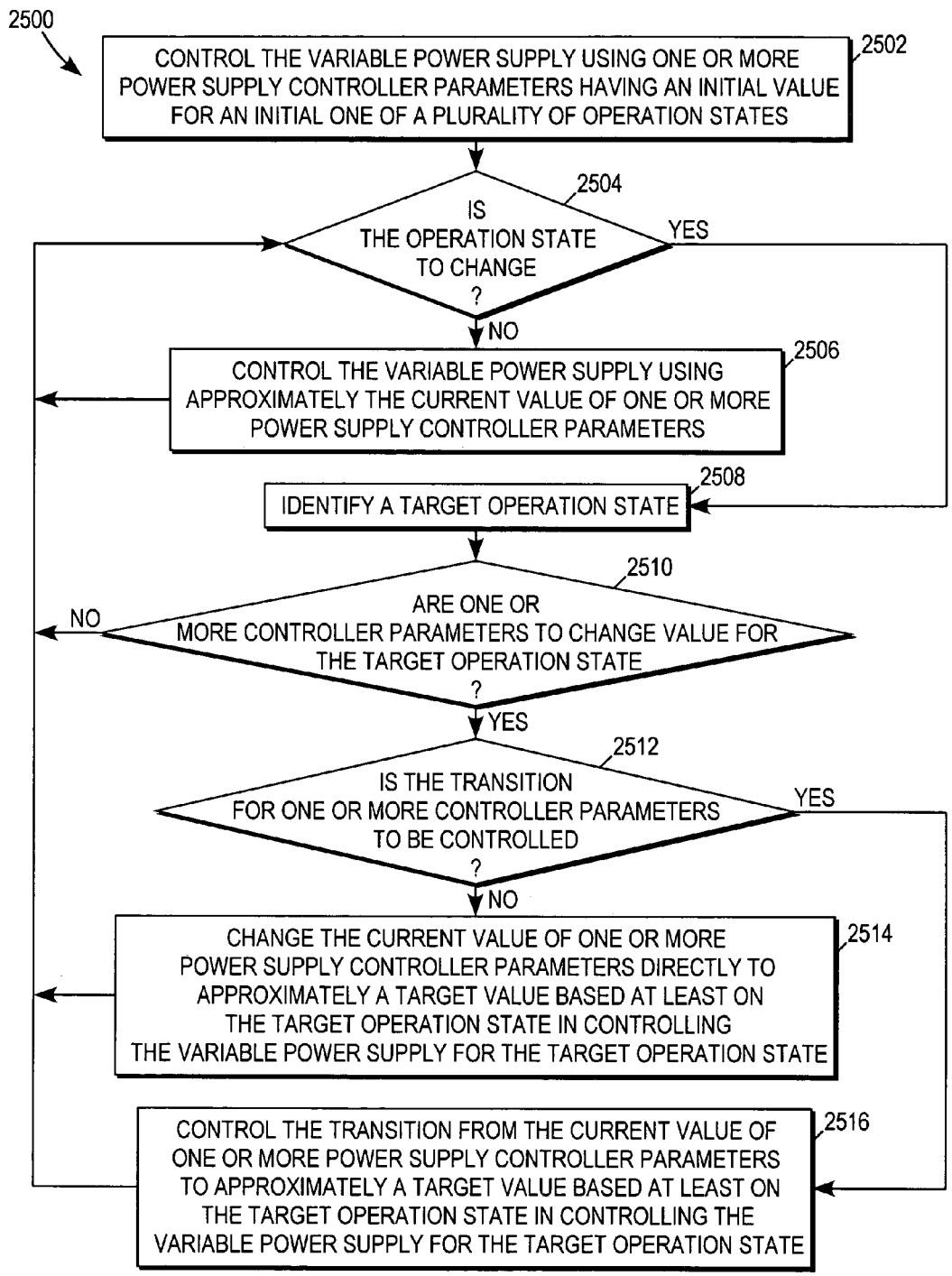
FIG. 25 illustrates, for one embodiment, a flow diagram to control the supply of power from a variable power supply using one or more dynamic power supply controller parameters.

Power supply controller 1802 for one embodiment may control variable power supply 1804 in accordance with a flow diagram 2500 of FIG. 25.

For block 2502 of FIG. 25, power supply controller 1802 controls variable power supply 1804 using one or more power supply controller parameters having an initial value for an initial one of a plurality of operation states for electronic device 1800. Power supply controller 1802 may control variable power supply 1804 using any suitable type of one or more power supply controller parameters of any suitable initial value for any suitable initial one of a plurality of any suitable operation states for electronic device 1800.

The operation states for electronic device 1800 may be defined in any suitable manner. One or more operation states for electronic device 1800 for one embodiment may be programmable.

If electronic device 1800 for block 2504 is to continue operating in the current operation state, power supply controller 1802 for one embodiment may control variable power supply 1804 for block 2506 to continue controlling variable power supply 1804 using approximately the current value of one or more power supply controller parameters. For one embodiment where variable power supply 1804 may continue supplying power at approximately the current supply level without requiring continuous or repeated control by power supply controller 1802, power supply controller 1802 for one embodiment may not perform operations for block 2506.

When electronic device 1800 is to operate in another operation state, power supply controller 1802 identifies for block 2508 a target operation state. Power supply controller 1802 may identify a target operation state in any suitable manner.

If one or more controller parameters for block 2510 are to change value for the target operation state identified for block 2508, power supply controller 1802 for block 2512 identifies whether the transition for one or more controller parameters is to be controlled. Power supply controller 1802 may identify whether the transition for one or more controller parameters is to be controlled in any suitable manner.

Power supply controller 1802 for one embodiment for block 2512 may identify whether the target operation state is one of any predetermined different operation states for the current operation state of electronic device 1800. Power supply controller 1802 may identify whether the target operation state is one of any suitable one or more predetermined different operation states of electronic device 1800.

Power supply controller 1802 for one embodiment may identify whether the target operation state is one of any first predetermined different operation states for the current operation state or alternatively is not one of any second predetermined different operation states exclusive of any first predetermined different operation states for the current operation state. The identity of any first and/or second predetermined different operation states for a given operation state for one embodiment may be predetermined. The identity of any first and/or second predetermined different operation states for a given operation state for one embodiment may be programmable.

Power supply controller 1802 for one embodiment for block 2512 may identify a target value for one or more controller parameters based at least in part on the target operation state identified for block 2508 and identify whether the identified target value satisfies one or more of one or more predetermined conditions.

Power supply controller 1802 may identify a target value for one or more controller parameters based at least in part on the target operation state in any suitable manner. Power supply controller 1802 for one embodiment may identify for one or more controller parameters a predetermined target value corresponding to the target operation state.

Power supply controller 1802 may identify whether the identified target value satisfies one or more of any suitable one or more predetermined conditions. One or more predetermined conditions for one embodiment may be programmable.

Power supply controller 1802 for one embodiment may identify whether the difference between the target value and the current value for a controller parameter satisfies one or more of one or more predetermined relationships with one or more thresholds. Power supply controller 1802 may identify whether the difference between the target value and the current value for a controller parameter satisfies one or more of any suitable one or more predetermined relationships with any suitable one or more thresholds. One or more predetermined relationships for one embodiment may be programmable. One or more thresholds for one embodiment may be programmable.

Power supply controller 1802 for one embodiment may identify whether the absolute value of the difference between the target value and the current value for a controller parameter is greater than, or alternatively greater than or equal to, a suitable threshold. Power supply controller 1802 for one embodiment may identify whether the difference between the target value and the current value for a controller parameter is greater than, or alternatively greater than or equal to, a suitable positive threshold and/or whether the difference between the target value and the current value for a controller parameter is less than, or alternatively less than or equal to, a suitable negative threshold. The positive and negative thresholds may have the same or different absolute values.

Power supply controller 1802 for one embodiment may identify whether the magnitude of the target value for a controller parameter is greater than that of its current value by an amount greater than, or alternatively greater than or equal to, a suitable threshold based at least in part on the difference between the target value and the current value.

Power supply controller 1802 for one embodiment may use one or more predetermined thresholds. Power supply controller 1802 for one embodiment may identify one or more thresholds in any suitable manner. Power supply controller 1802 for one embodiment may identify one or more thresholds for a controller parameter based at least in part on, for example, the current value of the controller parameter.

If the transition for one or more controller parameters is not to be controlled as identified for block 2512, power supply controller 1802 for block 2514 may change the current value of one or more power supply controller parameters directly to approximately a target value based at least in part on the target operation state in controlling variable power supply 1804 for the target operation state. Power supply controller 1802 may change the current value of any suitable one or more power supply controller parameters in any suitable manner directly to approximately any suitable target value based at least in part on the target operation state in any suitable manner.

If the transition for one or more controller parameters is to be controlled as identified for block 2512, power supply controller 1802 for block 2516 may control the transition from the current value of one or more power supply controller parameters to approximately a target value based at least in part on the target operation state in controlling variable power supply 1804 for the target operation state. Power supply controller 1802 may control the transition from the current value of any suitable one or more power supply controller parameters in any suitable manner to approximately any suitable target value based at least in part on the target operation state in any suitable manner.

Power supply controller 1802 for one embodiment for block 2516 may control the transition from the current value of any suitable power supply controller parameter toward its target value prior to changing the power supply controller parameter to approximately the target value. Power supply controller 1802 for one embodiment for block 2516 may control the transition from the current value of any suitable power supply controller parameter toward its target value in accordance with any suitable signal shape.

Power supply controller 1802 for one embodiment for block 2516 may control any suitable power supply controller parameter to help smooth the transition from approximately a current value for the power supply controller parameter to approximately a target value for the power supply controller parameter as electronic device 1800 changes from the current operation state to the target operation state. Power supply controller 1802 for one embodiment may therefore help minimize or avoid any disruptions to variable power supply 1804 and/or power supply controller 1802 as power supply controller 1802 changes the power supply controller parameter while controlling variable power supply 1804. Power supply controller 1802 for one embodiment may help transition from a current controller parameter value to a target controller parameter value, for example, along a generally linear path as a function of time. Power supply controller 1802 for one embodiment may help transition from a current controller parameter value to a target controller parameter value, for example, along a generally linear path as a function of the current supply level. Power supply controller 1802 for one embodiment may use interpolation to identify one or more controller parameter values between the current value and the target value.

Power supply controller 1802 may then repeat operations for blocks 2504–2516 to continue controlling variable power supply 1804 using one or more power supply controller parameters based at least in part on the new current operation state or to control the value of one or more power supply controller parameters as electronic device 1800 transitions to a next target operation state.

Power supply controller 1802 may perform operations for blocks 2502–2516 in any suitable order and may or may not overlap in time the performance of any suitable operation with any other suitable operation. Power supply controller 1802 for one embodiment may, for example, identify a target operation state for block 2508 as power supply controller 1802 controls variable power supply 1804 for block 2506.

Power supply controller 1802 for another embodiment may not perform operations for blocks 2512 and 2514 and may therefore perform operations for block 2516 for one or more controller parameters that are to change value as identified for block 2510.

Graphs 2430 and 2440 of FIG. 24 illustrate examples of how power supply controller 2002 of FIG. 20 for one embodiment may dynamically control the value of the switching frequency $f_{sw}$ in accordance with flow diagram 2500 of FIG. 25 as power supply controller 2002 controls variable power supply 2004 to supply different supply voltages to SLIC 2000. As illustrated in graph 2430, power supply controller 2002 for one embodiment may change the value of the switching frequency $f_{sw}$ directly to approximately a target value based on a target operation state in controlling variable power supply 2004 to transition to approximately a target supply level for a target operation state. Although illustrated in graph 2430 as changing the value of the switching frequency $f_{sw}$ when the current supply level of power supplied by variable power supply 2004 reaches a target supply level, power supply controller 2002 may change the value of the switching frequency $f_{sw}$ at any suitable time such as, for example, when the current supply level begins changing or transitioning to a target supply level. As illustrated in graph 2440, power supply controller 2002 for one embodiment may control the transition of the switching frequency $f_{sw}$ from a current value to a target value to help smooth the transition.

Dynamic Controller Parameter(s) Based on Supply Level Range

Power supply controller 1802 for one embodiment may control variable power supply 1804 to supply power to electronic device 1800 using one or more dynamic power supply controller parameters based at least in part on a supply level range from which electronic device 1800 is to supply power or is being supplied power. Power supply controller 1802 for one embodiment may control variable power supply 1804 in accordance with a flow diagram 2600 of FIG. 26.

Figure 26:
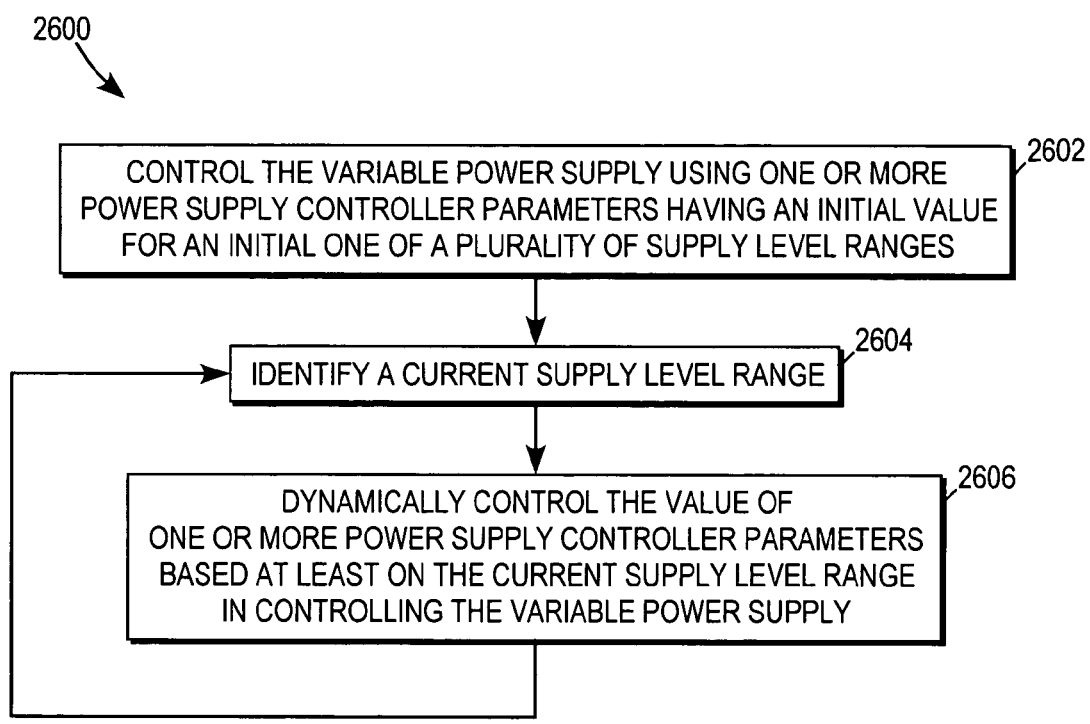
FIG. 26 illustrates, for one embodiment, a flow diagram to control the supply of power from a variable power supply using one or more dynamic power supply controller parameters.

For block 2602 of FIG. 26, power supply controller 1802 controls variable power supply 1804 using one or more power supply controller parameters having an initial value for an initial one of a plurality of supply level ranges. Power supply controller 1802 may control variable power supply 1804 using any suitable type of one or more power supply controller parameters of any suitable initial value for any suitable initial one of a plurality of any suitable supply level ranges.

The supply level ranges may be defined in any suitable manner. For one embodiment, one or more supply level ranges may be defined to overlap at least one other supply level range. Overlapping supply level ranges may be used, for example, to help provide hysteresis for supply level transitions between adjacent supply level ranges. For another embodiment, the supply level ranges may be defined so as to not overlap one another. One or more supply level ranges for one embodiment may be programmable.

For block 2604, power supply controller 1802 identifies a current supply level range. Power supply controller 1802 may identify the current supply level range in any suitable manner. Power supply controller 1802 for one embodiment may monitor the current supply level of power supplied by variable power supply 1804 in any suitable manner and identify the current supply level range based on the current supply level. For one embodiment where one or more supply level ranges overlap at least one other supply level range and the current supply level resides in two supply level ranges, power supply controller 1802 may identify the current supply level range as the supply level range in which the current supply level previously resided. In this manner, power supply controller 1802 helps provide hysteresis for supply level transitions between adjacent supply level ranges.

For block 2606, power supply controller 1802 dynamically controls the value of one or more power supply controller parameters based at least in part on the current supply level range identified for block 2604 in controlling variable power supply 1804. Power supply controller 1802 may dynamically control the value of any suitable one or more power supply controller parameters based at least in part on the current supply level range identified for block 2604 in any suitable manner.

Power supply controller 1802 for one embodiment for block 2606 may dynamically control the value of all of the power supply controller parameter(s) initialized for block 2602. Power supply controller 1802 for one embodiment for block 2606 may dynamically control the value of one or more but less than all of the power supply controller parameter(s) initialized for block 2602.

Power supply controller 1802 for one embodiment for block 2606 may dynamically control the value of any suitable power supply controller parameter to have the same or a different value for any two given supply level ranges. Power supply controller 1802 for one embodiment for block 2606 may dynamically control the value of any suitable power supply controller parameter to have a different value for any two given supply level ranges.

Power supply controller 1802 for one embodiment for block 2606 may identify a predetermined value for one or more controller parameters based on the current supply level range identified for block 2604 and control variable power supply 1804 in accordance with such identified controller parameter value(s). Power supply controller 1802 for one embodiment for block 2606 may identify a predetermined set of one or more controller parameter values based on the current supply level range identified for block 2604 and control variable power supply 1804 in accordance with the identified set.

Power supply controller 1802 may continue to monitor the current supply level range and dynamically control one or more controller parameters based on the monitored current supply level range by repeating operations for blocks 2604 and 2606. Power supply controller 1802 may monitor the current supply level range at any suitable time. Power supply controller 1802 may monitor the current supply level range, for example, continuously, at predetermined intervals, sporadically, and/or in response to any suitable one or more events.

Power supply controller 1802 may perform operations for blocks 2602–2606 in any suitable order and may or may not overlap in time the performance of any suitable operation with any other suitable operation. Power supply controller 1802 for one embodiment may, for example, identify a new current supply level range for block 2604 as power supply controller 1802 controls variable power supply 1804 for block 2606 using one or more dynamic controller parameter values based on a prior identified supply level range.

Figure 27:
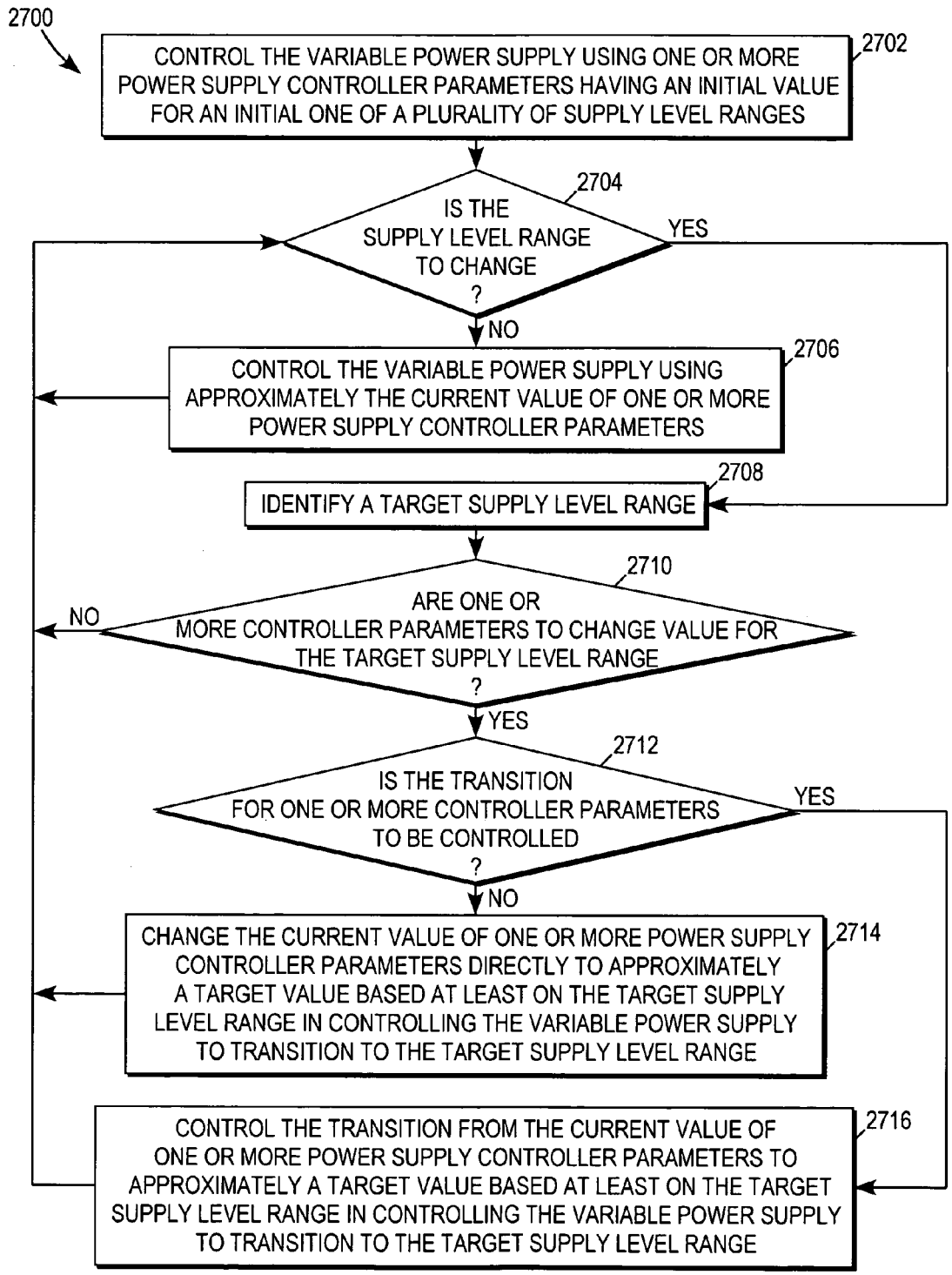
FIG. 27 illustrates, for one embodiment, a flow diagram to control the supply of power from a variable power supply using one or more dynamic power supply controller parameters.

Power supply controller 1802 for one embodiment may control variable power supply 1804 in accordance with a flow diagram 2700 of FIG. 27.

For block 2702 of FIG. 27, power supply controller 1802 controls variable power supply 1804 using one or more power supply controller parameters having an initial value for an initial one of a plurality of supply level ranges for electronic device 1800. Power supply controller 1802 may control variable power supply 1804 using any suitable type of one or more power supply controller parameters of any suitable initial value for any suitable initial one of a plurality of any suitable supply level ranges for electronic device 1800.

The supply level ranges may be defined in any suitable manner. For one embodiment, one or more supply level ranges may be defined to overlap at least one other supply level range. Overlapping supply level ranges may be used, for example, to help provide hysteresis for supply level transitions between adjacent supply level ranges. For another embodiment, the supply level ranges may be defined so as to not overlap one another. One or more supply level ranges for one embodiment may be programmable.

If electronic device 1800 for block 2704 is to continue using a supply level of power supplied by variable power supply 1804 in the current supply level range, power supply controller 1802 for one embodiment may control variable power supply 1804 for block 2706 to continue controlling variable power supply 1804 using approximately the current value of one or more power supply controller parameters. For one embodiment where variable power supply 1804 may continue supplying power at approximately the current supply level without requiring continuous or repeated control by power supply controller 1802, power supply controller 1802 for one embodiment may not perform operations for block 2706.

When electronic device 1800 is to be supplied a supply level of power in another supply level range, power supply controller 1802 identifies for block 2708 a target supply level range. Power supply controller 1802 may identify a target supply level range in any suitable manner.

If one or more controller parameters for block 2710 are to change value for the target supply level range identified for block 2708, power supply controller 1802 for block 2712 identifies whether the transition for one or more controller parameters is to be controlled. Power supply controller 1802 may identify whether the transition for one or more controller parameters is to be controlled in any suitable manner.

Power supply controller 1802 for one embodiment for block 2712 may identify whether the target supply level range is one of any predetermined different supply level ranges for the current supply level range of electronic device 1800. Power supply controller 1802 may identify whether the target supply level range is one of any suitable one or more predetermined different supply level ranges of electronic device 1800.

Power supply controller 1802 for one embodiment may identify whether the target supply level range is one of any first predetermined different supply level ranges for the current supply level range or alternatively is not one of any second predetermined different supply level ranges exclusive of any first predetermined different supply level ranges for the current supply level range. The identity of any first and/or second predetermined different supply level ranges for a given supply level range for one embodiment may be predetermined. The identity of any first and/or second predetermined different supply level ranges for a given supply level range for one embodiment may be programmable.

Power supply controller 1802 for one embodiment for block 2712 may identify a target value for one or more controller parameters based at least in part on the target supply level range identified for block 2708 and identify whether the identified target value satisfies one or more of one or more predetermined conditions.

Power supply controller 1802 may identify a target value for one or more controller parameters based at least in part on the target supply level range in any suitable manner. Power supply controller 1802 for one embodiment may identify for one or more controller parameters a predetermined target value corresponding to the target supply level range.

Power supply controller 1802 may identify whether the identified target value satisfies one or more of any suitable one or more predetermined conditions. One or more predetermined conditions for one embodiment may be programmable.

Power supply controller 1802 for one embodiment may identify whether the difference between the target value and the current value for a controller parameter satisfies one or more of one or more predetermined relationships with one or more thresholds. Power supply controller 1802 may identify whether the difference between the target value and the current value for a controller parameter satisfies one or more of any suitable one or more predetermined relationships with any suitable one or more thresholds. One or more predetermined relationships for one embodiment may be programmable. One or more thresholds for one embodiment may be programmable.

Power supply controller 1802 for one embodiment may identify whether the absolute value of the difference between the target value and the current value for a controller parameter is greater than, or alternatively greater than or equal to, a suitable threshold. Power supply controller 1802 for one embodiment may identify whether the difference between the target value and the current value for a controller parameter is greater than, or alternatively greater than or equal to, a suitable positive threshold and/or whether the difference between the target value and the current value for a controller parameter is less than, or alternatively less than or equal to, a suitable negative threshold. The positive and negative thresholds may have the same or different absolute values.

Power supply controller 1802 for one embodiment may identify whether the magnitude of the target value for a controller parameter is greater than that of its current value by an amount greater than, or alternatively greater than or equal to, a suitable threshold based at least in part on the difference between the target value and the current value.

Power supply controller 1802 for one embodiment may use one or more predetermined thresholds. Power supply controller 1802 for one embodiment may identify one or more thresholds in any suitable manner. Power supply controller 1802 for one embodiment may identify one or more thresholds for a controller parameter based at least in part on, for example, the current value of the controller parameter.

If the transition for one or more controller parameters is not to be controlled as identified for block 2712, power supply controller 1802 for block 2714 may change the current value of one or more power supply controller parameters directly to approximately a target value based at least in part on the target supply level range in controlling variable power supply 1804 to transition to the target supply level range. Power supply controller 1802 may change the current value of any suitable one or more power supply controller parameters in any suitable manner directly to approximately any suitable target value based at least in part on the target supply level range in any suitable manner.

If the transition for one or more controller parameters is to be controlled as identified for block 2712, power supply controller 1802 for block 2716 may control the transition from the current value of one or more power supply controller parameters to approximately a target value based at least in part on the target supply level range in controlling variable power supply 1804 to transition to the target supply level range. Power supply controller 1802 may control the transition from the current value of any suitable one or more power supply controller parameters in any suitable manner to approximately any suitable target value based at least in part on the target supply level range in any suitable manner.

Power supply controller 1802 for one embodiment for block 2716 may control the transition from the current value of any suitable power supply controller parameter toward its target value prior to changing the power supply controller parameter to approximately the target value. Power supply controller 1802 for one embodiment for block 2716 may control the transition from the current value of any suitable power supply controller parameter toward its target value in accordance with any suitable signal shape.

Power supply controller 1802 for one embodiment for block 2716 may control any suitable power supply controller parameter to help smooth the transition from approximately a current value for the power supply controller parameter to approximately a target value for the power supply controller parameter as power supply controller 1802 controls variable power supply 1804 to transition from the current supply level in the current supply level range to a target supply level in the target supply level range. Power supply controller 1802 for one embodiment may therefore help minimize or avoid any disruptions to variable power supply 1804 and/or power supply controller 1802 as power supply controller 1802 changes the power supply controller parameter while controlling variable power supply 1804. Power supply controller 1802 for one embodiment may help transition from a current controller parameter value to a target controller parameter value, for example, along a generally linear path as a function of time. Power supply controller 1802 for one embodiment may help transition from a current controller parameter value to a target controller parameter value, for example, along a generally linear path as a function of the current supply level. Power supply controller 1802 for one embodiment may use interpolation to identify one or more controller parameter values between the current value and the target value.

Power supply controller 1802 may then repeat operations for blocks 2704–2716 to continue controlling variable power supply 1804 using one or more power supply controller parameters based at least in part on the new current supply level range or to control the value of one or more power supply controller parameters in controlling variable power supply 1804 to transition to a next target supply level range.

Power supply controller 1802 may perform operations for blocks 2702–2716 in any suitable order and may or may not overlap in time the performance of any suitable operation with any other suitable operation. Power supply controller 1802 for one embodiment may, for example, identify a target supply level range for block 2708 as power supply controller 1802 controls variable power supply 1804 for block 2706.

Power supply controller 1802 for another embodiment may not perform operations for blocks 2712 and 2714 and may therefore perform operations for block 2716 for one or more controller parameters that are to change value as identified for block 2710.

Circuitry for Dynamically Controlling Controller Parameter(s)

Figure 28:
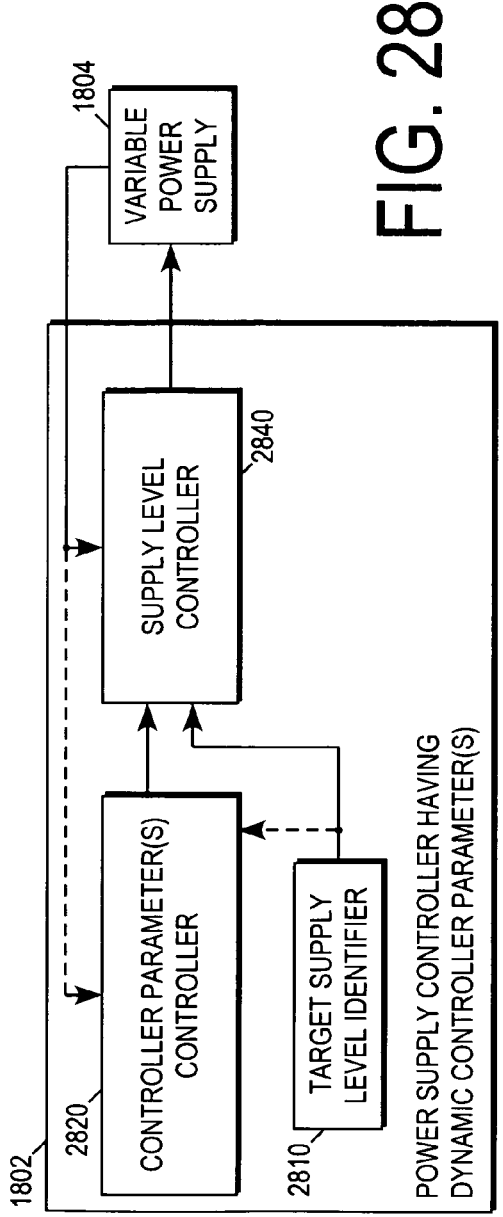
FIG. 28 illustrates, for one embodiment, a functional block diagram for a power supply controller having one or more dynamic power supply controller parameters to control a variable power supply.

Power supply controller 1802 may comprise any suitable circuitry to control variable power supply 1804 using one or more dynamic controller parameters in controlling variable power supply 1804 to supply power to electronic device 1800 at different supply levels. Power supply controller 1802 for one embodiment, as illustrated in FIG. 28, may comprise circuitry for a target supply level identifier 2810, a controller parameter(s) controller 2820, and a supply level controller 2840. For one embodiment, circuitry for any suitable portion or all of electronic device 1800, target supply level identifier 2810, controller parameter(s) controller 2820, and any suitable portion or all of supply level controller 2840 may be on the same integrated circuit.

Target supply level identifier 2810 identifies a target supply level of power to be supplied to electronic device 1800 by variable power supply 1804. Supply level controller 2840 is coupled to target supply level identifier 2810 and is coupled to control variable power supply 1804 to supply power at approximately the identified target supply level to electronic device 1800. Controller parameter(s) controller 2820 is coupled to control one or more controller parameter(s) for supply level controller 2840 in controlling variable power supply 1804.

Target supply level identifier 2810 may identify a target supply level in any suitable manner. Target supply level identifier 2810 for one embodiment may identify a target supply level based at least in part on a current and/or target operation state of electronic device 1800. Target supply level identifier 2810 for one embodiment may generate any suitable one or more signals representative of an identified target supply level and may be coupled to output such signal(s) as one or more target control signals to supply level controller 2840. Target supply level identifier 2810 may be implemented using any suitable analog and/or digital circuitry.

Target supply level identifier 2810 for one embodiment may generate and output a suitable analog signal representative of an identified target supply level. Target supply level identifier 2810 for one embodiment may generate and output one or more suitable digital signals representative of an identified target supply level. Target supply level identifier 2810 for one embodiment may be implemented at least in part using a processor that executes any suitable instructions to perform one or more functions for target supply level identifier 2810 in any suitable manner.

Controller parameter(s) controller 2820 for one embodiment may be coupled to output one or more parameter control signals to set one or more power supply controller parameters for supply level controller 2840. Controller parameter(s) controller 2820 for one embodiment may be coupled to receive one or more signals representative of a current supply level of power supplied by variable power supply 1804 and may generate one or more parameter control signals based on such signal(s).

Supply level controller 2840 for one embodiment may be coupled to receive one or more target control signals, one or more parameter control signals, and one or more signals representative of a current supply level of power supplied by variable power supply 1804 and may generate one or more supply level control signals in accordance with such signals. Supply level controller 2840 for one embodiment may be coupled to output supply level control signals to control variable power supply 1804 to supply power to electronic device 1800 at supply levels in accordance with the supply level control signals.

Figure 29:
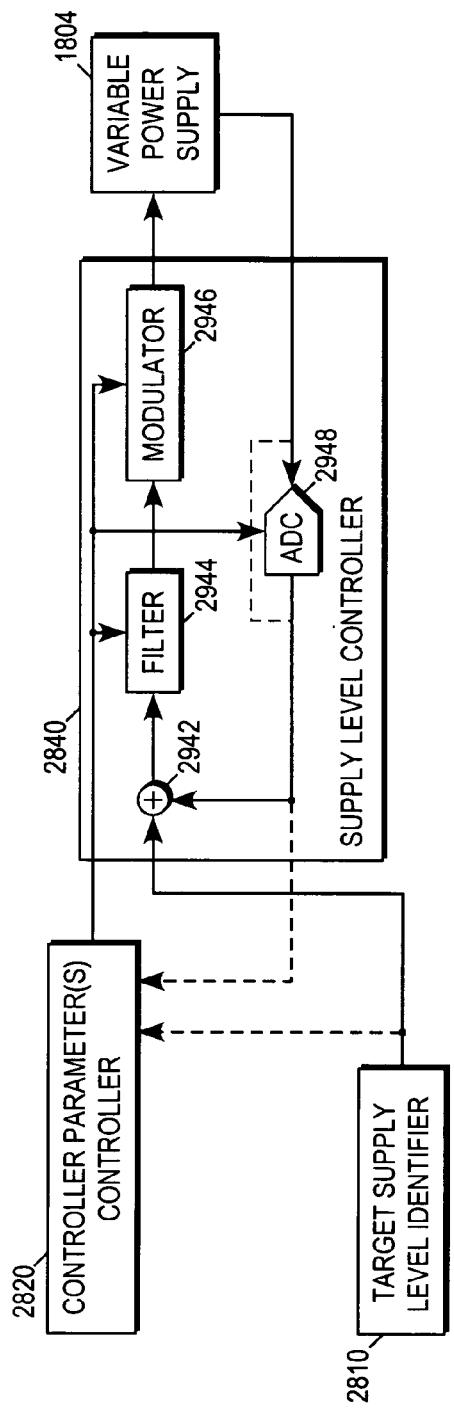
FIG. 29 illustrates, for one embodiment, a functional block diagram for a supply level controller for the power supply controller having one or more dynamic power supply controller parameters of FIG. 28.

Supply level controller 2840 may comprise any suitable circuitry that may depend, for example, on the type of variable power supply 1804 used to supply power to electronic device 1800.

Where variable power supply 1804 is a switched-mode power supply, for example, supply level controller 2840 for one embodiment, as illustrated in FIG. 29, may comprise circuitry for a summer 2942, a filter 2944, a modulator 2946, and an optional analog-to-digital converter (ADC) 2948.

Summer 2942 is coupled to receive one or more target control signals from target supply level identifier 2810 and is coupled to receive one or more signals representative of the current supply level of power supplied by variable power supply 1804. Summer 2942 generates and outputs one or more signals representative of the difference between the current supply level and a supply level represented by one or more received target control signals.

Summer 2942 may be implemented using any suitable analog and/or digital circuitry to generate and output any suitable one or more signals representative of a difference between received supply levels.

Summer 2942 for one embodiment may generate and output one or more suitable digital difference signals. Summer 2942 for one embodiment may receive one or more digital control signals from target supply level identifier 2810 and one or more digital signals representative of the current supply level of power supplied by variable power supply 1804 to generate and output one or more digital difference signals. Summer 2942 for one embodiment may be implemented at least in part using a processor that executes any suitable instructions to perform one or more functions for summer 2942 in any suitable manner.

ADC 2948 for one embodiment may be coupled to receive one or more analog signals representative of the current supply level of power supplied by variable power supply 1804 and convert the analog signal(s) into one or more digital signals for output to summer 2942. ADC 2948 for one embodiment may be coupled to receive one or more parameter control signals from controller parameter(s) controller 2820 to allow controller parameter(s) controller 2820 to control one or more controller parameters for ADC 2948. Controller parameter(s) controller 2820 may be coupled to control any suitable one or more analog-to-digital converter settings, such as sampling frequency, resolution, gain, and/or anti-aliasing for example. ADC 2948 may be implemented using any suitable analog and/or digital circuitry.

Summer 2942 for one embodiment may generate and output a suitable analog difference signal. Summer 2942 for one embodiment may receive one or more analog target control signals from target supply level identifier 2810 and one or more analog signals representative of the current supply level of power supplied by variable power supply 1804 to generate and output one or more analog difference signals. Supply level controller 2840 for one embodiment may therefore not comprise ADC 2948.

Filter 2944 for one embodiment may be coupled to receive one or more difference signals from summer 2942 and filters the received signal(s) to help stabilize the closed-loop control system formed by summer 2942, modulator 2946, variable power supply 1804, and ADC 2948, if present.

Filter 2944 for one embodiment may be coupled to receive one or more parameter control signals from controller parameter(s) controller 2820 to allow controller parameter(s) controller 2820 to control one or more controller parameters for filter 2944. Controller parameter(s) controller 2820 may be coupled to control any suitable one or more control system loop filter compensator settings, such as loop filter type, pole/zero positions, and/or loop gain for example.

Filter 2944 may be implemented using any suitable analog and/or digital circuitry. Filter 2944 for one embodiment may be implemented at least in part using a processor that executes any suitable instructions to perform one or more functions for filter 2944 in any suitable manner. Although described as being coupled between summer 2942 and modulator 2946, filter 2944 for another embodiment may be coupled in any suitable location in the closed-loop control system.

Modulator 2946 for one embodiment may be coupled to receive one or more filtered difference signals from filter 2944 and modulate such signal(s) to generate and output one or more modulated signals as one or more supply level control signals to control variable power supply 1804 to supply power at approximately a supply level represented by one or more target control signals received by summer 2942 from target supply level identifier 2810. Modulator 2946 may modulate received signal(s) in any suitable manner. Modulator 2946 may perform, for example, pulse width modulation (PWM), frequency modulation (FM), pulse-frequency modulation (PFM), pulse code modulation (PCM), or sigma-delta modulation ($\Sigma\Delta M$).

Modulator 2946 for one embodiment may be coupled to receive one or more parameter control signals from controller parameter(s) controller 2820 to allow controller parameter(s) controller 2820 to control one or more controller parameters for modulator 2946. Controller parameter(s) controller 2820 may be coupled to control any suitable one or more modulator settings, such as frequency, modulation type, and/or resolution for example.

Figure 30:
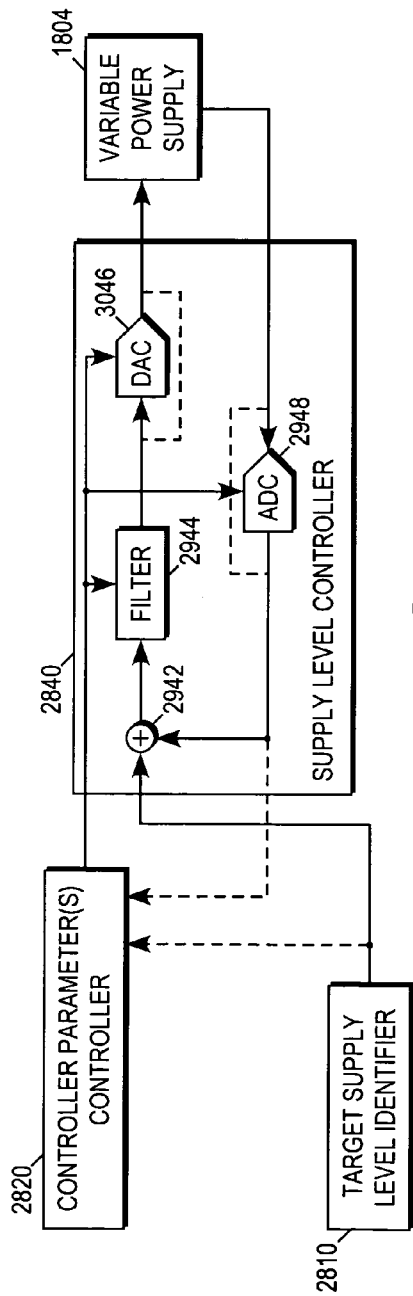
FIG. 30 illustrates, for another embodiment, a functional block diagram for a supply level controller for the power supply controller having one or more dynamic power supply controller parameters of FIG. 28.

Modulator 2946 may be implemented using any suitable analog and/or digital circuitry. Modulator 2946 for one embodiment may be implemented at least in part using a processor that executes any suitable instructions to perform one or more functions for modulator 2946 in any suitable manner.

Where variable power supply 1804 is a linear power supply, for example, supply level controller 2840 for one embodiment, as illustrated in FIG. 30, may comprise circuitry for summer 2942, filter 2944, an optional digital-to-analog converter (DAC) 3046, and optional analog-to-digital converter (ADC) 2948.

DAC 3046 for one embodiment may be coupled to receive one or more digital filtered difference signals from filter 2944 and convert the digital signal(s) into one or more analog signals for output as one or more supply level control signals to control variable power supply 1804 to supply power at approximately a supply level in accordance with one or more target control signals received by summer 2942 from target supply level identifier 2810. DAC 3046 for one embodiment may be coupled to receive one or more parameter control signals from controller parameter(s) controller 2820 to allow controller parameter(s) controller 2820 to control one or more controller parameters for DAC 3046. Controller parameter(s) controller 2820 may be coupled to control any suitable one or more digital-to-analog converter settings, such as gain, sampling frequency, resolution, and/or conversion time for example. DAC 3046 may be implemented using any suitable analog and/or digital circuitry.

Supply level controller 2840 for one embodiment may not comprise ADC 2948 and DAC 3046. Filter 2944 may therefore output one or more analog filtered difference signals as one or more supply level control signals to control variable power supply 1804 to supply power at approximately a supply level in accordance with one or more target control signals received by summer 2942 from target supply level identifier 2810.

Although described as being coupled between summer 2942 and variable power supply 1804, filter 2944 for another embodiment may be coupled in any suitable location in the closed-loop control system defined by summer 2942, DAC 3046, if present, variable power supply 1804, and ADC 2948, if present.

Controller parameter(s) controller 2820 is coupled to control one or more power supply controller parameters for supply level controller 2840 based on one or more operating parameters for electronic device 1800. Controller parameter(s) controller 2820 may be implemented using any suitable analog and/or digital circuitry to control any suitable one or more controller parameters for supply level controller 2840 in any suitable manner based on any suitable one or more operating parameters for electronic device 1800. Controller parameter(s) controller 2820 for one embodiment may be implemented at least in part using a processor that executes any suitable instructions to perform one or more functions for controller parameter(s) controller 2820 in any suitable manner.

Controller parameter(s) controller 2820 for one embodiment may be coupled to output one or more parameter control signals to set one or more power supply controller parameters for supply level controller 2840. Controller parameter(s) controller 2820 for one embodiment may generate and output any suitable one or more parameter control signals to set any suitable one or more controller parameters for supply level controller 2840 in any suitable manner.

Controller parameter(s) controller 2820 for one embodiment may generate and output one or more analog and/or digital parameter control signals to help set the resistance of one or more suitable variable resistance circuits, potentiometers, and/or resistor networks, for example, in supply level controller 2840 to help set one or more power supply controller parameters. Controller parameter(s) controller 2820 for one embodiment may generate and output one or more analog and/or digital parameter control signals to help set the capacitance of one or more suitable variable capacitance circuits, capacitor networks, varactors, and/or voltage controlled capacitors, for example, in supply level controller 2840 to help set one or more power supply controller parameters. Controller parameter(s) controller 2820 for one embodiment may generate and output one or more analog and/or digital parameter control signals to help set the inductance of one or more suitable variable inductance circuits and/or inductor networks, for example, in supply level controller 2840 to help set one or more power supply controller parameters.

Controller parameter(s) controller 2820 for one embodiment may generate and output one or more analog and/or digital parameter control signals representative of one or more power supply controller parameters to help set one or more power supply controller parameters for supply level controller 2840.

Controller parameter(s) controller 2820 for one embodiment may be coupled to receive one or more signals representative of a current supply level of power supplied by variable power supply 1804 and may generate one or more parameter control signals based on such signal(s).

Figure 31:
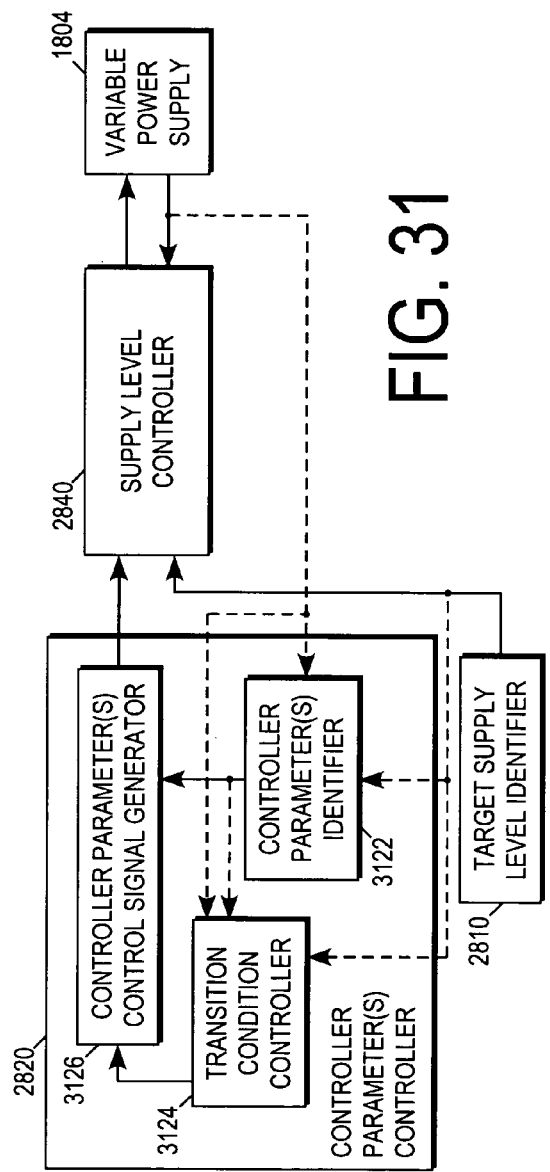
FIG. 31 illustrates, for one embodiment, a functional block diagram for a controller parameter(s) controller for the power supply controller having one or more dynamic power supply controller parameters of FIG. 28.

Controller parameter(s) controller 2820 for one embodiment, as illustrated in FIG. 31, may comprise circuitry for a controller parameter(s) identifier 3122, a transition condition controller 3124, and a controller parameter(s) control signal generator 3126.

Controller parameter(s) identifier 3122 identifies one or more controller parameter(s) for supply level controller 2840 based on one or more operating parameters for electronic device 1800. Controller parameter(s) identifier 3122 may be implemented using any suitable analog and/or digital circuitry to identify any suitable one or more controller parameters based on any suitable one or more operating parameters for electronic device 1800 in any suitable manner. Controller parameter(s) identifier 3122 for one embodiment may be implemented at least in part using a processor that executes any suitable instructions to perform one or more functions for controller parameter(s) identifier 3122 in any suitable manner.

Controller parameter(s) identifier 3122 for one embodiment may be coupled to receive one or more signals representative of the current supply level and may identify a value for one or more power supply controller parameters based on such current supply level signal(s). Controller parameter (s) identifier 3122 for one embodiment may be coupled to receive one or more digital signals representative of the current supply level from ADC 2948 of supply level controller 2840. Controller parameter(s) identifier 3122 for another embodiment may be coupled to receive one or more analog signals representative of the current supply level from variable power supply 1804.

Controller parameter(s) identifier 3122 for one embodiment may identify a current supply level based on the received current supply level signal(s) and identify a value for one or more power supply controller parameters based on the identified current supply level.

Controller parameter(s) identifier 3122 for one embodiment may identify a current operation state of electronic device 1800 based on the received current supply level signal(s) and identify a value for one or more power supply controller parameters based on the identified current operation state. Controller parameter(s) identifier 3122 for another embodiment may identify a current operation state of electronic device 1800 by monitoring or receiving one or more signals set by electronic device 1800 to represent the current operation state of electronic device 1800.

Controller parameter(s) identifier 3122 for one embodiment may identify a current supply level range based on the received current supply level signal(s) and identify a value for one or more power supply controller parameters based on the identified current supply level range.

Controller parameter(s) identifier 3122 for one embodiment may be coupled to receive one or more signals representative of a target supply level and may identify one or more values for one or more power supply controller parameters based on such target supply level signal(s). Controller parameter(s) identifier 3122 for one embodiment may be coupled to receive one or more digital signals representative of the target supply level from target supply level identifier 2810. Controller parameter(s) identifier 3122 for another embodiment may be coupled to receive one or more analog signals representative of the target supply level from target supply level identifier 2810.

Controller parameter(s) identifier 3122 for one embodiment may identify a target supply level based on the received target supply level signal(s) and identify one or more values for one or more power supply controller parameters based on the identified target supply level. Controller parameter(s) identifier 3122 for one embodiment may identify a target value for one or more power supply controller parameters based on the identified target supply level.

Controller parameter(s) identifier 3122 for one embodiment may identify a target operation state of electronic device 1800 based on the received target supply level signal(s) and identify one or more values for one or more power supply controller parameters based on the identified target operation state. Controller parameter(s) identifier 3122 for another embodiment may identify a target operation state of electronic device 1800 by monitoring or receiving one or more signals set by electronic device 1800 to represent the target operation state of electronic device 1800. Controller parameter(s) identifier 3122 for one embodiment may identify a target value for one or more power supply controller parameters based on the identified target operation state.

Controller parameter(s) identifier 3122 for one embodiment may identify a target supply level range based on the received target supply level signal(s) and identify one or more values for one or more power supply controller parameters based on the identified target supply level range. Controller parameter(s) identifier 3122 for one embodiment may identify a target value for one or more power supply controller parameters based on the identified target supply level range.

Controller parameter(s) identifier 3122 for one embodiment may identify one or more predetermined power supply controller parameters based on any suitable one or more operating parameters for electronic device 1800. Controller parameter(s) identifier 3122 for one embodiment may use a mapping table to map values for an operating parameter or for a combination of operating parameters to values for one or more power supply controller parameters.

Controller parameter(s) identifier 3122 for one embodiment may generate and output any suitable one or more signals representative of one or more identified power supply controller parameter values. Controller parameter(s) identifier 3122 for one embodiment may generate and output one or more suitable analog signals representative of one or more identified power supply controller parameter values. Controller parameter(s) identifier 3122 for one embodiment may generate and output one or more suitable digital signals representative of one or more identified power supply controller parameter values.

Transition condition controller 3124 identifies whether a transition from a current value to a target value for one or more power supply controller parameters is to be controlled. Transition condition controller 3124 may be implemented using any suitable analog and/or digital circuitry to identify in any suitable manner whether the transition from a current value to a target value for one or more power supply controller parameters is to be controlled. Transition condition controller 3124 for one embodiment may be implemented at least in part using a processor that executes any suitable instructions to perform one or more functions for transition condition controller 3124 in any suitable manner.

Transition condition controller 3124 for one embodiment may identify whether a transition from a current value to a target value for one or more power supply controller parameters is to be controlled in accordance with block 2212 of FIG. 22, block 2512 of FIG. 25, or block 2712 of FIG. 27.

Transition condition controller 3124 for one embodiment may be coupled to receive one or more signals representative of an identified target supply level from target supply level identifier 2810 to help identify whether the transition from a current value to a target value for one or more power supply controller parameters is to be controlled. Transition condition controller 3124 for one embodiment may be coupled to receive one or more signals representative of a current supply level of power supplied by variable power supply 1804 to help identify whether the transition from a current value to a target value for one or more power supply controller parameters is to be controlled. Transition condition controller 3124 for one embodiment may be coupled to receive one or more signals representative of one or more identified power supply controller parameter values from controller parameter(s) identifier 3122 to help identify whether the transition from a current value to a target value for one or more power supply controller parameters is to be controlled.

Transition condition controller 3124 for one embodiment may generate and output any suitable one or more control signals representative of whether a transition from a current value to a target value for one or more power supply controller parameters is to be controlled. Transition condition controller 3124 for one embodiment may generate and output a suitable analog control signal representative of whether a transition from a current value to a target value for one or more power supply controller parameters is to be controlled. Transition condition controller 3124 for one embodiment may generate and output one or more suitable digital control signals representative of whether a transition from a current value to a target value for one or more power supply controller parameters is to be controlled.

Controller parameter(s) control signal generator 3126 is coupled to receive one or more signals representative of one or more identified power supply controller parameter values and to control one or more power supply controller parameters for supply level controller 2840 based on such identified power supply controller parameter value signal(s). Controller parameter(s) control signal generator 3126 may be implemented using any suitable analog and/or digital circuitry to control any suitable one or more controller parameters for supply level controller 2840 in any suitable manner based on one or more identified power supply controller parameter value signals. Controller parameter(s) control signal generator 3126 for one embodiment may be implemented at least in part using a processor that executes any suitable instructions to perform one or more functions for controller parameter(s) control signal generator 3126 in any suitable manner.

Controller parameter(s) control signal generator 3126 for one embodiment may generate one or more parameter control signals based on one or more signals representative of one or more identified power supply controller parameter values. Controller parameter(s) control signal generator 3126 for one embodiment may be coupled to generate and output any suitable one or more parameter control signals to set any suitable one or more controller parameters for supply level controller 2840 in any suitable manner.

Controller parameter(s) control signal generator 3126 for one embodiment may generate and output one or more analog and/or digital parameter control signals to help set the resistance of one or more suitable variable resistance circuits, potentiometers, and/or resistor networks, for example, in supply level controller 2840 to help set one or more power supply controller parameters. Controller parameter(s) control signal generator 3126 for one embodiment may generate and output one or more analog and/or digital parameter control signals to help set the capacitance of one or more suitable variable capacitance circuits, capacitor networks, varactors, and/or voltage controlled capacitors, for example, in supply level controller 2840 to help set one or more power supply controller parameters. Controller parameter(s) control signal generator 3126 for one embodiment may generate and output one or more analog and/or digital parameter control signals to help set the inductance of one or more suitable variable inductance circuits and/or inductor networks, for example, in supply level controller 2840 to help set one or more power supply controller parameters.

Controller parameter(s) control signal generator 3126 for one embodiment may generate and output one or more analog and/or digital parameter control signals representative of one or more power supply controller parameters to help set one or more power supply controller parameters for supply level controller 2840.

Controller parameter(s) control signal generator 3126 for one embodiment may receive one or more signals representative of a target value for a power supply controller parameter and one or more signals identifying whether the transition of the power supply controller parameter to the target value is to be controlled. If the transition is to be controlled, controller parameter(s) control signal generator 3126 may then generate and output any suitable one or more parameter control signals to help control the transition of the power supply controller parameter in accordance with any suitable signal shape. Controller parameter(s) control signal generator 3126 for one embodiment may identify one or more values between the current and target values for a power supply controller parameter to help control the transition of the power supply controller parameter to approximate any suitable signal shape, such as a generally linear ramp signal of any suitable slope, a generally parabolic shaped signal, or a generally S-shaped signal for example. Controller parameter(s) control signal generator 3126 for one embodiment may use interpolation, for example, to identify one or more values between the current and target values for a power supply controller parameter.

Circuitry for SLIC Having Dynamic Controller Parameter(s)

Figure 32:
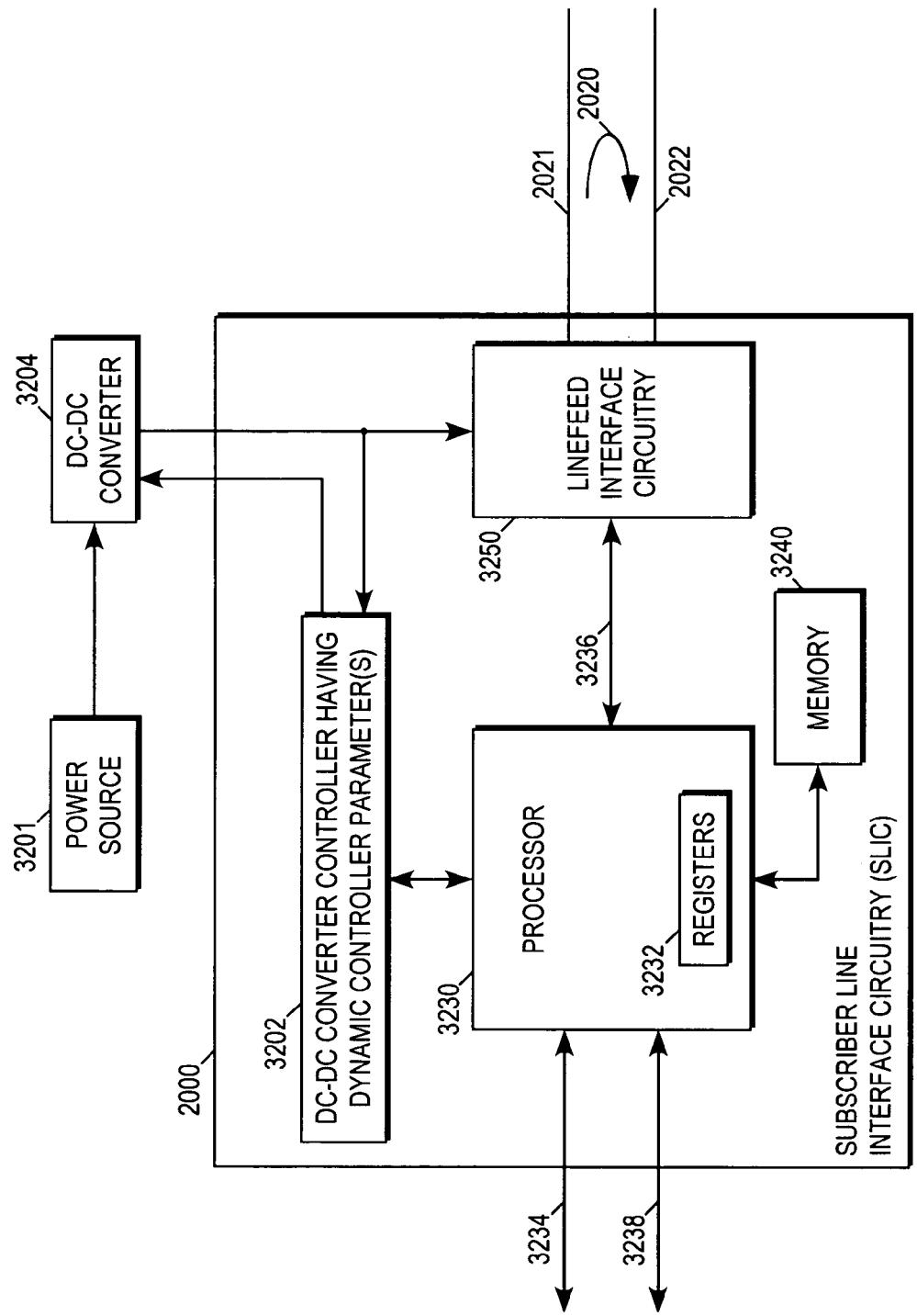
FIG. 32 illustrates, for one embodiment, a block diagram of subscriber line interface circuitry (SLIC) comprising a direct-current to direct-current (DC-DC) converter controller having one or more dynamic power supply controller parameters to control a DC-DC converter to supply power to the SLIC.

SLIC 2000 for one embodiment, as illustrated in FIG. 32, comprises a direct-current to direct-current (DC-DC) converter controller 3202 having one or more dynamic controller parameters, a processor 3230, memory 3240, and linefeed interface circuitry 3250.

DC-DC converter controller 3202 is coupled to control a DC-DC converter 3204 coupled to receive power from a power source 3201 and coupled to supply power to linefeed interface circuitry 3250 under control of DC-DC converter controller 3202. DC-DC converter controller 3202 and DC-DC converter 3204 generally correspond to power supply controller 2002 and variable power supply 2004, respectively.

Processor 3230 may be controlled or programmed to help perform any suitable function, including any suitable BORSCHT function. Processor 3230 may comprise any suitable circuitry in accordance with any suitable processor architecture. Processor 3230 for one embodiment may comprise circuitry in accordance with a suitable digital signal processor (DSP) architecture. Processor 3230 for one embodiment may comprise a plurality of registers 3232 to help program, set, maintain, and/or track one or more operating parameters for one or more functions performed by processor 3230.

Processor 3230 for one embodiment may be controlled or programmed to perform one or more functions for DC-DC converter controller 3202. Where processor 3230 is to help control DC-DC converter 3204 in accordance with flow diagram 1900 of FIG. 19, flow diagram 2100 of FIG. 21, flow diagram 2200 of FIG. 22, flow diagram 2300 of FIG. 23, flow diagram 2500 of FIG. 25, flow diagram 2600 of FIG. 26, and/or flow diagram 2700 of FIG. 27, processor 3230 for one embodiment may use registers 3232 to store one or more suitable values to help identify, where applicable, one or more of the following example operating parameters: an initial supply level, a target supply level, a sensed or sampled current supply level of power supplied by DC-DC converter 3204, a current operation state, a target operation state, one or more supply level ranges, a prior supply level range, a current supply level range, and/or a target supply level range. Processor 3230 for one embodiment may use registers 3232 to store one or more suitable values to help identify, where applicable, one or more of the following: one or more initial power supply controller parameter values, one or more current power supply controller parameter values, and/or one or more target power supply controller parameter values.

Processor 3230 for one embodiment may have a processor interface 3234 through which processor 3230 may be controlled or programmed to help perform any suitable function, including any suitable BORSCHT function.

SLIC 2000 for one embodiment may also comprise optional memory 3240 to store suitable instructions to be executed by processor 3230 to help perform any suitable function, including any suitable BORSCHT function. Memory 3240 for one embodiment may be used to store, for example, any suitable instructions to perform one or more functions for DC-DC converter controller 3202. Memory 3240 for one embodiment may be used to store one or more suitable values to help identify one or more operating parameters for one or more functions performed by processor 3230 and/or to help identify one or more power supply controller parameters.

Memory 3240 may comprise any suitable one or more non-volatile and/or volatile memories including, for example, flash memory, read only memory (ROM), programmable read only memory (PROM), erasable programmable read only memory (EPROM), electrically erasable programmable read only memory (EEPROM), a battery-backed random access memory (RAM), random access memory (RAM), static random access memory (SRAM), dynamic random access memory (DRAM), and/or synchronous dynamic random access memory (SDRAM).

Although described in the context of instructions stored in memory 3240 to be executed by processor 3230, any suitable machine-readable medium, such as a hard disk device, a floppy disk or diskette device, an optical disk device such as a compact disc (CD) or digital versatile disc (DVD) device for example, a Bernoulli disk device such as a Jaz or Zip disk device for example, a flash memory device, a file server device, and/or any other suitable memory device may be used. For one embodiment, suitable instructions stored in this manner may be transmitted to SLIC 2000 through processor interface 3234 for execution by processor 3230 and/or for storage in memory 3240.

Linefeed interface circuitry 3250 for one embodiment may be coupled to receive power supplied by DC-DC converter 3204 and coupled to first line 2021 and to second line 2022 of subscriber loop 2020 to provide a linefeed on subscriber loop 2020. Processor 3230 for one embodiment may help control linefeed interface circuitry 3250 through a linefeed interface 3236 coupled to linefeed interface circuitry 3250. Processor 3230 for one embodiment may also have a digital voiceband interface 3238 to communicate digitized voiceband data to switching network 2010 where switching network 2010 is a digital switching network and use linefeed interface 3236 for bi-directional voiceband data transfer between processor 3230 and subscriber loop 2020.

Processor 3230 for one embodiment may be implemented on an integrated circuit. Any suitable portion or all of DC-DC converter controller 3202, memory 3240, and/or at least a portion of linefeed interface circuitry 3250 for one embodiment may also be implemented on the same integrated circuit as that having processor 3230.

Power Supply Control Using Supply Power Transition Control and Dynamic Controller Parameter(s)

Figure 33:
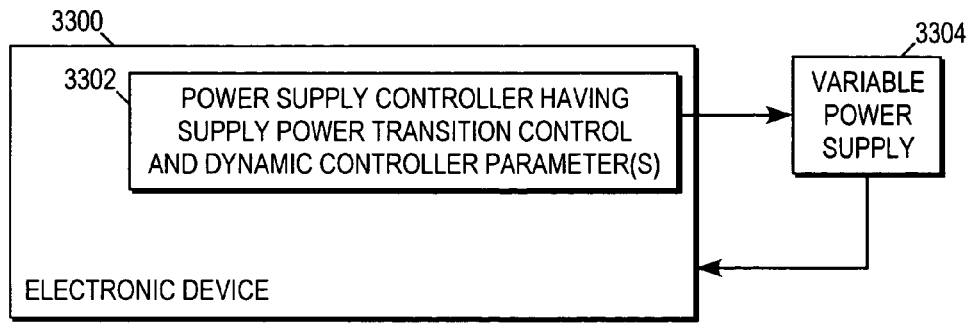
FIG. 33 illustrates, for one embodiment, a block diagram of an electronic device comprising a power supply controller having supply power transition control and one or more dynamic power supply controller parameters to control a variable power supply to supply power to the electronic device.

FIG. 33 illustrates, for one embodiment, an electronic device 3300 comprising a power supply controller 3302 having supply power transition control and one or more dynamic controller parameters to control a variable power supply 3304 dynamically to supply power to electronic device 3300 at different supply levels. Power supply controller 3302 for one embodiment may control variable power supply 3304 to control the transition from approximately a current supply level to approximately a target supply level in accordance with flow diagram 200 of FIG. 2, flow diagram 400 of FIG. 4, flow diagram 800 of FIG. 8, and/or flow diagram 900 of FIG. 9. Power supply controller 3302 for one embodiment may control variable power supply 3304 using one or more dynamic power supply controller parameters in accordance with flow diagram 1900 of FIG. 19, flow diagram 2100 of FIG. 21, flow diagram 2200 of FIG. 22, flow diagram 2300 of FIG. 23, flow diagram 2500 of FIG. 25, flow diagram 2600 of FIG. 26, and/or flow diagram 2700 of FIG. 27.

Figure 34:
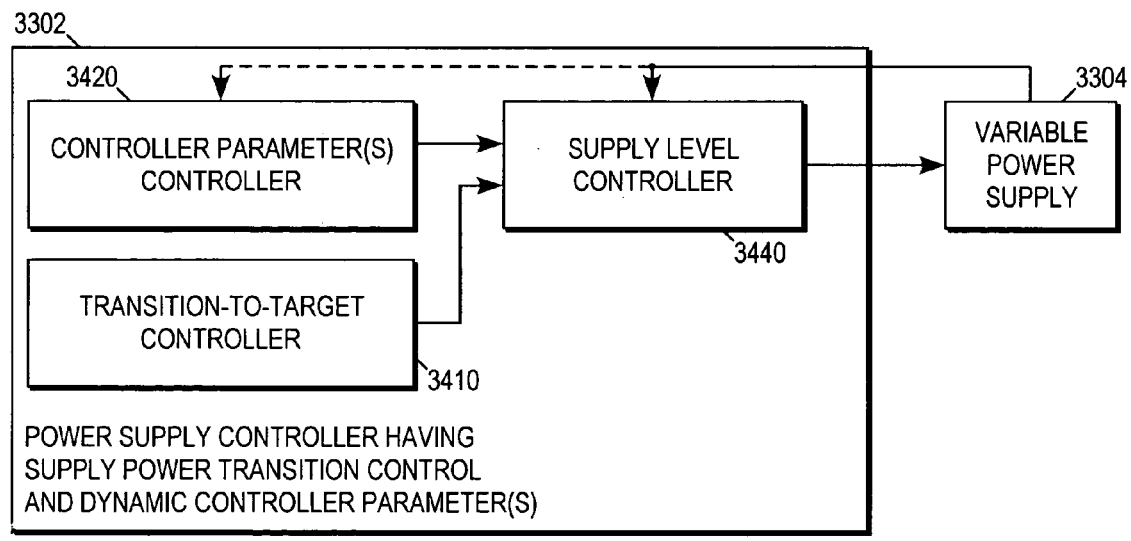
FIG. 34 illustrates, for one embodiment, a functional block diagram for a power supply controller having supply power transition control and one or more dynamic power supply controller parameters to control a variable power supply.

Power supply controller 3302 may comprise any suitable circuitry to control variable power supply 3304 to control the transition from approximately a current supply level to approximately a target supply level and to control variable power supply 3304 using dynamic controller parameters. Power supply controller 3302 for one embodiment, as illustrated in FIG. 34, may comprise transition-to-target controller 3410, controller parameter(s) controller 3420, and supply level controller 3440. Transition-to-target controller 3410 and controller parameter(s) controller 3420 generally correspond to transition-to-target controller 1020 of FIG. 10 and controller parameter(s) controller 2820 of FIG. 28, respectively. Supply level controller 3440 generally corresponds to supply level controller 1040 of FIG. 10 and to supply level controller 2840 of FIG. 28.

In the foregoing description, one or more embodiments of the present invention have been described. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
controlling a variable power supply to supply power at approximately a first supply level for an electronic device;
identifying a second supply level to be supplied for the electronic device; and
in response to identifying the second supply level, controlling the variable power supply to control a transition of the power from approximately the first supply level toward the second supply level prior to controlling the variable power supply to supply power at approximately the second supply level for the electronic device, wherein the power is successively controlled to transition to one or more supply levels intermediate between the first and second supply levels if the second supply level, operational state of the electronic device, or difference between the first and second supply levels satisfies one or more pre-determined conditions.

2. The method of claim 1, comprising identifying that the second supply level satisfies one or more of one or more predetermined conditions.

3. The method of claim 2, comprising identifying that the power for the electronic device is to change to the second supply level in response to a change between different operation states of the electronic device.

4. The method of claim 3, wherein the electronic device comprises subscriber line interface circuitry and has at least an off-hook operation state, an on-hook operation state, and a ringing operation state.

5. The method of claim 2, comprising identifying that the difference between the second supply level and the first supply level satisfies one or more of one or more predetermined relationships with one or more thresholds.

6. The method of claim 2, comprising identifying that the second supply level satisfies one or more of one or more predetermined relationships with one or more supply level ranges.

7. The method of claim 1, wherein the controlling the variable power supply to control a transition of the power from approximately the first supply level toward the second supply level comprises generating an analog ramp signal to control the variable power supply.

8. The method of claim 1, wherein the controlling the variable power supply to control a transition of the power from approximately the first supply level toward the second supply level comprises controlling the variable power supply to change the power to approximately one or more intermediate supply levels prior to controlling the variable power supply to change the power to approximately the second supply level.

9. The method of claim 1, wherein the variable power supply comprises a direct-current to direct-current (DC-DC) converter and wherein the controlling the variable power supply comprises generating one or more control signals to control the DC-DC converter.

10. An electronic device comprising:
a supply level controller coupled to control a variable power supply to supply power at a supply level for the electronic device; and
a transition-to-target controller coupled to control the supply level controller to control the variable power supply to supply power at approximately a first supply level for the electronic device and to control the variable power supply to control a transition of the power from approximately the first supply level toward a second supply level prior to controlling the variable power supply to supply power at approximately the second supply level for the electronic device, wherein the power is successively controlled to transition to one or more supply levels intermediate between the first and second supply levels if the second supply level, operational state of the electronic device, or difference between the first and second supply levels satisfies one or more pre-determined conditions.

11. The electronic device of claim 10, wherein the transition-to-target controller comprises circuitry to identify that the second supply level satisfies one or more of one or more predetermined conditions.

12. The electronic device of claim 11, wherein the transition-to-target controller comprises circuitry to identify that the power for the electronic device is to change to the second supply level in response to a change between different operation states of the electronic device.

13. The electronic device of claim 12, wherein the electronic device comprises subscriber line interface circuitry and has at least an off-hook operation state, an on-hook operation state, and a ringing operation state.

14. The electronic device of claim 11, wherein the transition-to-target controller comprises circuitry to identify that the difference between the second supply level and the first supply level satisfies one or more of one or more predetermined relationships with one or more thresholds.

15. The electronic device of claim 11, wherein the transition-to-target controller comprises circuitry to identify that the second supply level satisfies one or more of one or more predetermined relationships with one or more supply level ranges.

16. The electronic device of claim 10, wherein the transition-to-target controller comprises circuitry to generate and output one or more control signals representative of one or more supply levels to control the supply level controller to control the transition of power.

17. The electronic device of claim 10, wherein the transition-to-target controller comprises circuitry to generate an analog ramp signal to control the supply level controller to control the transition of power.

18. The electronic device of claim 10, wherein the transition-to-target controller comprises circuitry to generate one or more sets of one or more digital signals representative of an intermediate supply level between the first and second supply levels to control the supply level controller to control the transition of power.

19. The electronic device of claim 10, wherein the transition-to-target controller comprises circuitry to generate and output one or more target control signals representative of the second supply level to the supply level controller and to generate and output one or more control signals to control one or more controller parameters for the supply level controller to control the transition of power.

20. The electronic device of claim 10, wherein the variable power supply comprises a direct-current to direct-current (DC-DC) converter and wherein the supply level controller is to generate a control signal to control the DC-DC converter.

21. The electronic device of claim 10, in combination with the variable power supply.

22. An apparatus comprising:
means for controlling a variable power supply to supply power at approximately a first supply level for an electronic device; and
means for controlling the variable power supply to control a transition of the power from approximately the first supply level toward a second supply level prior to controlling the variable power supply to supply power at approximately the second supply level for the electronic device, wherein the power is successively controlled to transition to one or more supply levels intermediate between the first and second supply levels if the second supply level, operational state of the electronic device, or difference between the first and second supply levels satisfies one or more pre-determined conditions.

23. The apparatus of claim 22, comprising means for performing one or more BORSCHT functions.

* * * * *